(12) United States Patent
Mahnad

(10) Patent No.: US 8,014,246 B2
(45) Date of Patent: Sep. 6, 2011

(54) DATA STORAGE SYSTEM AND METHOD FOR CALIBRATING SAME

(75) Inventor: Faramarz Mahnad, Brookline, MA (US)

(73) Assignee: Oracle America, Inc., Redwood City, CA (US)

( * ) Notice: Subject to any disclaimer, the term of this patent is extended or adjusted under 35 U.S.C. 154(b) by 5 days.

(21) Appl. No.: 12/639,194

(22) Filed: Dec. 16, 2009

(65) Prior Publication Data

US 2011/0141863 A1    Jun. 16, 2011

(51) Int. Cl.
*G11B 7/00* (2006.01)
(52) U.S. Cl. ............... 369/53.17; 369/53.15; 369/47.14; 369/44.32
(58) Field of Classification Search .................. None
See application file for complete search history.

(56) References Cited

U.S. PATENT DOCUMENTS

| | | | | |
|---|---|---|---|---|
| 7,095,693 | B2 * | 8/2006 | Sasaki et al. ............... | 369/53.15 |
| 7,133,335 | B2 * | 11/2006 | Nishimura et al. ......... | 369/47.26 |

FOREIGN PATENT DOCUMENTS

WO    2007092785 A2    8/2007

OTHER PUBLICATIONS

International Search Report and Written Opinion for corresponding PCT Application No. PCT/US2010/059188, mailed Mar. 28, 2011, 10 pages.

* cited by examiner

*Primary Examiner* — Muhammad N Edun
(74) *Attorney, Agent, or Firm* — Brooks Kushman P.C.

(57) ABSTRACT

Disclosed herein are aspects of optical tape technology, tape manufacturing, and tape usage. Methods and systems of tape technology disclose optical tape media including: configurations, formulations, markings, and structure; optical tape manufacturing methods, systems, and apparatus methods and systems including: curing processes, coating methods, embossing, drums, testing, tracking alignment stamper strip; optical tape methods and systems including: pick up head adapted for the disclosed optical tape; and optical tape uses including optical storage media devices for multimedia applications.

19 Claims, 77 Drawing Sheets

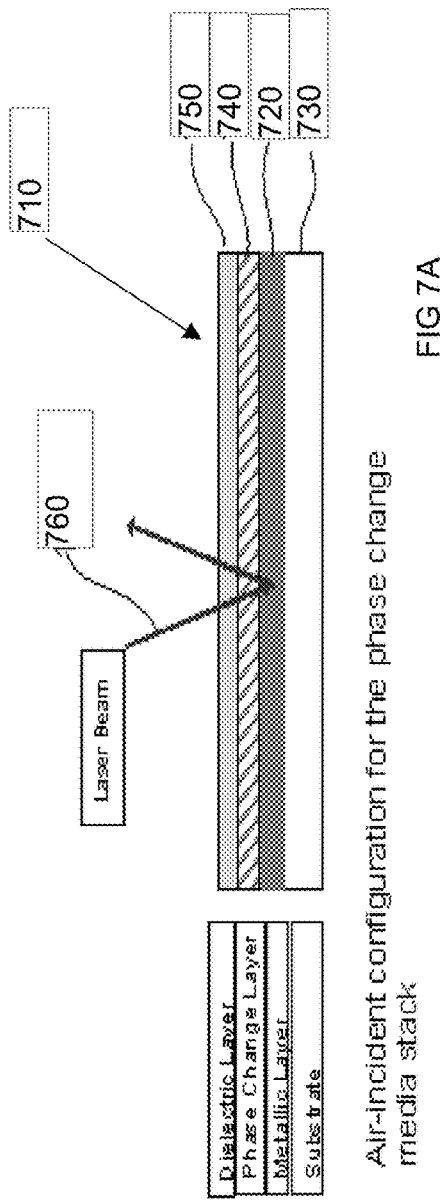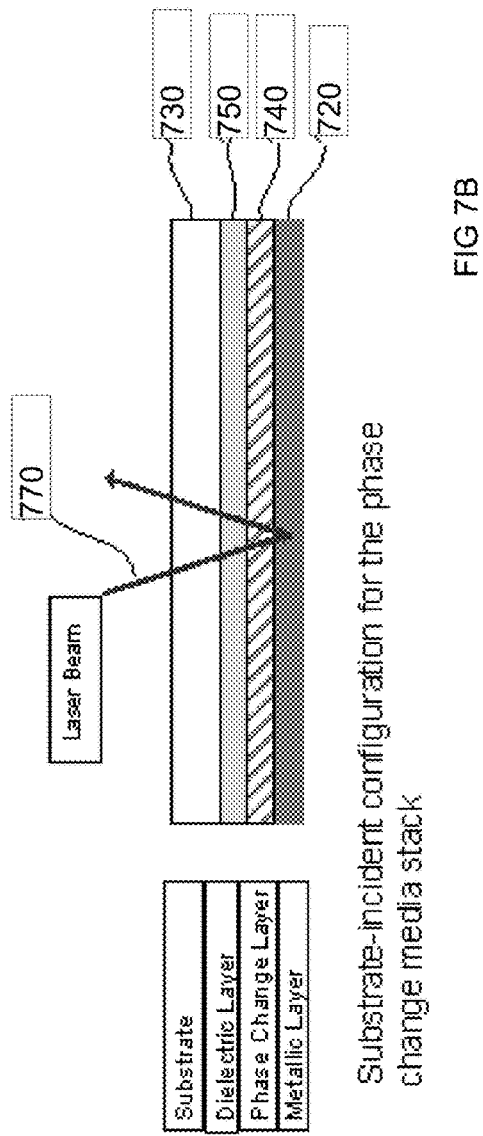

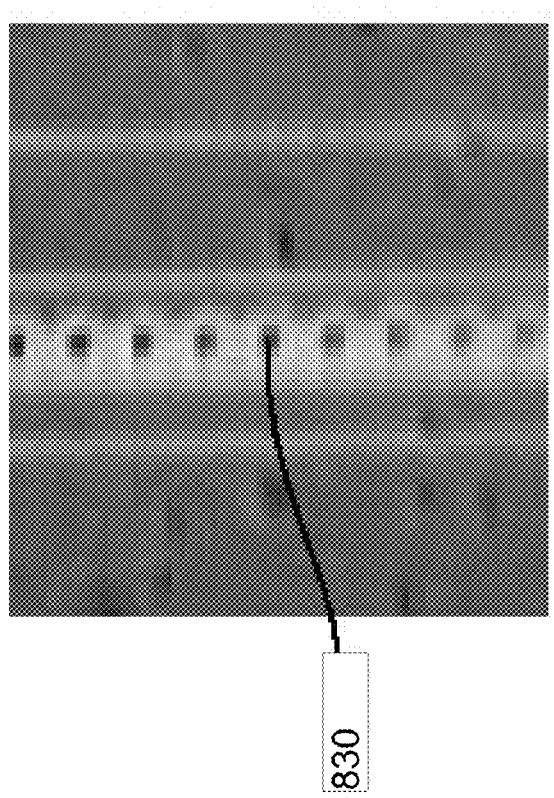
FIG 8B Write dark
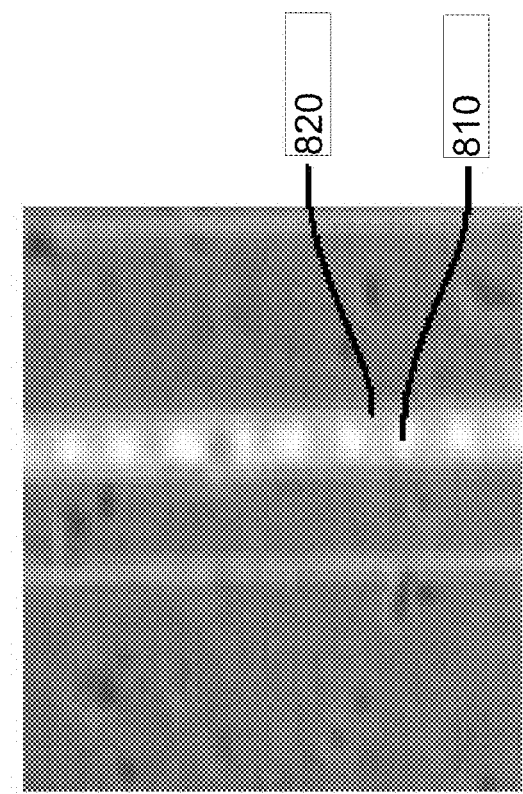
FIG 8A Write bright

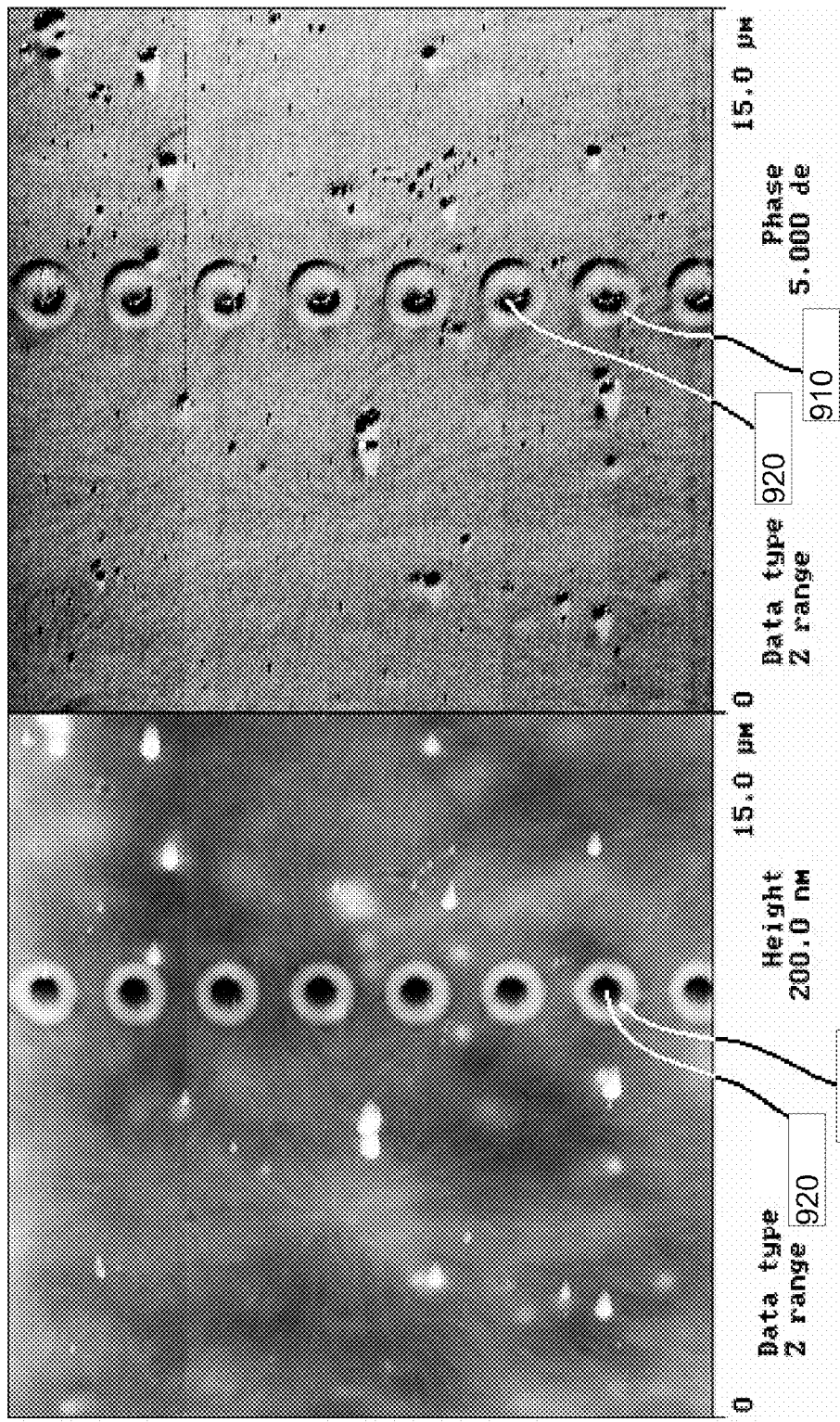

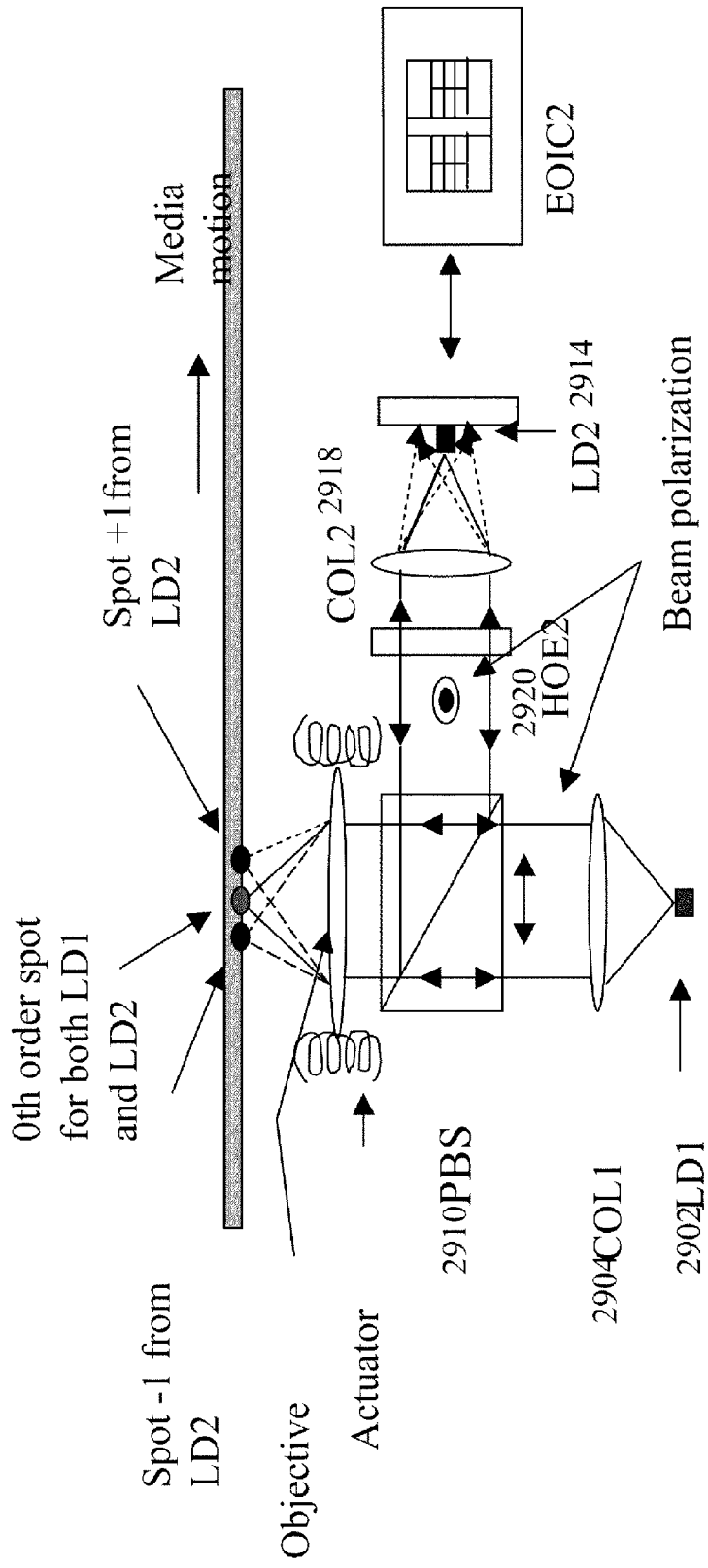
Fig 29  A Direct Read After Write (DRAW) Optical Pickup, showing the forward beam path and return beam path, based on method 1 in the disclosure.

An embodiment of direct read after write optical pickup, showing the forward beam path and return beam, based on method two of the specification.

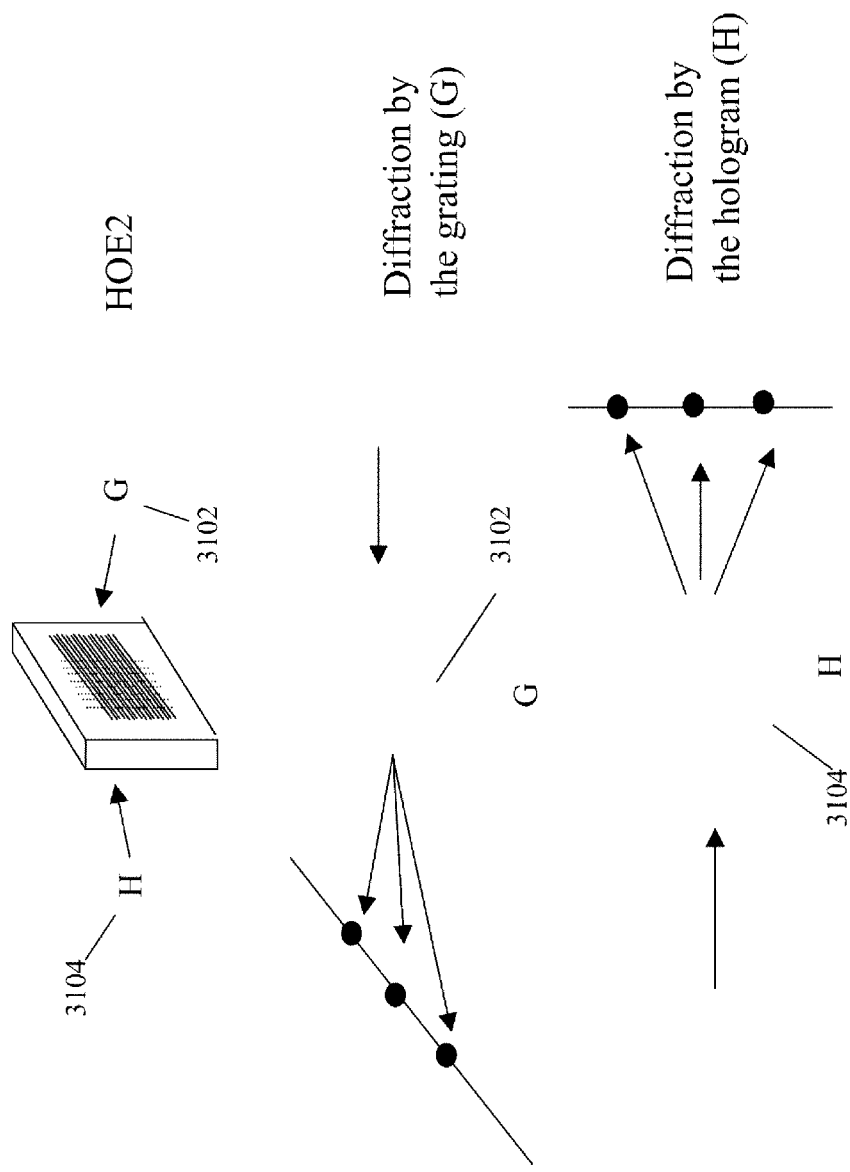
Fig.31 Holographic Optical Element (HOE2) used in the beam path of LD2, applicable to both Method 1 and 2.

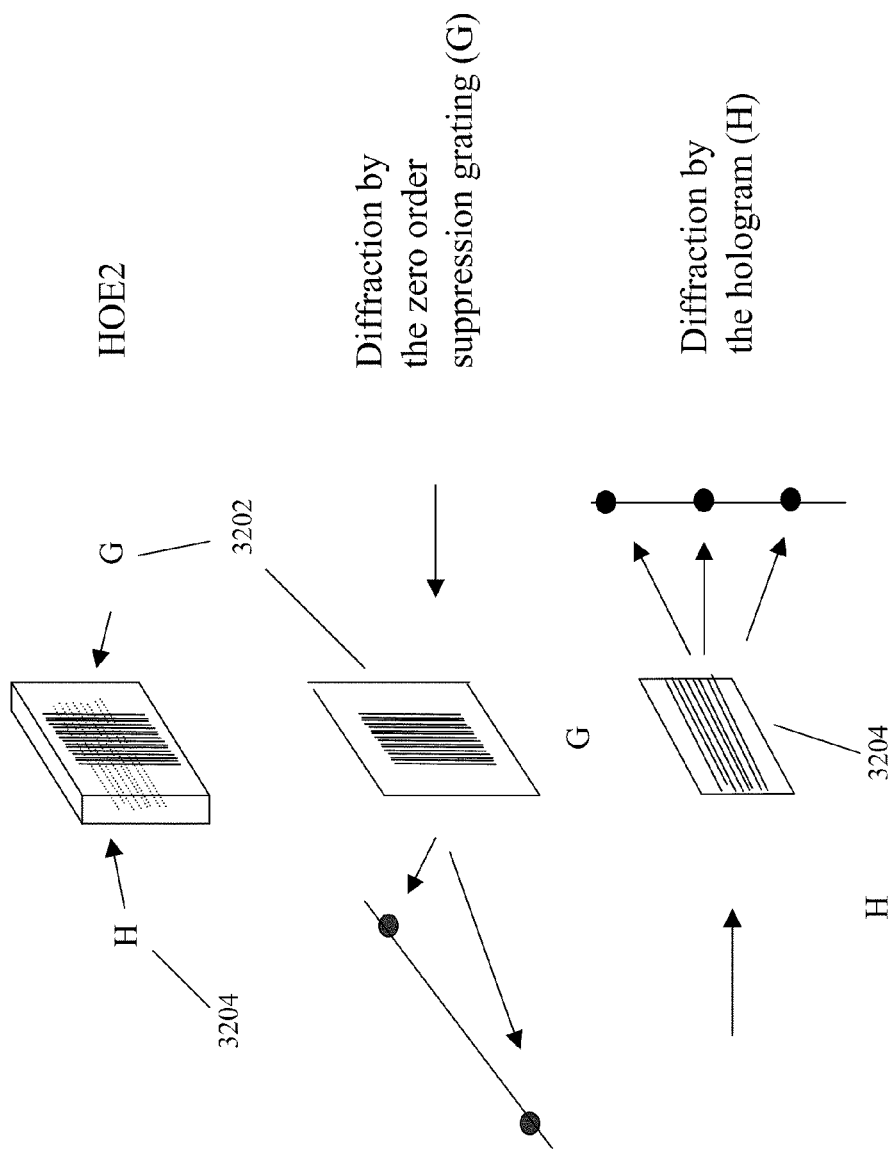
Fig 32  Holographic Optical element (HOE2) where a zero order suppression grating is used in the LD2 beam path, applicable to Method 2

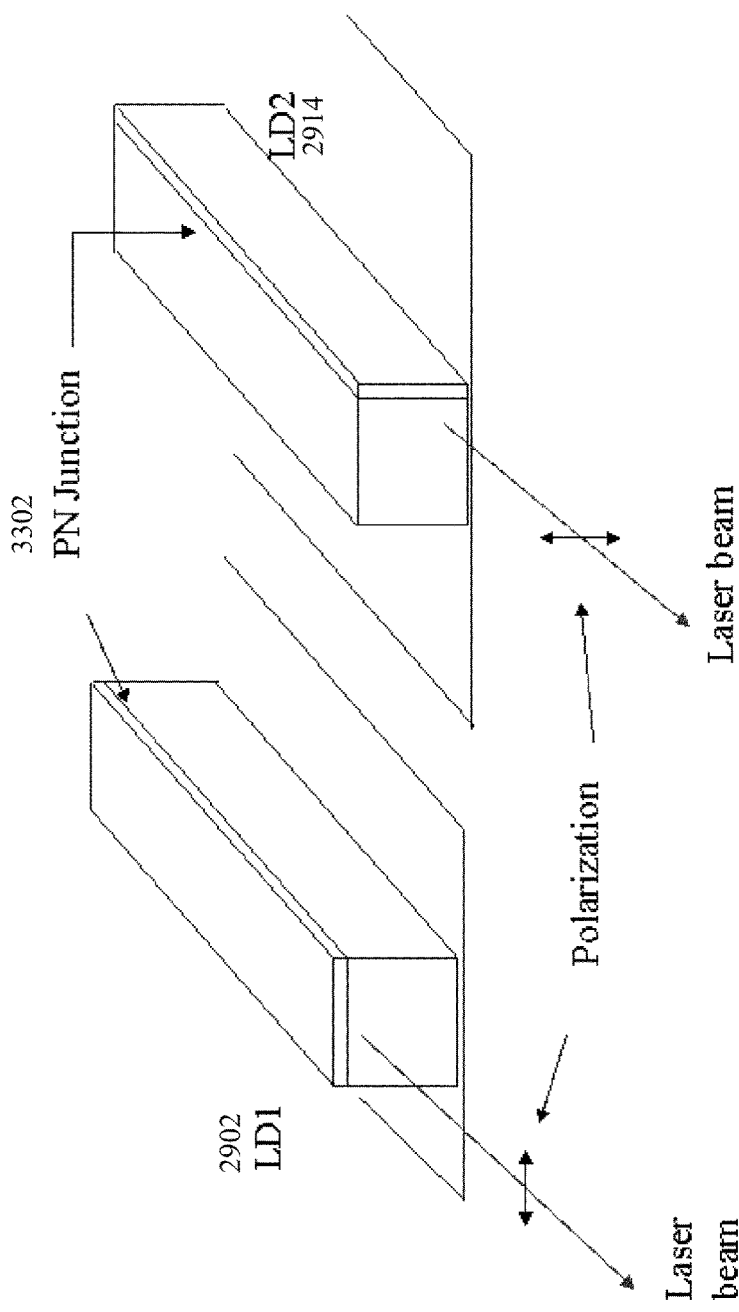
Fig 33 Orientation of LD1 and LD2 are orthogonal to each other

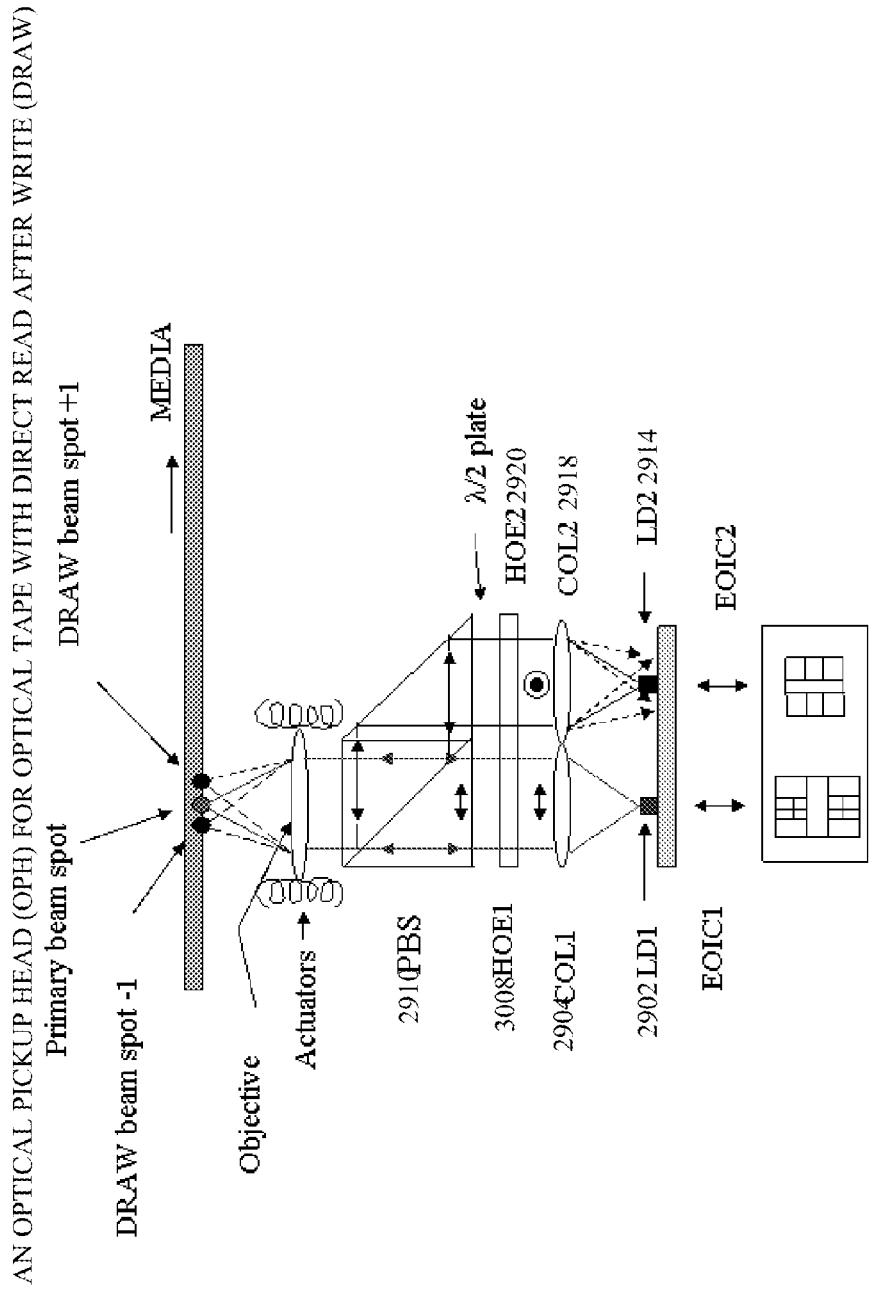
Fig 34  Another DRAW PUH configuration, where EOIC1 and EOIC2 are integrated into one chip

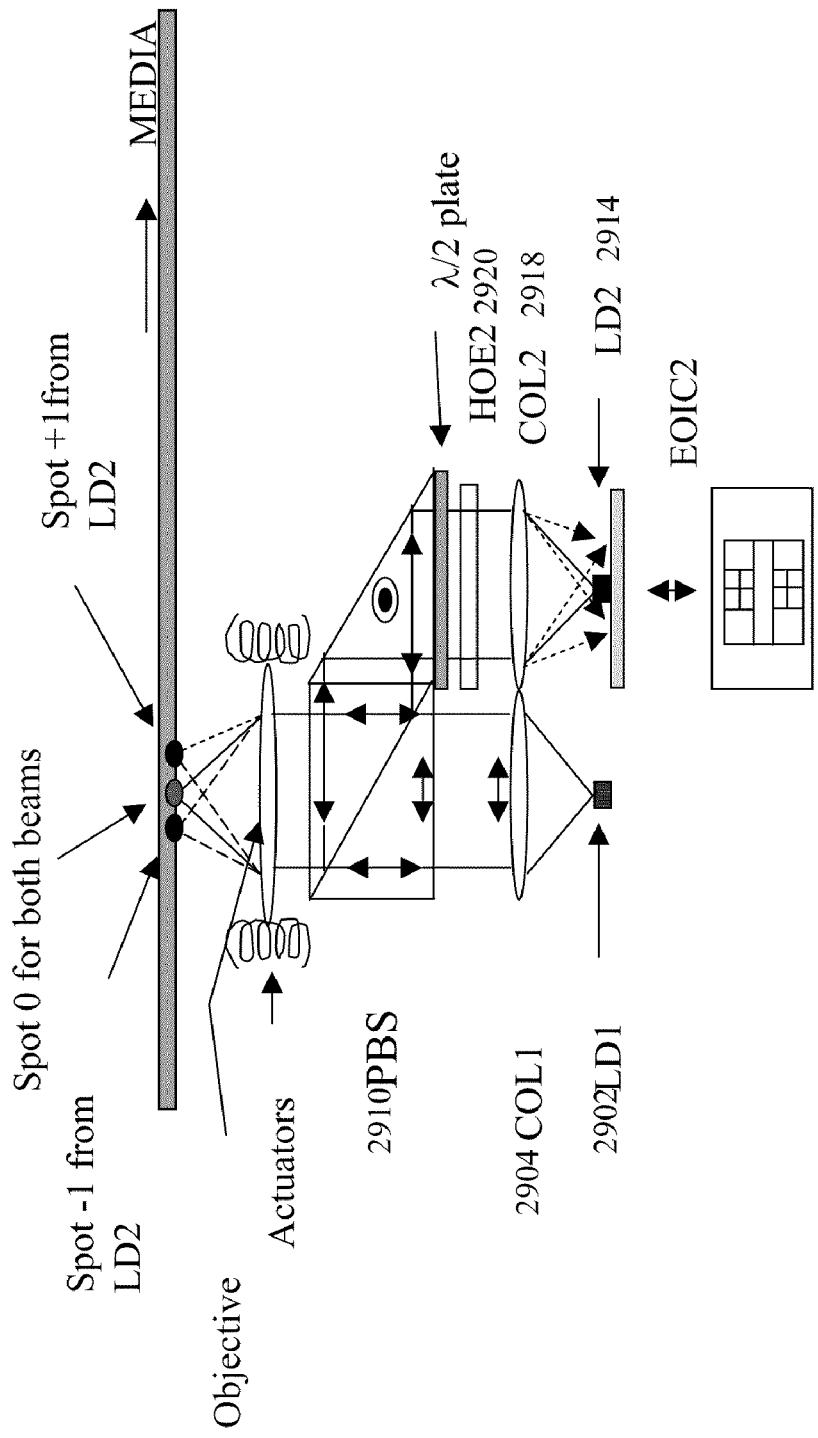
Fig 35  A compact DRAW PUH configuration, based on method 1. LD1 is responsible for write only, while LD2 is responsible for focus, tracking, read and DRAW.

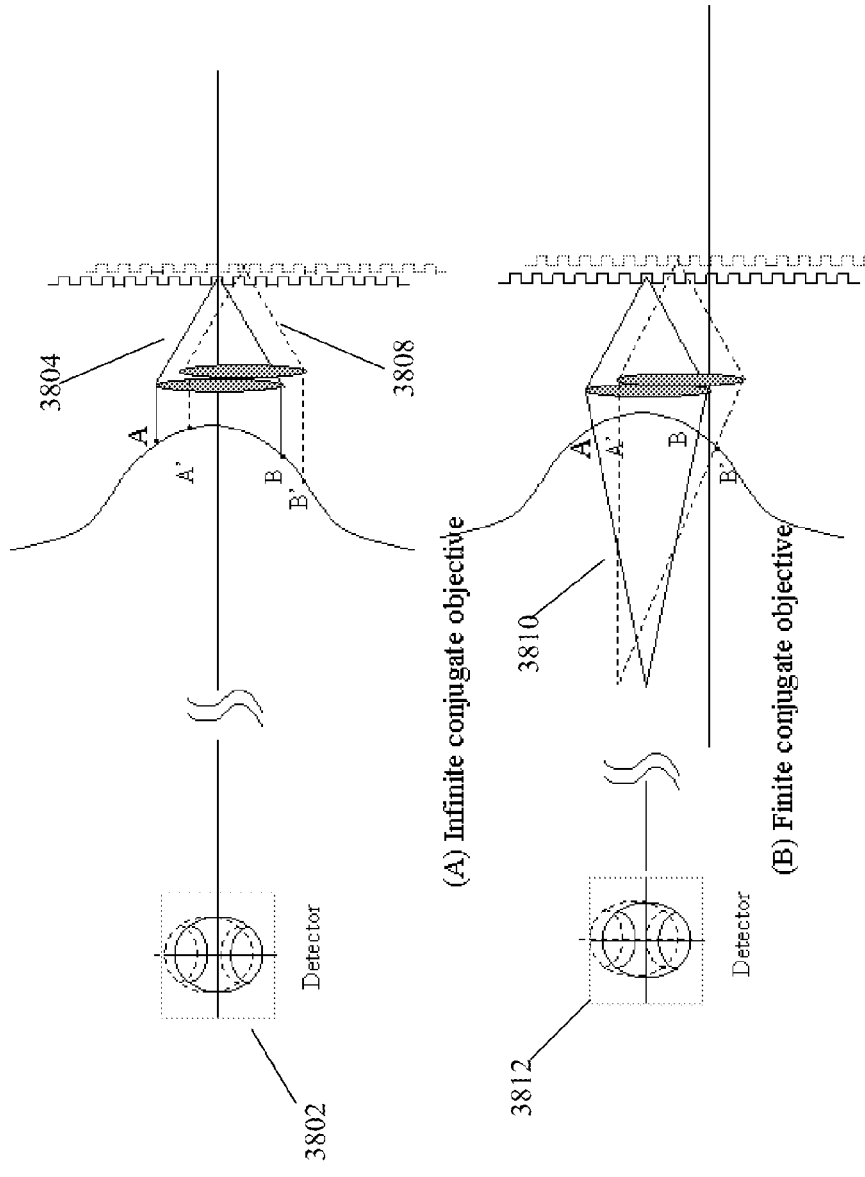
Fig 38   Optical vignetting effect, causing amplitude imbalance and beam walking on the detector, resulting in tracking offset.

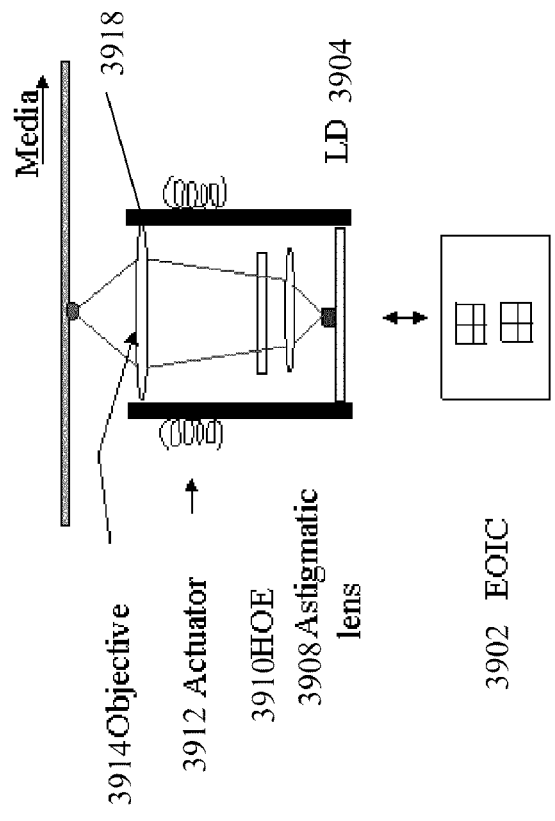
Fig 39 Highly integrated PUH designs. The HOE can be a grating or hologram

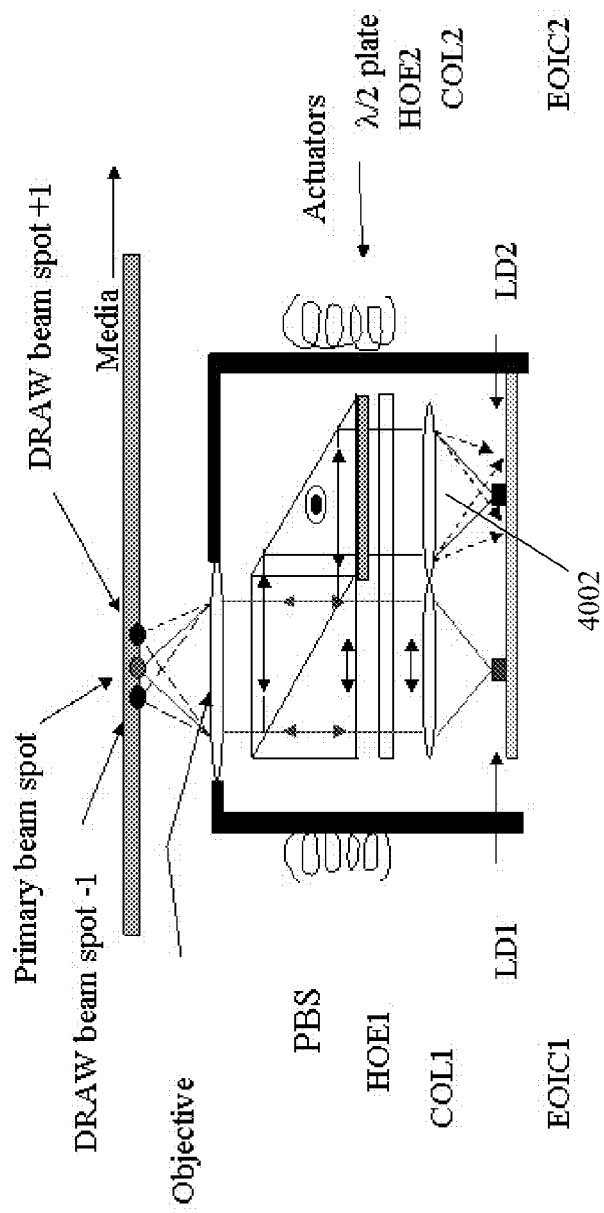
Fig 40 Compact integrated PUH incorporating the feature of *Direct Read After Write*.

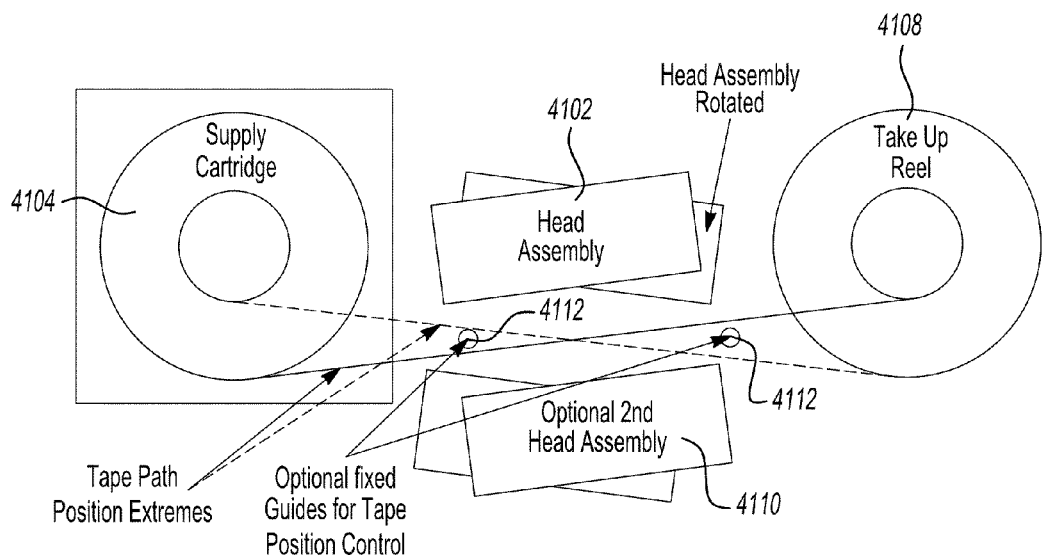
Fig-41
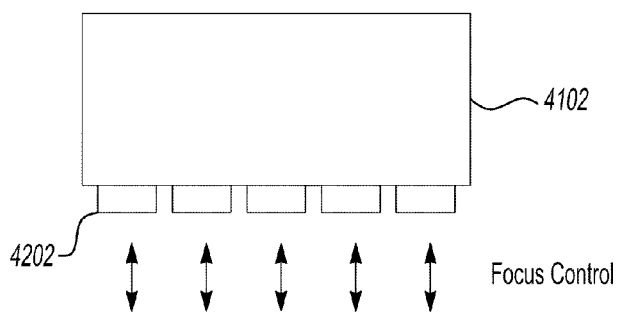
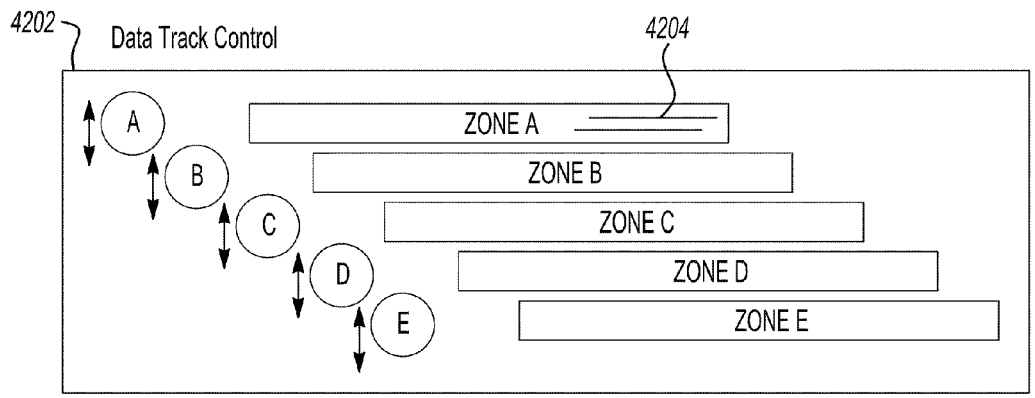
Fig-42

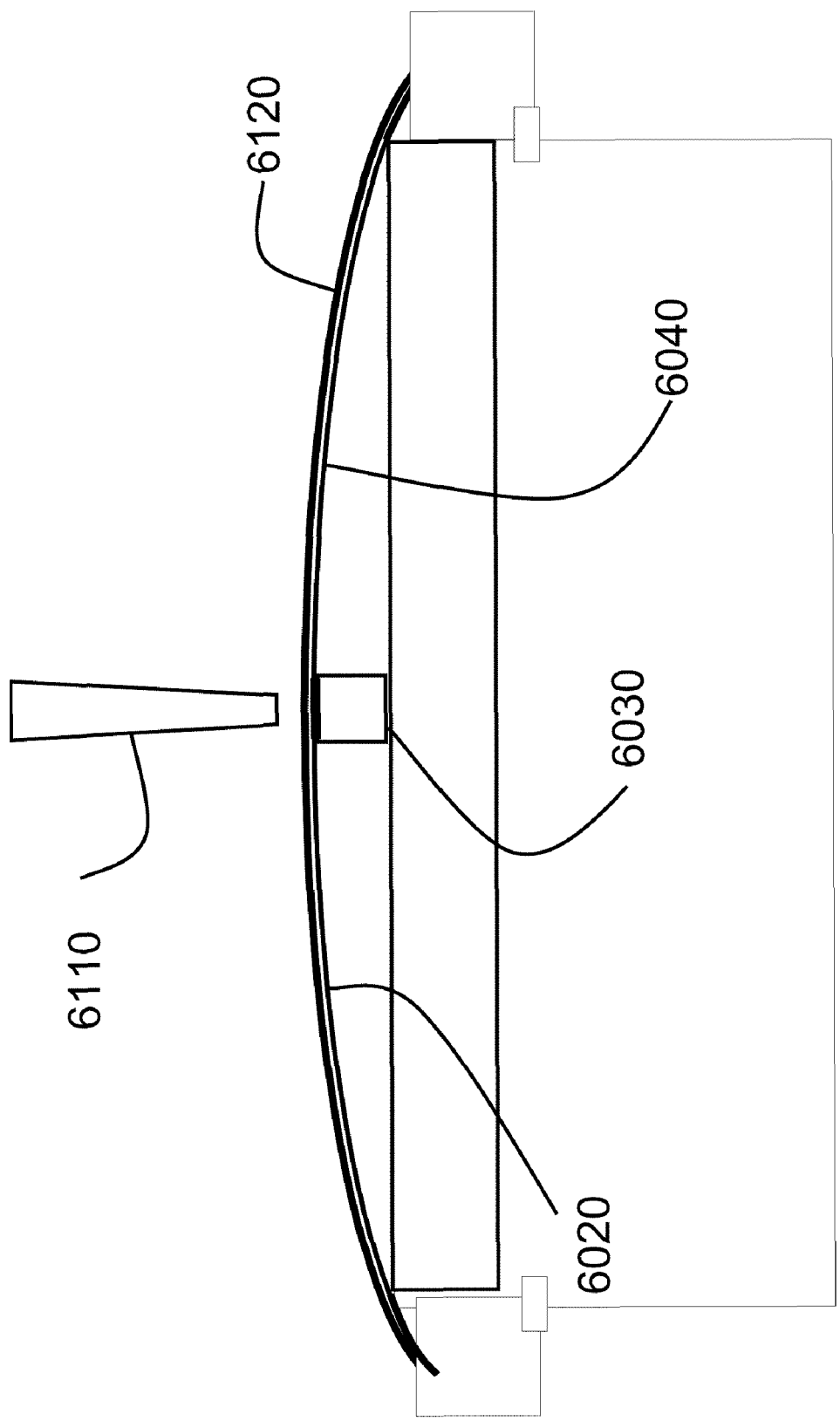

FIG 65: Stamper configuration for sub-micron embossing

FIG 66: Cross section of stamper and the fine alignment arrangement

FIG 67 Automated alignment using a closed loop system incorporating a piezoelectric transducer, a pickup head, and the processing electronics

DATA STORAGE SYSTEM AND METHOD FOR CALIBRATING SAME

BACKGROUND

An optical pick-up unit may not be able to maintain focus on certain defects of an optical media.

SUMMARY

Disclosed herein are aspects of optical tape technology, tape manufacturing, and tape usage. Methods and systems of tape technology disclose optical tape media including: configurations, formulations, markings, and structure; optical tape manufacturing methods, systems, and apparatus methods and systems including: curing processes, coating methods, embossing, drums, testing, tracking alignment stamper strip; optical tape methods and systems including: pick up head adapted for the disclosed optical tape; and optical tape uses including optical storage media devices for multimedia applications.

A data storage system may include an optical media having a defect and a plurality of tracks on each side of the defect exhibiting (i) fields of modulated wobble indicative of defect location information next to the defect and (ii) fields of modulated wobble indicative of data. The data storage system may also include an optical pick-up unit configured to read the fields of modulated wobble, and at least one controller operatively arranged with the pick-up unit. The at least one controller may be configured to, in response to the pick-up unit detecting defect location information on one side of the defect, command movement of the media in a first direction such that the pick-up unit is positioned adjacent to the fields of modulated wobble indicative of data on the other side of the defect.

All documents mentioned herein are hereby incorporated in their entirety by reference.

BRIEF DESCRIPTION OF THE FIGURES

FIGS. 7A and 7B are cut away views representative of an optical media stack-up of a possible embodiment of the invention.

FIGS. 8A and 8B includes images of optical media showing a dark spot with surrounding a bright ring.

FIG. 9 is an image of write bright and write dark media.

FIG. 29 shows an embodiment of a direct read after write (DRAW) optical tape pickup.

FIG. 31 shows an embodiment of a holographic optical element used for the secondary beam in an optical tape system.

FIG. 32 shows an embodiment of a holographic optical element used for the DRAW beam in an optical tape system.

FIG. 33 shows an embodiment of an orientation of a first laser diode and a second laser diode in an optical tape system.

FIG. 34 shows an embodiment of a DRAW optical tape pickup head with the first and second electro-optic integrated circuit integrated into one chip.

FIG. 35 shows an embodiment of a compact DRAW optical tape pickup head.

FIG. 38 shows an embodiment of an optical vignetting effect.

FIG. 39 shows an embodiment of an integrated optical tape pickup head design.

FIG. 40 shows an embodiment of an integrated optical tape pickup head with the addition of a direct read after write feature incorporated.

FIG. 41 shows an embodiment of a re-orientation of the optical head transport facility at the tape position extremes.

FIG. 42 illustrates an embodiment of an optical tape pick up head transport facility showing a plurality of head channels with independent focus and track control.

FIG. 61 is an end view of the embodiment of FIG. 60 in use with tape media and a media head.

DETAILED DESCRIPTION

Optical tape technology, manufacturing, and application may be highly interconnected to achieve cost, performance, density, and other goals required to deliver a commercially viable solution. A goal such as low manufacturing cost while also manufacturing reliable, high quality optical tape may require substantial innovation in manufacturing technology methods and systems. To produce optical tape that supports high density storage and high performance may require substantial innovation in tape technology as well as manufacturing methods and systems. Therefore, the methods and systems of manufacturing the optical tape herein disclosed may be used to make the optical tape herein disclosed, and the methods and systems of optical tape usage herein disclosed may be used to utilize the optical tape herein disclosed.

Disclosed herein are aspects of optical tape technology, tape manufacturing, and tape usage. Methods and systems of tape technology disclose optical tape media including: configurations, formulations, markings, and structure; optical tape manufacturing methods, systems, and apparatus methods and systems including: curing processes, coating methods, embossing, drums, testing, tracking alignment stamper strip; optical tape methods and systems including: pick up head adapted for the disclosed optical tape; and optical tape uses including optical storage media devices for multimedia applications.

An optical servo mark on an optical tape media, generated using a method that results in the optical servo mark being distinguishable from data marks on the optical tape media, as described herein may be used in an optical data storage tape drive.

Figure 1:
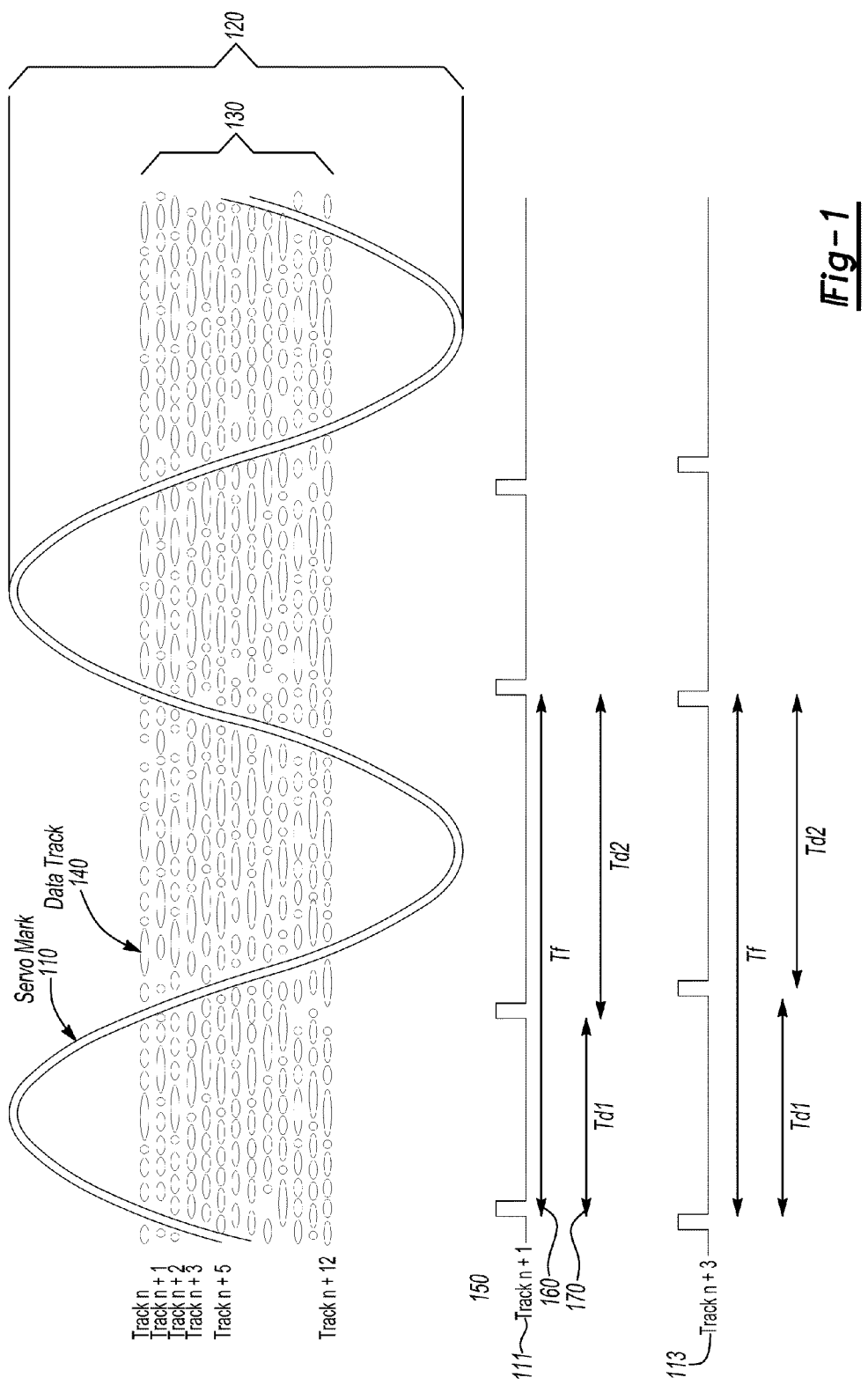
FIG. 1 is a plan view of an optical media including an optical servo mark and data tracks.

Referring to FIG. 1, optical servo mark 110 may be a repetitive, substantially sinusoidal (or sow tooth) pattern spanning a height 120 equal to or greater than a band of optical tracks 130. Servo mark 110 may be optically distinguishable from data marks 140. A method for making servo mark 110 optically distinguishable includes making servo mark 110 much wider than data marks 140.

Optical servo mark 110 can be included on optical media by using one or more optical heads (not shown) to mark the optical media. The process for marking the optical media may include one or more of Phase Changing, Burning, or Grooving. The process may include using either an optical servo track writing device, or an optical storage media drive. Methods of generating optical servo mark 110 includes controlling the one or more optical heads with a signal generator set to a frequency that generates optical servo mark 110 in sinusoidal pattern as the optical media moves under the one or more optical heads with a constant linear speed. The frequency of the signal generator may be chosen such that it would meet the sampling requirement of a servo tracking system of a tape drive system on which the optical media would be used.

The one or more optical heads may each be dedicated to the band of tracks 130 on the optical media, each optical head having its own actuator for the purpose of tracking and focusing within band 130. The range of motion of each head may overlap bands of adjacent optical heads.

Once the optical media may be completely marked, an optical head reading along data track 140 will detect servo mark 110 as a pattern of read pulses 150 as the marked media passes by the optical head. Pulse read pattern 150 has a frequency 160 defined by the servo mark 110 pattern and the speed of the tape as it moves by the optical head.

Pulse read pattern 150 also has a duty cycle 170 which may be proportional to the position of the head relative to the edge of the band dedicated to that head. Frequency 160 of the pulse read pattern 150 may be substantially the same for all head positions across the band of tracks. Duty cycle 170, calculated by the equation (Td1/Tf) % may be different for each track as shown by read pulse patterns 111 and 113.

Pulse read pattern 150 may be used to position the optical head in a substantially stationary manner over any desired track. A phase lock loop of a predetermined frequency may be used to qualify pulse read pattern 150 in positioning the optical head.

A method for generating a tracking servo pattern on optical tape media, as described herein may be performed using an adapted optical tape processing apparatus herein described.

Figure 2:
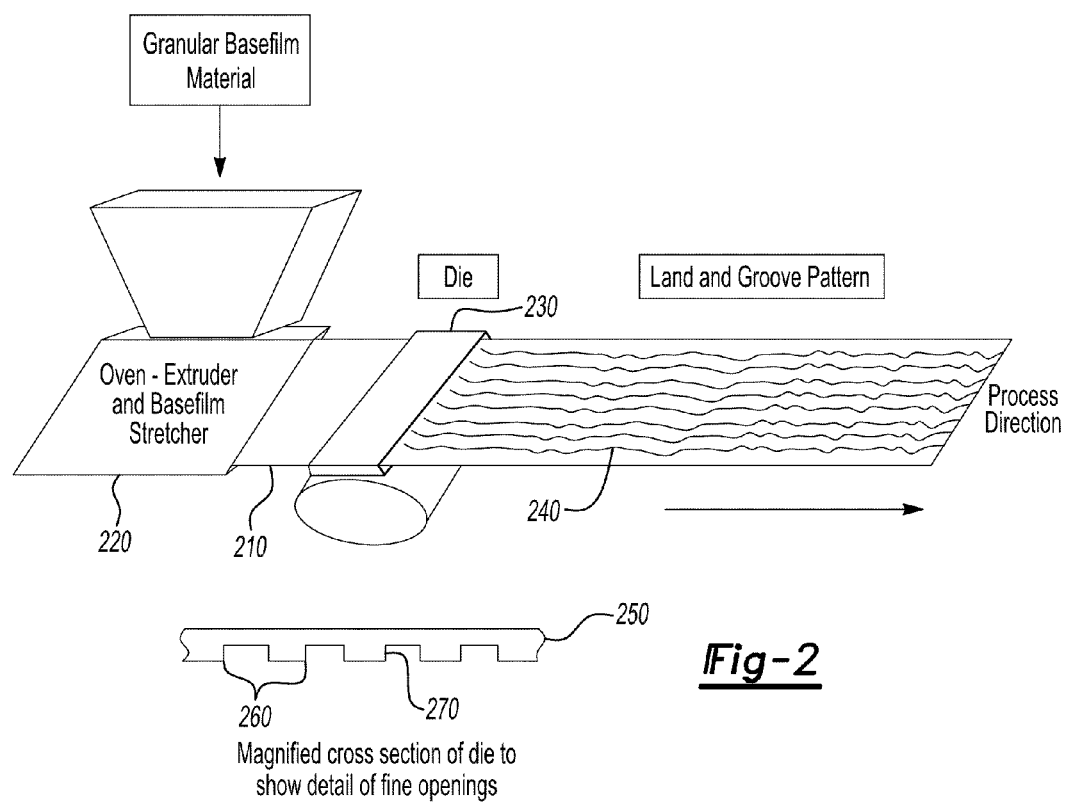
FIG. 2 is a perspective view of an optical media processing system.

Referring to FIG. 2, optical media base film 210 may be prepared for use through a base film oven-extruder & stretcher 220 to deliver optical media base film 210 in a predetermined thickness and tensile strength. The optical media base film 210 may be then processed through a die 230 consisting of a plurality of fine feature and pitch openings 250 that contact a side of the base film 210. Die 230 constructs alternating high and low grooves 240 that may be narrow in width and run along substantially the full length and across substantially the full width of base film 210.

Additionally die 230 can move from side to side, substantially perpendicular to the axis of motion of base film 210, as well as up and down, substantially perpendicular to the plane of base film 210. The motion of base film 210 through die 230 results in a pattern of fine grooves 240 in base film 210. One possible use of grooves 240 may be for servo tracking.

The up and down motion of die 230 allows precise groove depth control. Carefully controlling the side to side motion of die 230 will generate groves of a predetermined pattern. One such possible pattern may be a sinusoidal pattern which may be known to be beneficial for proper servo tracking. Die 230 can generate a predetermined groove pitch 260 and a predetermined groove depth 270. While die 230 can be constructed for generating a plurality of groove to groove spacing and groove widths, one possible groove to groove spacing may be approximately 0.74 um.

Optical tape media, as herein described may be constructed to support write-once read many operation, or re-writable operation. The operation supported may be partially determined by the type of layer material and the order of layers in the optical tape media.

Figure 3:
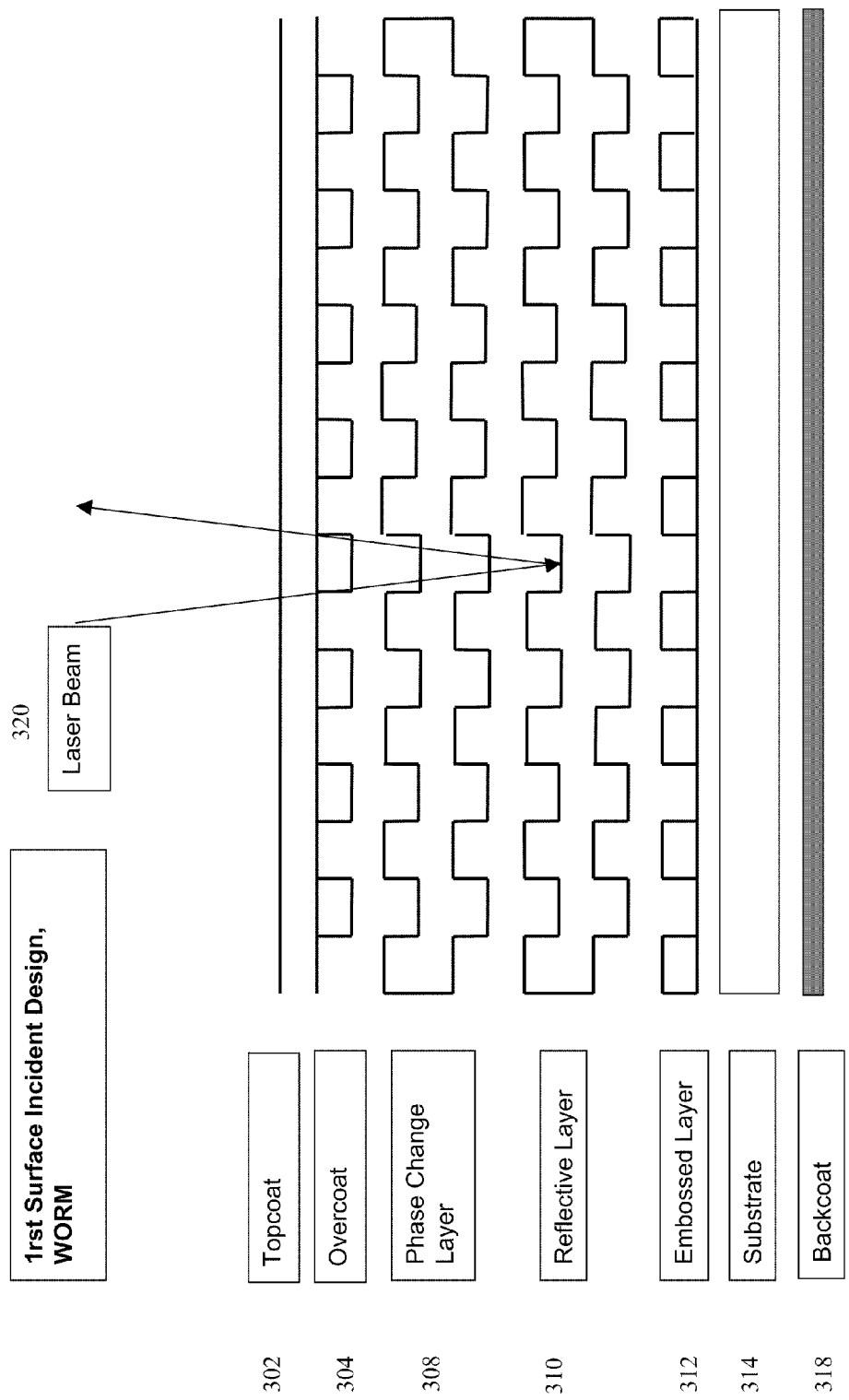
FIG. 3 shows an embodiment of a first surface incident (air-incident) WORM media layers.

Referring to FIG. 3, an embodiment of a first surface incident (air-incident) WORM optical tape media includes a topcoat 302, an overcoat 304, a phase change layer 308, a reflective layer 310, an embossed layer 312, a basefilm or substrate 314, and a backcoat 318.

Topcoat 302, an organic, scratch-resistant film applied by a sputter process, provides a protective layer for the other layers of the media. Topcoat 302 may include anti-reflective properties (e.g. low index of refraction) to prevent unwanted reflections of laser light 320 from layers within the media.

In the possible embodiment of FIG. 3, overcoat 304 may be an optically transparent, near zero absorption protective layer, made from material such as ZnS (tradename ZS80). Alternatively overcoat 304 may also contain $SiO_2$ or other such materials that may protect lower layers from physical damage. Overcoat 304 may be applied by a sputter process and may include anti-reflective material to allow laser light 320 to penetrate through it more efficiently.

In this possible embodiment, the phase change coating 308 may be a phase-change alloy such as Ge—Sb—Te, (germanium-antimony-tellurium), however other phase change materials known as a write-bright phase change material may be included. Write-bright material changes from an amorphous to a crystalline phase when subjected to sufficient heat from laser 320. Once changed, the composition of the material prevents it from changing back to the amorphous phase. The resulting crystalline spots, being more reflective than the surrounding amorphous material, creating a high contrast against the surrounding area, may be means for storing data in the WORM optical tape media. Phase change film 308, in this possible embodiment, may be created using a sputter process.

Reflective layer 310, made of a metal material such as aluminum, or antimony, reflects light from laser 320 that passes through phase change layer 308. Reflective layer 310 may be created using an electron-beam, may be thermally evaporated, may be sputtered, may be ion beam deposited, or a like process. Reflective layer 310 further attenuates light from above, and it also reflects light from below, thus attenuating and blocking any light from above and below from passing through and mixing with laser light 320, which may introduce noise in the nominal reflected laser light 320. Reflective layer 310 may also aid in the crystallization of phase change 308, creating a suitable thermal profile by facilitating nucleation.

Embossed layer 312, contains the physical land and groove structures used for servo tracking. Embossed layer 312 may be formed from a monomer fluid by a drum embossing and UV curing apparatus where it may be embossed with the land and groove structures and cured at the same time. While curing, it coverts from a liquid monomer to a solid polymer and may be permanently attached to substrate 314.

Below embossed layer 312 may be substrate or basefilm 314 which provides mechanical support. Basefilm 314 may be created from a high-performance thermoplastic polyester film such as polyethylene naphthalate (PEN), polyethylene terephthalate (PET), or similar material having appropriate mechanical, thermal, and hydroscopic properties for a data storage product.

A backcoat 318 may be deposited on a back side of basefilm 314. Backcoat 318 may be a partially conductive layer to minimize the buildup of static charge, and has a textured surface acting as a conduit to release entrapped air generated during tape subsystem operation. In addition, backcoat 318 optical properties absorb and scatter incident laser light 320 that penetrates reflective layer 310. Backcoat 318 may be one of a material selected from a set including carbon black film created by slurry-coating, aluminum sputtered layer, and nickel chromium sputtered layer.

In an embodiment, the possible embodiment of FIG. 3 may be used for multi-wavelength readback to the optical head.

Figure 4:
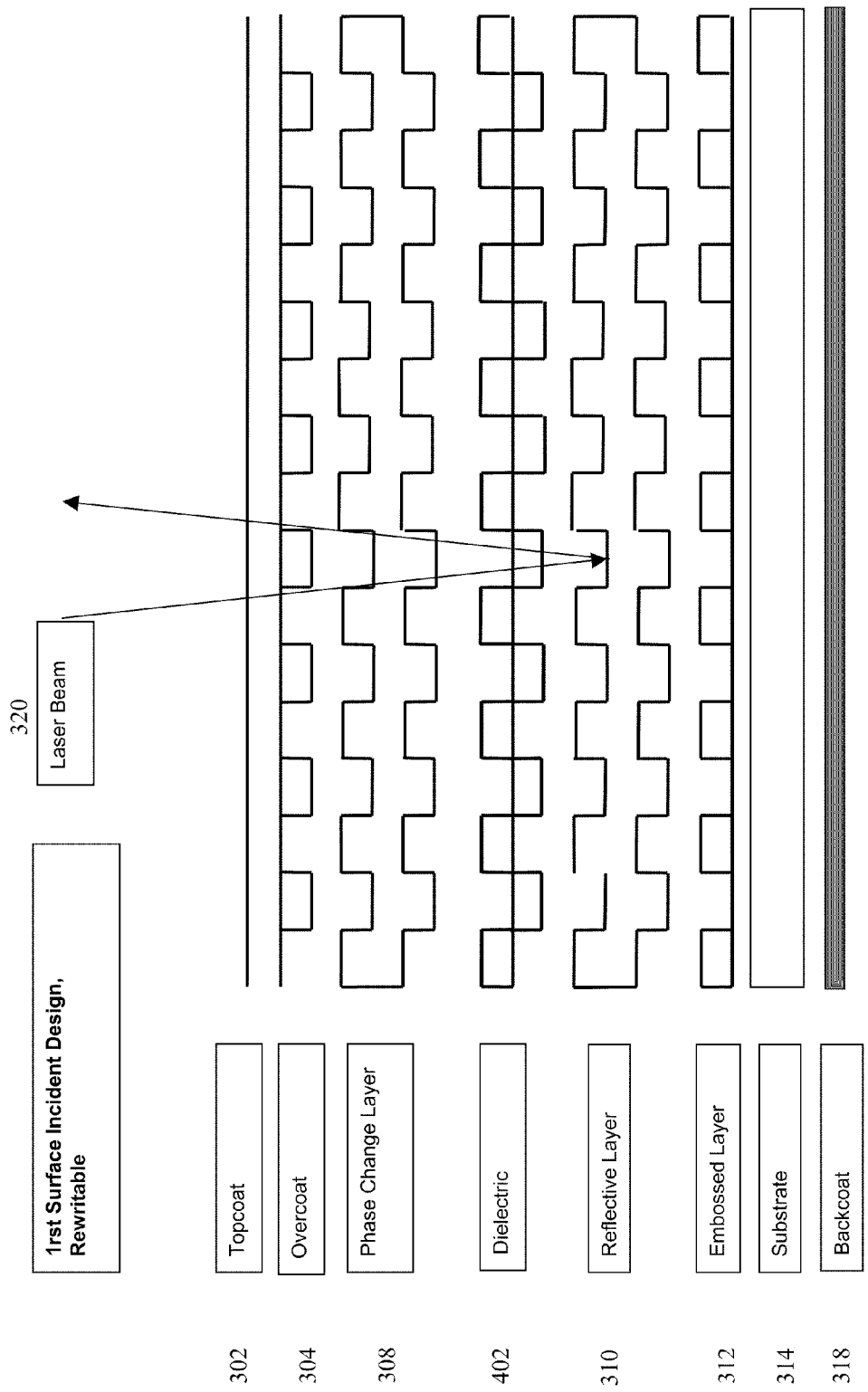
FIG. 4 shows an embodiment of a first surface incident (air-incident) rewritable media layers.

Referring to FIG. 4, an embodiment of a first surface incident (air-incident) rewritable optical tape media may be shown. In the embodiment of FIG. 4, a dielectric material 402 may be inserted between phase change layer 308 and reflective layer 310. Dielectric layer 402 restricts heat in phase change layer 308 to a small volume in order to facilitate a write and erase process. Dielectric layer 402 may consist of ZnS, SiO2, or like material and may be created by a sputter process. The thickness may need to be such that it may be optically transparent.

In the media of possible embodiment of FIG. 4, phase change layer 308 may be composed of a crystalline material that allows the use a write-dark technique. The write-dark technique uses a high intensity laser to convert areas of the crystalline material into non-reflective areas resulting in a written data mark, and uses a medium intensity laser to erase the data mark by returning it to its crystalline state.

Figure 5:
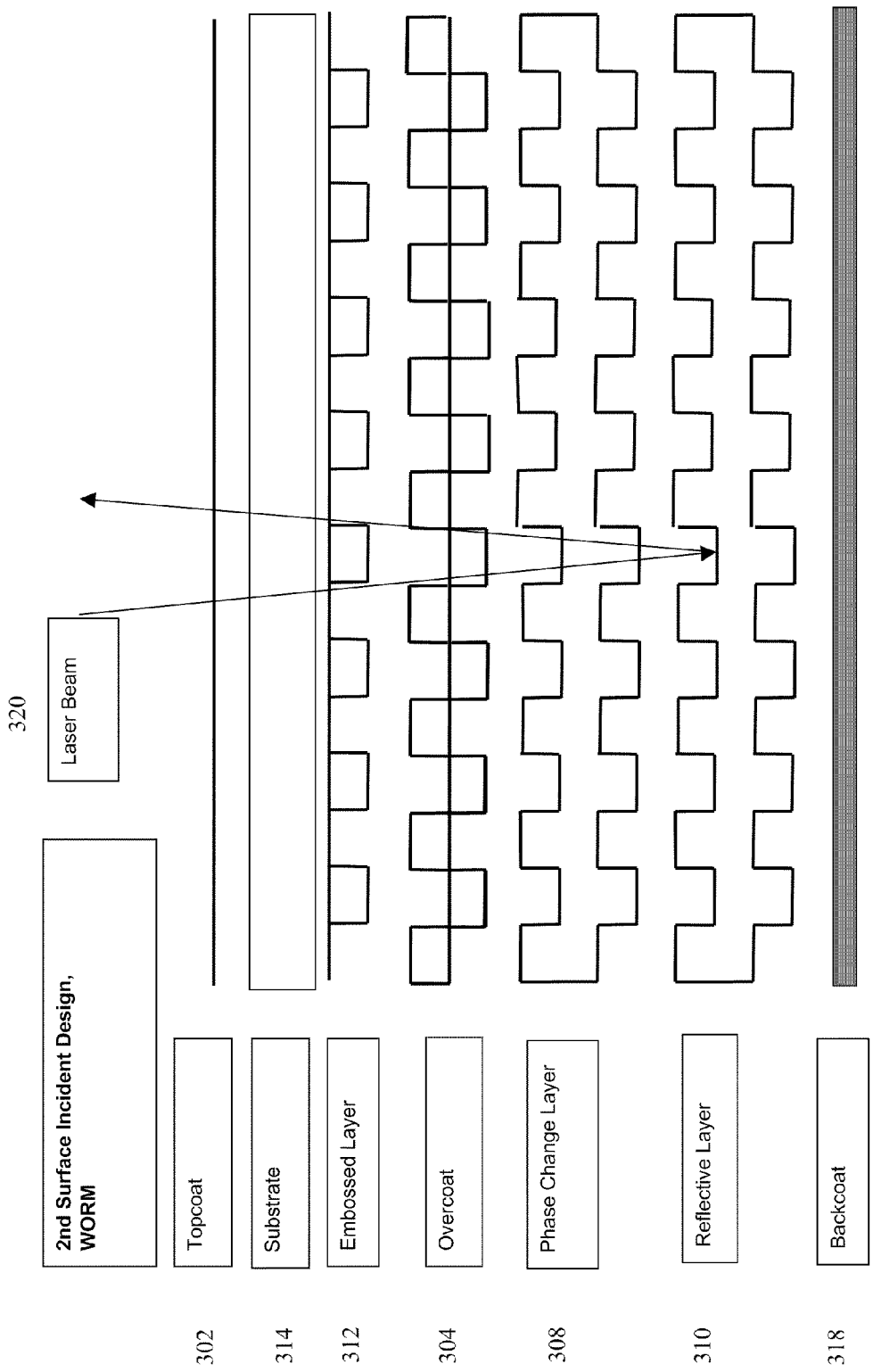
FIG. 5 shows an embodiment of a second surface incident (basefilm-incident) WORM media layers.

Referring to FIG. 5, an embodiment of a second surface incident (basefilm-incident) media, an alternate ordering of the layers of FIG. 3 may be shown. In this embodiment laser light 320 may travel through topcoat 302, basefilm 314, embossed layer 312, and overcoat 304, be reflected by phase change layer 308, and travel back to the optical head detector. The order of the layers in this media may be topcoat 302, substrate or basefilm 314, embossed layer 312, overcoat 304, phase change layer 308, reflective layer 310, and backcoat 318.

The embodiment of FIG. 5 provides the advantage of keeping any contaminants on topcoat 302 out of the focal plane of laser 320. Additionally, basefilm 314 may be an optically transparent, low-birefringence material in order to prevent distortion of laser 320 as it travels through the basefilm 314. A suitable material for basefilm 314 may be polycarbonate, Spaltan PET, or the like.

Figure 6:
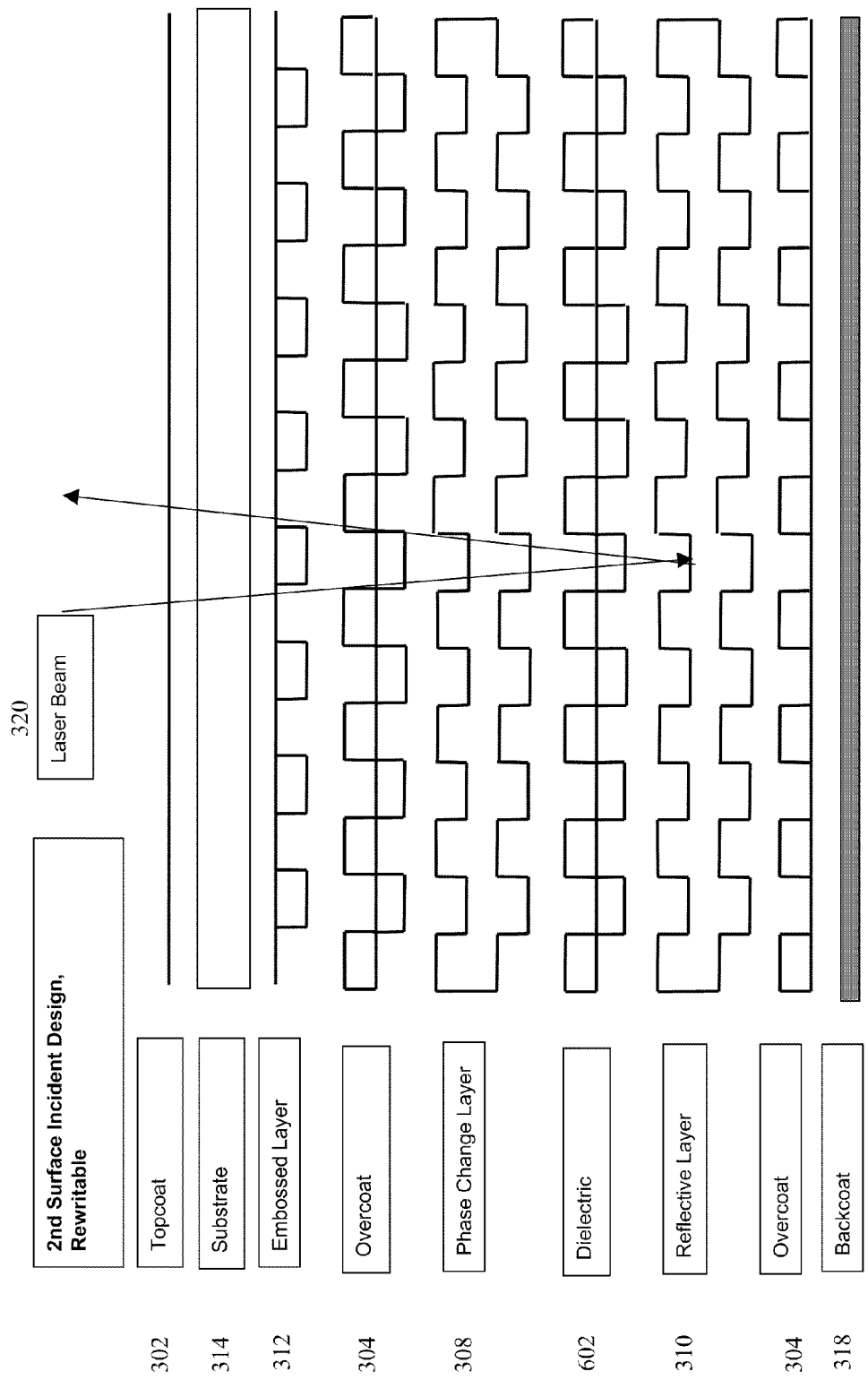
FIG. 6 shows an embodiment of a second surface incident (basefilm-incident) rewritable media layers.

Referring to FIG. 6, an embodiment of a second surface incident (basefilm-incident) rewritable media may be shown. This embodiment includes dielectric layer 602 between phase change layer 308 and reflective layer 310. Dielectric layer 602 restricts heat in phase change layer 308 to a small volume in order to facilitate a write and erase process. Dielectric layer 602 may consist of ZnS, SiO2, or like material and may be created by a sputter process. The thickness may need to be such that it may be optically transparent.

Optical tape media may be adapted as herein described to allow high optical contrast as a result of the media transitioning between non-crystalline and crystalline phases.

Referring to FIG. 7A, a possible embodiment of the invention includes phase change media stack 710 having a conventional geometry which includes first a thin metal layer 720 on a plastic or glass substrate 730, then a phase change layer 740, and then a dielectric layer 750. Phase change media stack 710 may be good for configurations that use an air-incident laser beam 760. Referring to FIG. 7B, an alternate possible embodiment including an alternate stacking of the layers of FIG. 7A may be suited for substrate-incidence laser 770 configurations.

In the possible embodiment of FIGS. 7A and 7B, when metallic layer 720 may be antimony (Sb), phase change layer 740 may be Te—Ge—Sb (tellurium germanium-antimony) ternary alloy, and dielectric layer 750 may be ZnS/SiO2, media stack 710 exhibits unique write characteristics.

Referring to FIG. 8A, a relatively long write-pulse (approximately 50 ns or longer) at relatively low laser write powers, applied to media stack 10-110 results in a written spot 810 that has higher reflectivity than the unwritten surroundings 820. In particular, with a relatively long write-pulse at relatively low laser write powers the material reaches crystallization temperature, which may be lower than the melting temperature and crystallization will take place resulting in a write bright spot 810.

Referring to FIG. 8B, a relatively short write pulse (approximately 20 ns or less), and relatively high laser write power, cause both write bright and write dark, which includes written spot 830 consisting of a dark center surrounded by a bright ring. The bright ring may be caused by partial crystallization of the phase change material.

Referring to FIG. 9, at the relatively high laser write power, phase change layer 740 reaches its melting point near the write pulse peak, and surface tension of the molten material draws the material away from the laser pulse into a crystallized bright ring 910 and forms a crater 920. The crater may be permanent as the material cools off quickly with the removal of the laser pulse. The contrast of crater 920 to bright ring 910 may be far superior to the traditional bright spot 810 in FIG. 8A and its unwritten surroundings.

Figure 10:
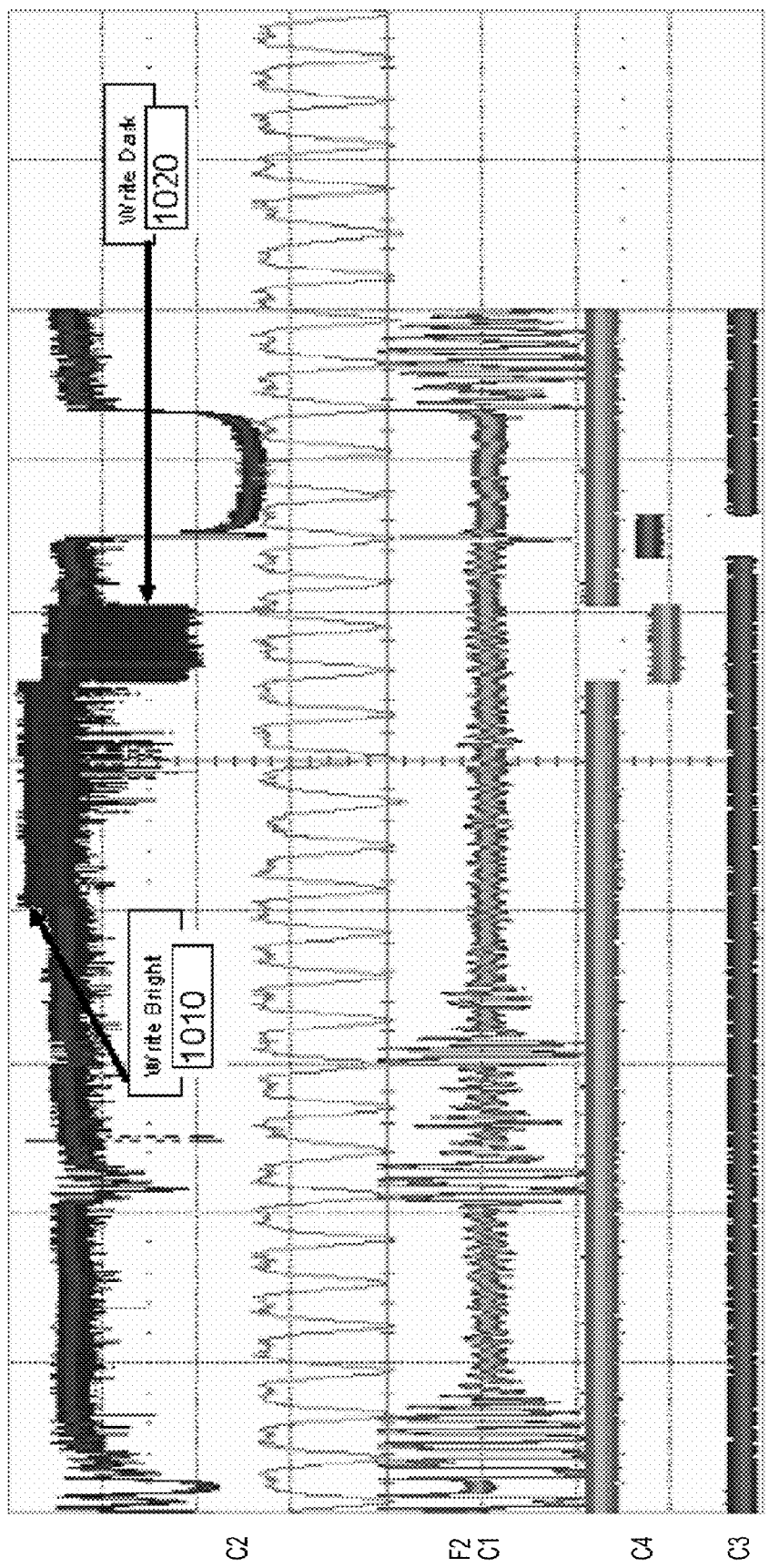
FIG. 10 is a signal comparison of write bright and write dark.

Referring to FIG. 10, a comparison of signal measurements generated by write bright 1010 and write dark 1020 shows the superior contrast of write dark 1020 represented by the larger amplitude waveform.

An optical tape system may include a servo tracking system as herein described for use with optical tape media employing a preformatted track layout.

Figure 11:
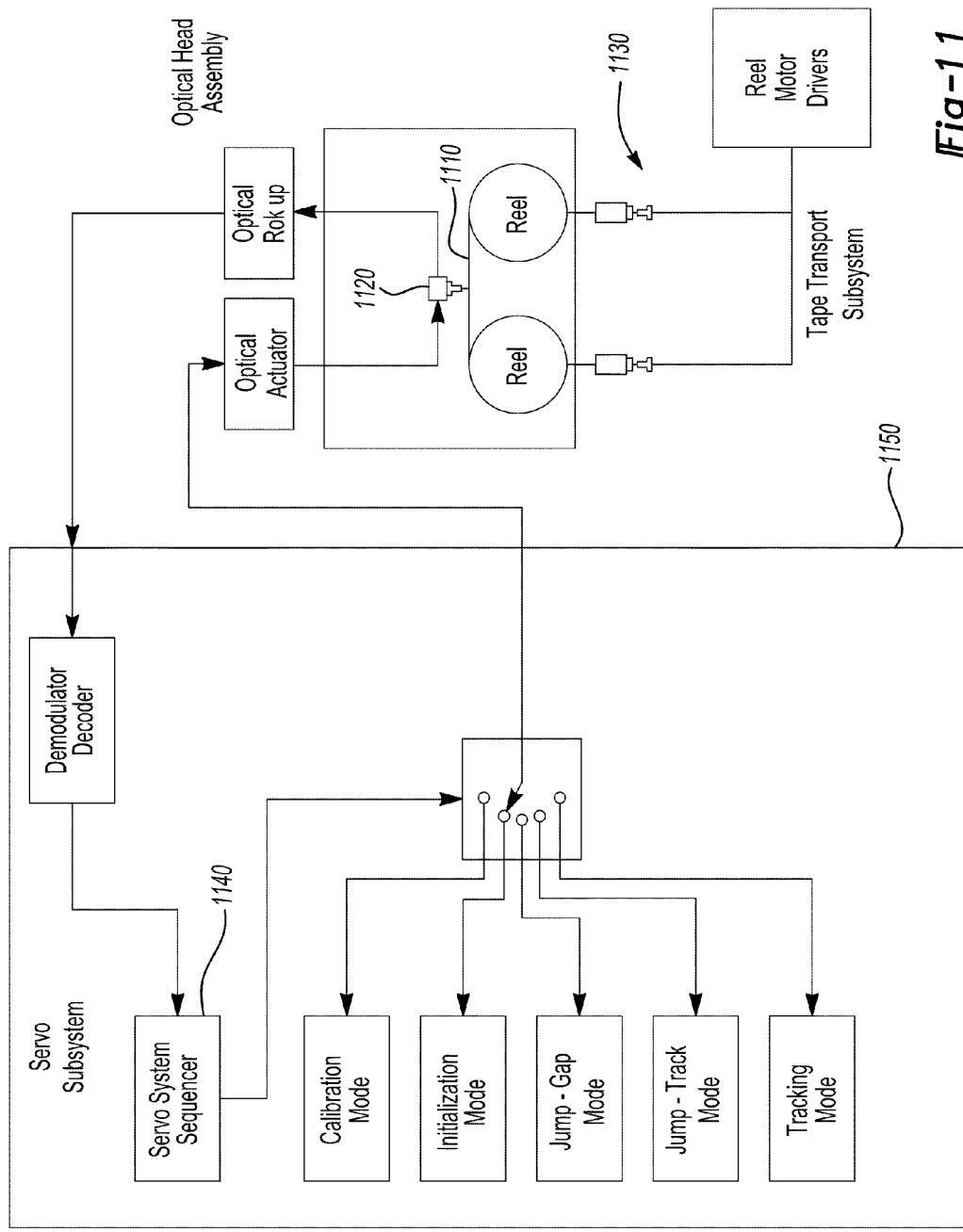
FIG. 11 is a block diagram of a possible embodiment of the invention.

Referring to FIG. 11, the formatted optical media 1110 may have a segmented track layout. A tape transport subsystem 1130 moves media 1110 at a substantially constant speed relative to a data/servo optical sensing element 1120. Servo system sequencer 1140 receives a signal from sensing element 1120 which represents information detected from optical media 1110. Using the information detected, sequencer 1140 selects an operating mode for servo system 1150 from a set including Initialization, Calibration, Tracking, Jump-gap, and Jump-track.

In Initialization mode, servo system 1150 performs initialization steps. In Calibration mode, servo system 1150 may determine optimum settings for Jump-gap, Jump-track, and Tracking mode. Initialization and Calibration modes may take place during servo system 1150 power-up.

Figure 12:
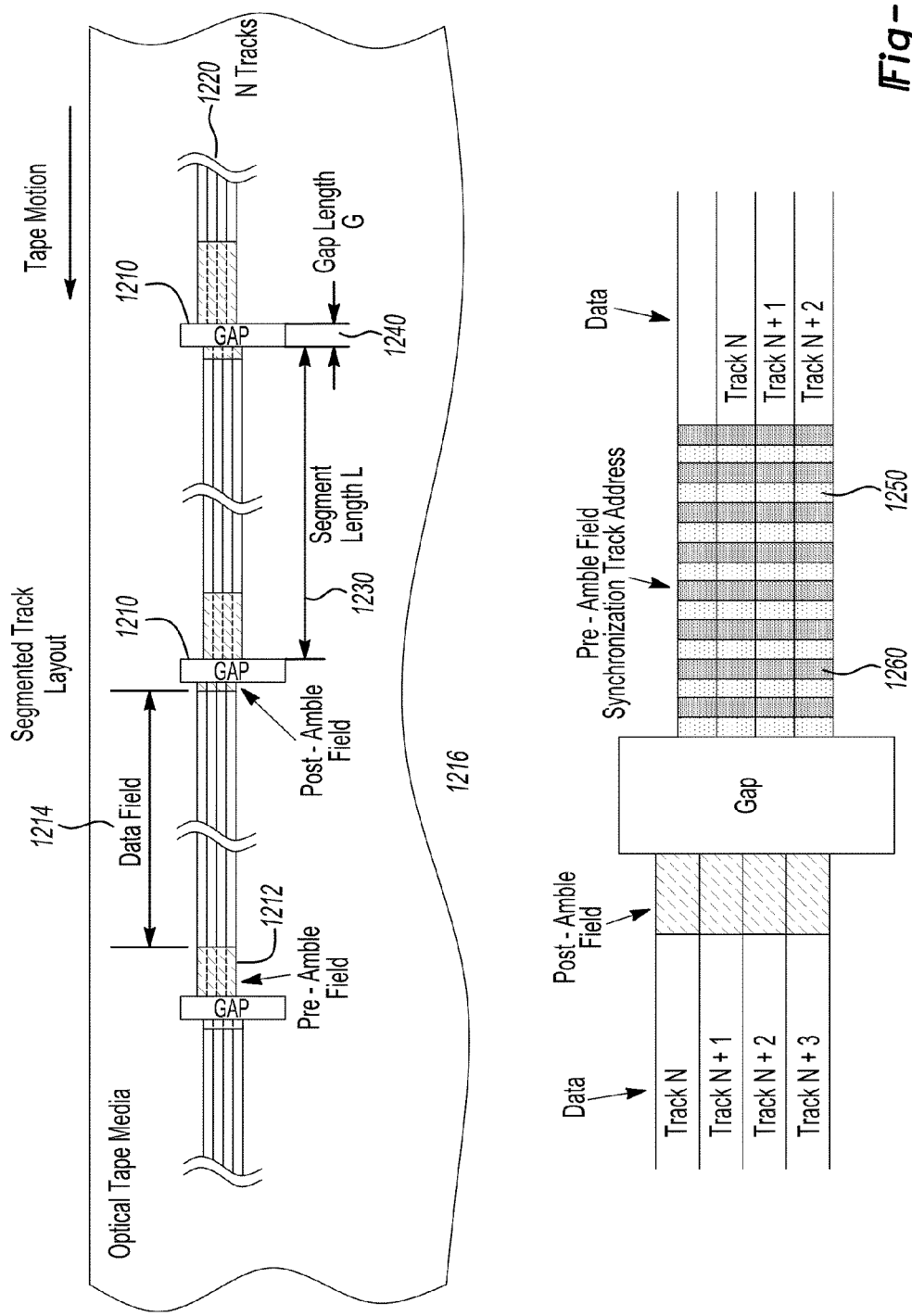
FIG. 12 is a schematic diagram of a possible embodiment of the sections of optical media of the invention.

Referring to FIG. 12, a segment 1210 on media 1110 includes tracks 1220 with length 1230. Segments 1210 may be separated by gaps (defects) of length 1240. Within segment 1210, tracks 1220 each exhibit fields of modulated wobble indicative of, for example, a Pre-amble 1212, Data 1214, or Post-amble 1216, with Pre-amble 1212, in one embodiment, including a plurality of Synchronization 1250 and Address 1260 subfields. Post-amble 1216 field may provide a padding area after the end of Data 1214 and may include the same types of information as Pre-amble 1212. These fields appear sequentially to servo system 1150 as media 1110 moves across optical sensing element 1120, which is configured to read the fields of modulated wobble. Because Pre-amble 1212 and Post-amble 1216 straddle the gap, the detection of either by optical sensing element 1120 may signal servo system 1150 that optical sensing element 1120 is approaching (in the case of Post-amble 1216) or traveling away from (in the case of Pre-amble 1212) the gap. Pre-amble 1212 and Post-amble 1216 thus convey gap location information.

During Initialization and/or Calibration modes, servo system 1150 may perform the following steps to learn where to position optical sensing element 1120 in the direction of travel along media 1110 after a Jump-gap is performed. Assuming that in this example Data 1214 is initially positioned adjacent to optical sensing element 1120, servo system 1150 may command movement of media 1110 (from right to left) until optical sensing element 1120 detects Post-amble 1216. Upon detecting Post-amble 1216, servo system 1150 may further command, for a predetermined period of time (during which sensing element 1120 is not attempting to focus on media 1110), movement of media 1110 (from right to left) such that the approaching gap and Pre-amble 1212 eventually pass optical sensing element 1120, and Data 1214 on the other side of the gap is positioned adjacent to optical sensing element 1120. The predefined time ("first time") for this commanded movement may be pre-loaded into servo system 1150 based on specifications associated with media 1110. Other techniques such as testing, etc. may also be used to learn the time needed to accomplish such positioning. Servo system 1150 may then command optical sensing element 1120 to refocus. Once optical sensing element 1120 is refocused on Data 1214, servo system 1150 may command movement of media 1110 in the opposite direction (from left to right) such that the gap passed earlier begins to approach optical sensing element 1120. Servo system 1150 may continue commanding this movement of media 1110 and may track the time ("second time") associated with this movement until optical sensing element 1120 detects Pre-amble 1212 or losses focus. Upon detecting Pre-amble 1212, servo system 1150 may record a linear position of media 1110 relative to optical sensing element 1120 and/or record the "second time." If, instead, optical sensing element 1120 loses focus and cannot refocus, servo system 1150 may identify media 1110 as defective.

Because the gaps of media 1110 repeat periodically (as discussed herein, media 1110 is embossed by an embossing drum having gaps—thus, for example, ten rotations of the drum will produce ten sets of repeating gaps on media 1110), the above steps may be performed for each of the gaps of the periodic set. Servo system 1110 may determine which gap of the set it is encountering based on information in Pre-amble 1212 and/or Post-amble 1216 assuming that each gap of the periodic set is associated with a unique Pre-amble 1212 and/or Post-amble 1216.

Servo system 1150 now has information to determine where to position optical sensing element 1120 at the completion of a Jump-gap operation. For example, assuming servo system 1150 commands movement of media 1110 (in either direction) at a generally constant rate, the difference between the "first time" and "second time" may be taken to determine a duration of time for moving media 1110 during a Jump-gap operation (during which optical sensing element 1120 is not attempting to focus on media 1110). The linear distance to be traveled by media 1110 during a Jump-gap operation may instead/also be determined by taking the difference between (I) the product of the "first time" and the rate of movement of media 1110 during the "first time" and (ii) the product of the "second time" and the rate of movement of media 1110 during the "second time." Other scenarios are also possible.

Figure 13:
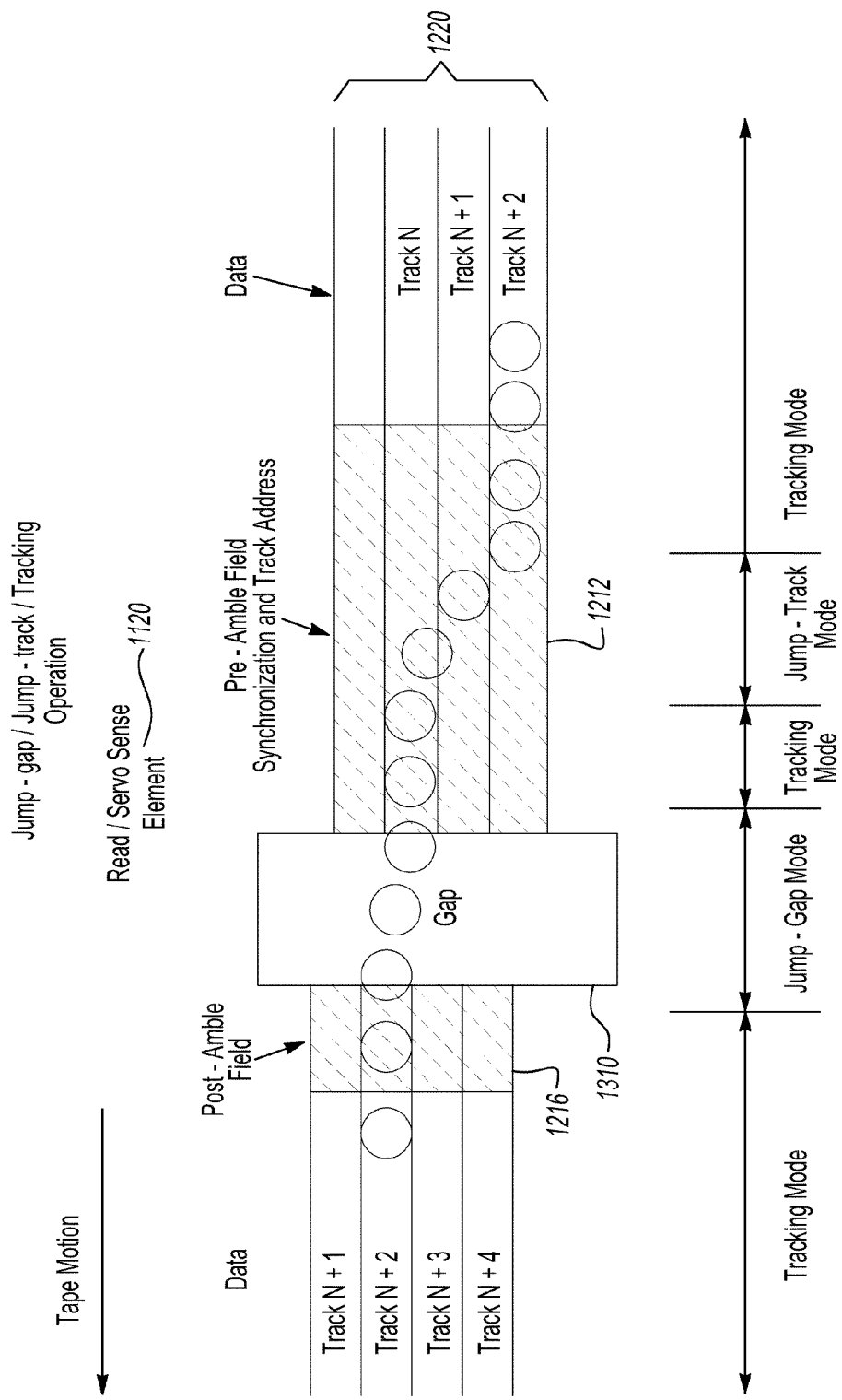
FIG. 13 is a time lapse diagram showing a sequence of possible operating modes and the possible relative motion of the read/servo sense element.

Referring to FIGS. 11 and 13, sequencer 1140 changes selection from Tracking mode to Jump-gap mode when Post-amble 1216 is detected by sensing element 1120. When in Jump-gap mode, a Jump-gap motion over Gap 1310 using the settings determined while in Calibration mode discussed above may be performed. The Jump-gap motion positions sensing element 1120 over an estimated track location and Tracking mode may be initiated.

Since tracks 1220 may not line up across gap 1310, during Initialization and/or Calibration modes servo system 1150 may perform the following steps to learn which post-gap track is most closely aligned with a given pre-gap track. While focused on a particular track (which may be next to an edge of media 1110) having a specified physical address and prior to encountering the first gap of the repeating set of gaps, servo system 1150 may command movement of media 1110 in a first direction (from right to left) and record the specified physical address of the particular track. Upon detecting Pre-amble 1214, servo system 1150 may command optical sensing element 1120 to generally maintain its position as media 1110 (and thus gap 1310) moves past sensing element 1120 (during which time, of course, sensing element 1120 is not attempting to focus on media 1110). Once gap 1310 has passed by optical sensing element 1120, servo system 1150 may command sensing element 1120 to refocus and determine/record the physical track address of the post-gap track it is focused on. Servo system 1150 may determine the duration during which optical sensing element 1120 is not to focus on media 1110 while gap 1310 passes by the sensing element 1120 using the techniques described above or any other suitable technique. Because tracks 1220 may not line up across gap 1310, the recorded pre-gap and post-gap track addresses may not be the same. Servo system 1150 may then assign a single logical address to the recorded physical addresses.

Servo system 1150 may continue the above process for each unique gap of the repeating set of gaps. That is, if there are four unique gaps in the repeating set, servo system 1150 may perform the above process four times such that a set of four segmented tracks found to be most closely aligned and having physical track addresses of n, n+1, n−2 and n+3 respectively, for example, will be assigned a single logical address, n*, for example (where n and n* have integer values). This information may be stored to the media 1110 via the optical sensing element 1120 (or stored elsewhere) and/or held in a memory associated with servo system 1150.

To determine a mapping of physical track addresses to logical track addresses for the rest of the tracks of media 1110, servo system 1150 may increment and/or decrement the physical track addresses of the four segmented tracks found to be most closely aligned (using the example above) as well as the corresponding assigned logical address. Specifically (again using the example above), servo system 1150 may respectively increment physical track addresses n, n+1, n−2 and n+3 to n+1, n+2, n−1 and n+4, and increment corresponding logical address n* to n*+1, etc. Table 1 shows an example of such incrementing and/or decrementing to complete the physical to logical address mapping:

TABLE 1

Mapping of physical addresses to logical address

| Physical Track Addresses | Logical Track Address |
|---|---|
| n − 1, n, n − 3, n + 2 | n* − 1 |
| n, n + 1, n − 2, n + 3 | n* |
| n + 1, n + 2, n − 1, n + 4 | n* + 1 |
| n + 2, n + 3, n, n + 5 | n* + 2 |

During normal Tracking mode and if, for example, optical sensing element 1120 is focused on logical track address n*, servo system 1150 should expect to encounter physical track addresses n, n+1, n−2 and n+3, in that relative order, as media 1110 (and thus gaps) pass by the sensing element 1120. Continuing with the above example, if sensing element 1120 senses a pre-gap physical track address of n and then a post-gap physical track address of n+1 after a Jump-gap operation, servo system need not perform a Jump-track operation. If however, sensing element 1120 senses a pre-gap physical track address of n and a post-gap physical track address of n−3 after a Jump-gap operation, servo system may need to perform a Jump-track operation to find physical track n+1. For example, demodulator/decoder within servo system 1150 may processes synchronization 1250 and address 1260 information to synchronize and decode the address of the track over which sensing element 1120 may be positioned. Based on the decoded address, servo system 1150 determines a number of tracks to Jump in order to move to a desired track, and may initiate a Jump-track operation.

Using the settings determined in Calibration and/or Initialization mode, sensing element 1120 moves to the desired track location and initiates Tracking mode. Tracking mode once again decodes the track address and, based on this information, either initiates another Jump-track, or continues in Tracking mode. Once the desired track may be verified, Tracking mode may simply utilize a feedback system to follow a tracking signal (not shown) embedded in the media.

An optical tape media, coded with predetermined patterns, as herein described may be useful to an optical tape system adapted to interpret the coded patterns.

Figure 14:
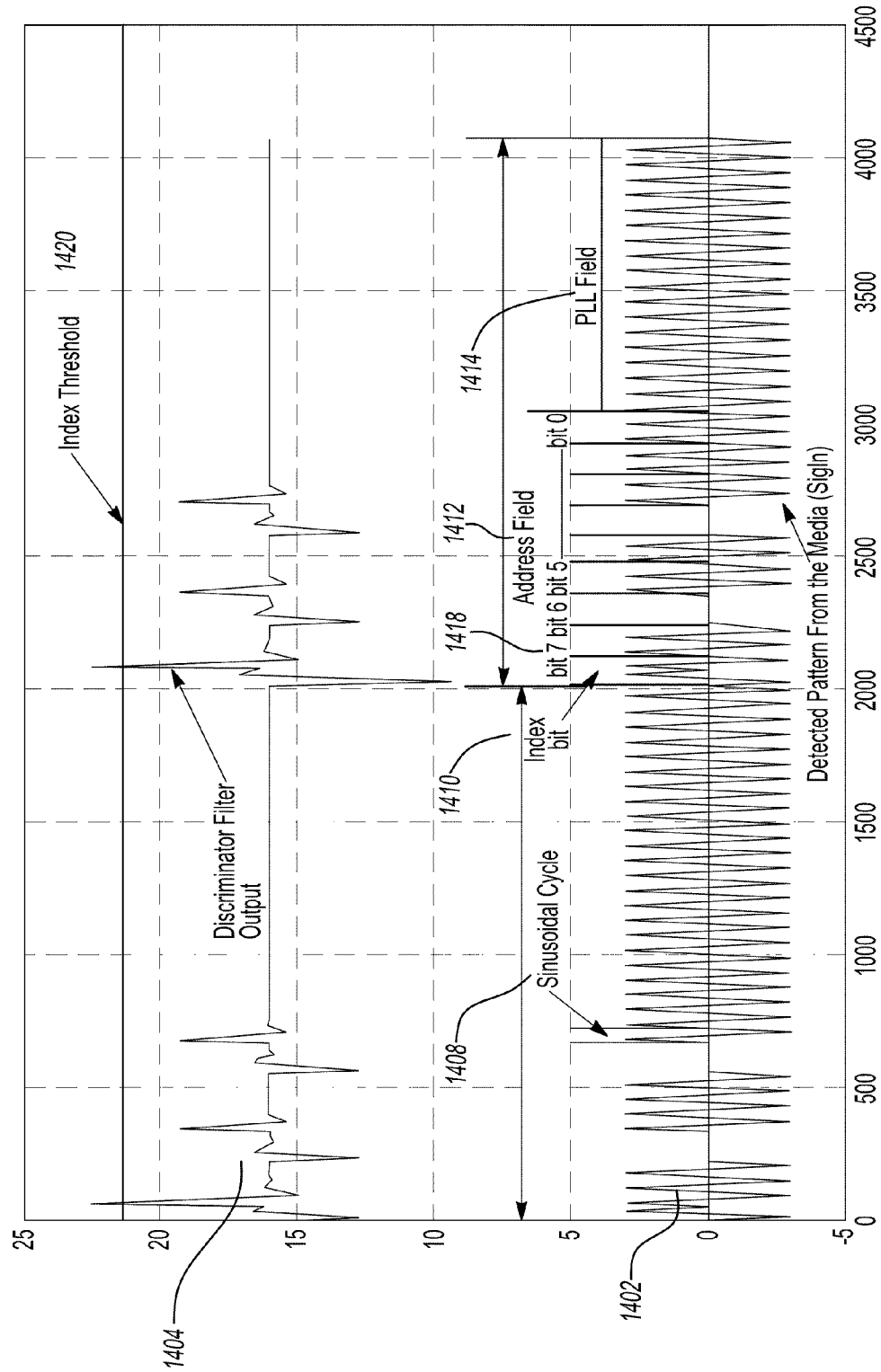
FIG. 14 shows an embodiment of the sinusoidal signal that represents address and synchronization information.

Referring to FIG. 14, an embodiment of sinusoidal servo signal 1402 and discriminator filter output signal 1404 are shown. The frequency of sinusoid servo signal 1402 may determine the carrier frequency of modulation and timing for servo demodulator 1502. In sinusoidal servo signal 1402 each two cycles may represent a cell 1418. Each of cells 1418 may carry information on indexing and address bits. A one cycle sinusoidal phase reversal within cell 1418 may indicate an index bit 1410; index bit 1410 may signal the beginning of address field 1412 or phase lock loop (PLL) subfields 1414. A plurality of address subfields 1418 may make up the full address of servo signal 1402. In any cell 1418 of sinusoidal servo signal 1402, the absence of two sinusoidal cycles may indicate a zero bit and the presence of two sinusoidal cycles may indicate a one bit of the address, therefore address field 1412 may be represented by sinusoidal servo signals 1402.

Discriminator filter output signal 1404 may be a representation of index bit 1410 of sinusoidal servo signal 1402. In an embodiment, index bit 1410 signal amplitude may be greater than a predetermined index threshold to indicate index bit 1410; index bit 1410 may signal the beginning of address field 1412.

Address field 1412 of a track may be repeated many times in the to provide data signal robustness and improved signal to noise; address field 1412 may have M cells for the 2^m tracks of an optical tape. The address field 1412 may be interleaved by PLL field 1414 of the same length and may insure the proper operation of PLL field 1414 and a sequencer.

Figure 15:
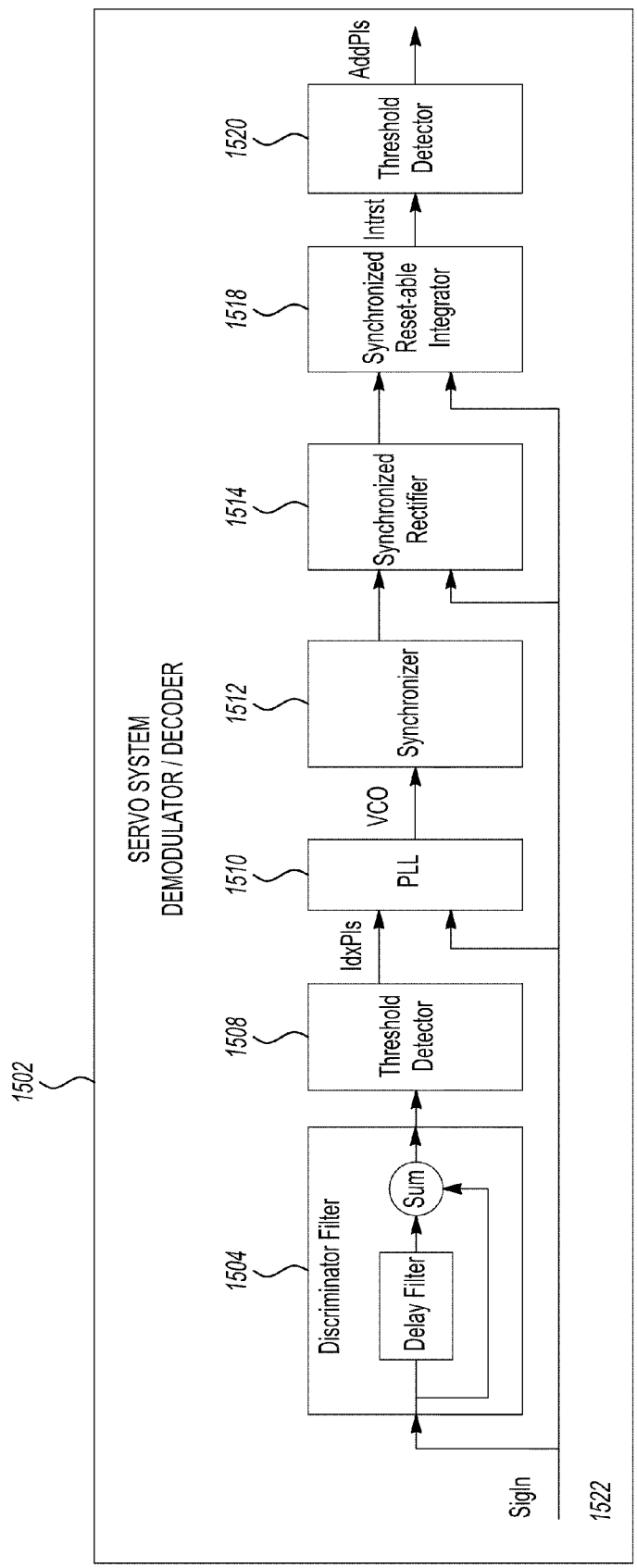
FIG. 15 shows a block diagram embodiment of the servo system demodulator and decoder.

Referring to FIG. 15, a block diagram embodiment of a servo demodulator and decoder 1502 may be shown. Servo demodulator and decoder 1502 may include a discriminator filter 1504, a threshold detector 1508, a PLL 1510, a synchronizer 1512, a synchronized rectifier 1514, a synchronized resettable integrator 1518, and a second threshold detector 1520.

Discriminator filter 1504 may detect an index pulse from a pattern signal detected from the media. Index pulse (IdxPls) signal 1604 may be used for Phase Lock Loop (PLL) 1510. A VCO signal from PLL 1510 may be synchronized by synchronizer 1512 and used for synchronized rectification 1514 and resettable integration 1518 of SigIn 1522. Threshold detector 1520, receiving out of synchronized resettable integrator 1518 may enable the detection address 1412.

Figure 16:
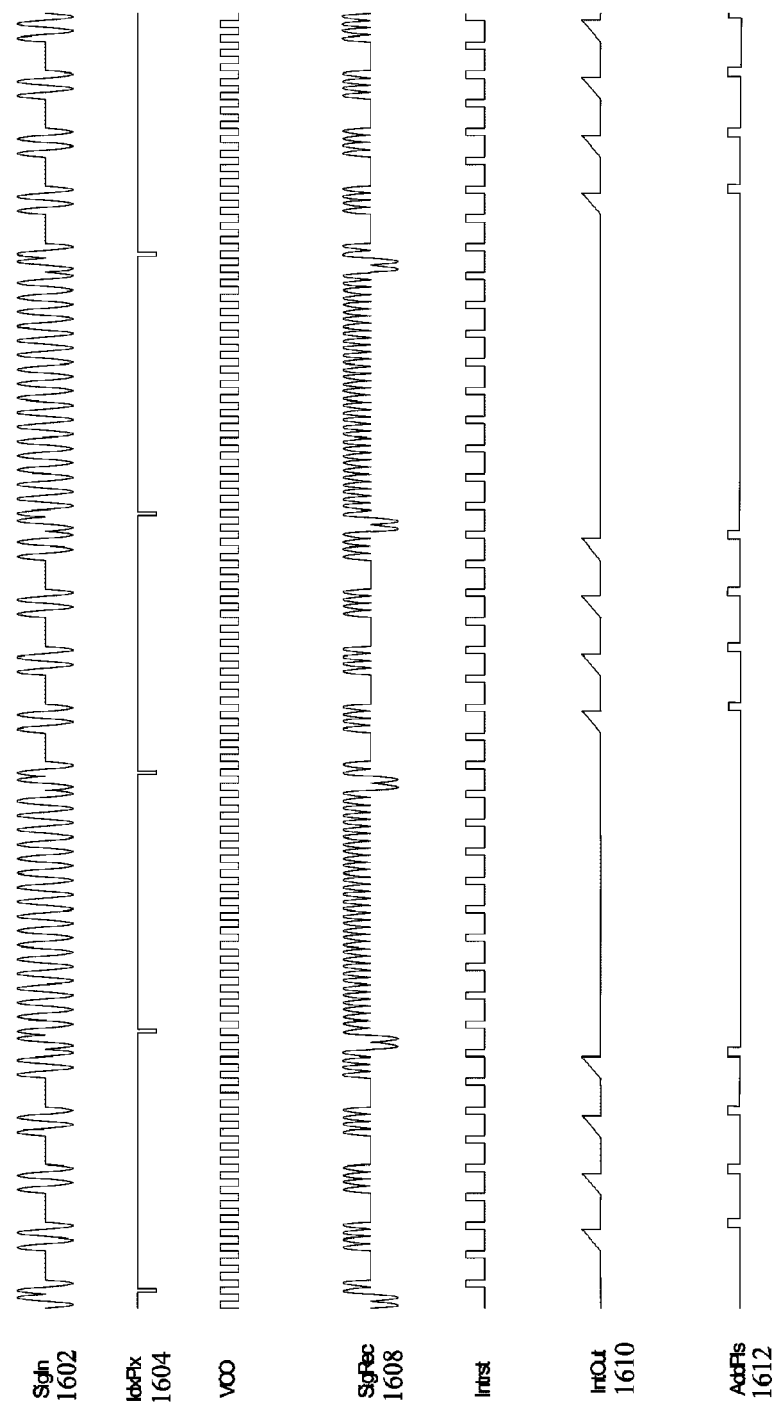
FIG. 16 shows an embodiment of the various signal outputs of the servo system demodulator show in FIG. 15.

Referring to FIG. 16, an embodiment of signals generated by servo demodulator and decoder 1502 may be shown. SigIn 1602 represents sinusoidal servo signal 1402 and may include index bit 1410, address field 1412, and PLL field 1414. IdxPlx signal 1604 may indicate index bit 1410 at the beginning of address field 1412. SigRec 1608 may be the rectified signal of SigIn 1602 signal that may contain the rectified signals for index bit 1410, address field 1412, and PLL field 1414. IntOut 1610 and AddPls 1612 signals may represent address field 1412 output from servo demodulator and decoder 1502.

Writing permanent and distinguishable servo marks on optical tape phase change media, as herein described, may be useful to an optical tape system adapted to interpret the coded patterns.

Methods and systems disclosed herein may include a unique method of writing servo marks on optical media that may be permanent in nature and easily distinguishable from the data.

Figure 17:
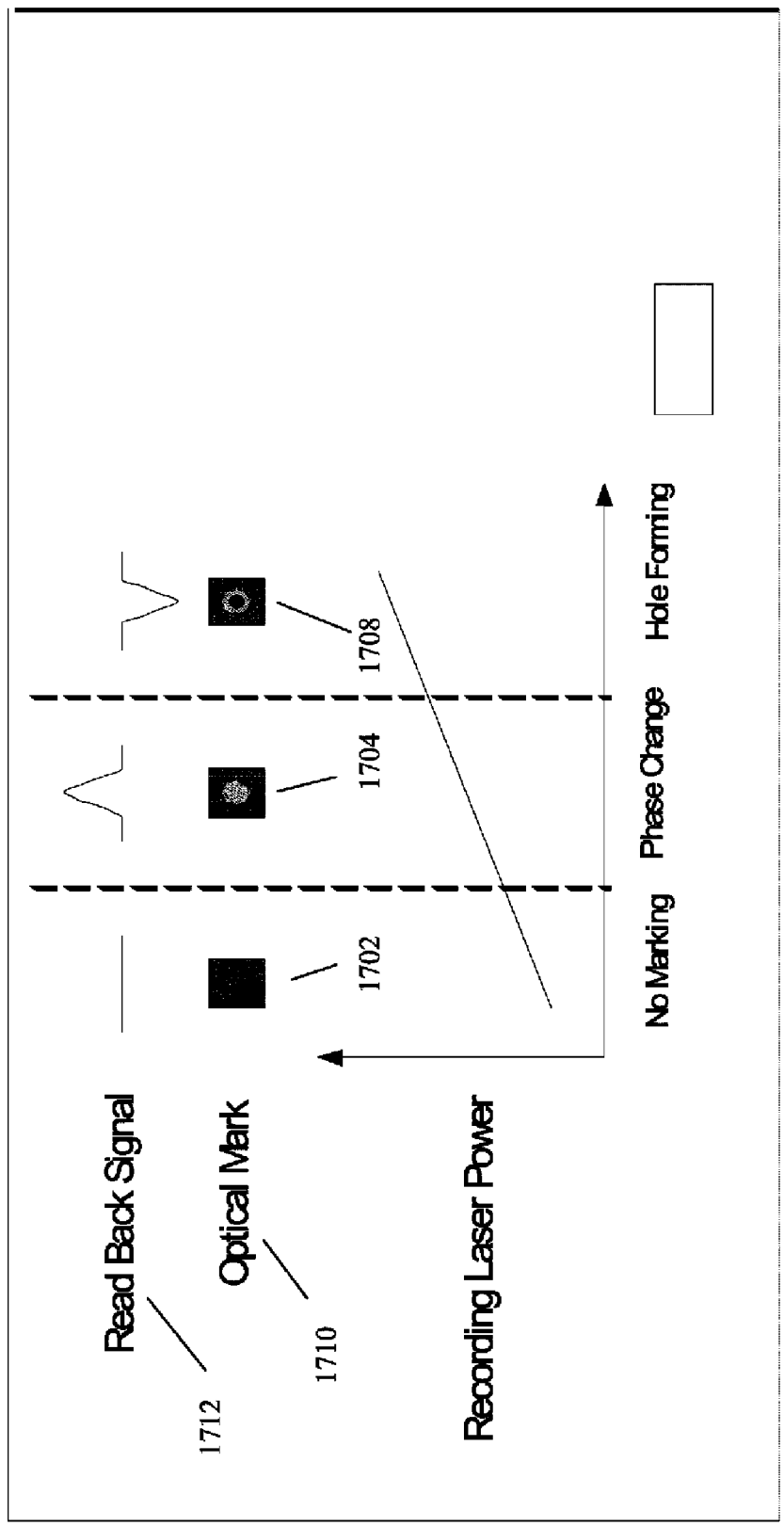
FIG. 17 shows an embodiment of different optical marks and read back signals.

Referring to FIG. 17, an embodiment of the different phase change optical tape media marks 1710 are shown in addition to a read back signal 1712 received by the optical head. The different media marks 1710 may include no marking 1702, a white marking 1704, and a dark marking 1708. In an embodiment, the read back signal 1712 polarity may be neutral for no mark, a positive for a white mark 1704, and a negative for a dark mark 1708. In "write bright" phase change media, the data marks may be written by applying a specific amount of power to the laser diode to change the state of the optical media from amorphous (low-reflectivity) to crystalline (high-reflectivity). If the power applied to the laser diode exceeds this specific band, the permanent dark mark 1708 (no-reflectivity) may be created on the media which may be distinguishable from the data write marks 1704 made by the devices read-write channel, because of its polarity and also its size. The dark marks 1708 may not be overwritten and may therefore ideal for servo pattern formation on the media.

Figure 18:
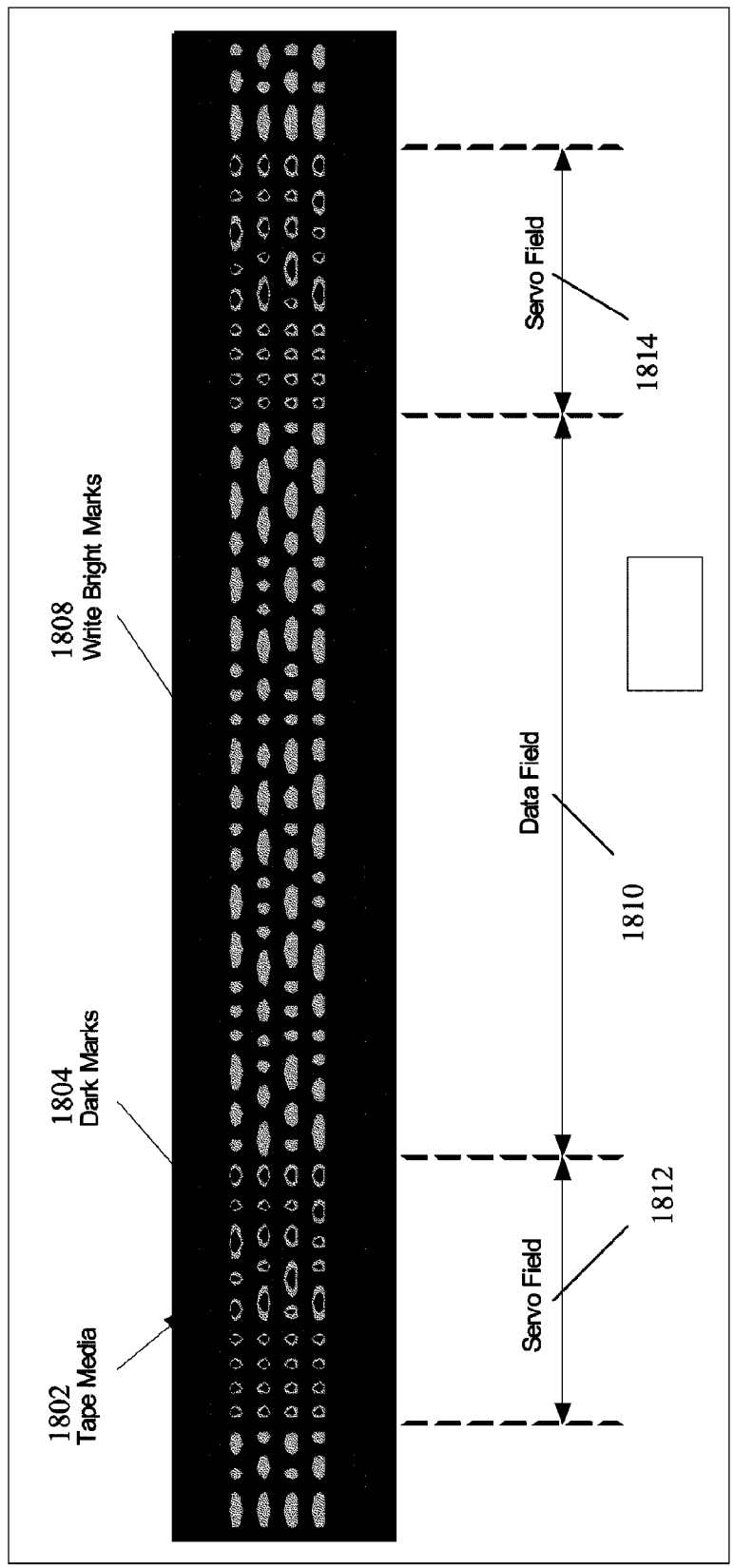
FIG. 18 shows an embodiment of the servo dark marks embedded into the data field white marks on the same optical media tracks.

Referring to FIG. 18, an embodiment of embedding servo marks 1812 with data fields 1810 may be shown. In a sampled servo methodology, the track address and servo positioning information may be embedded in the phase change media 1802 using the dark marks 1708 during the preformatting media process. In an embodiment, formation of the servo marks 1812 (servo fields) on an optical phase change tape media 1802 using dark marks 1708 may be distinguishable from the white marks 1704 data fields 1810. The dark mark 1708 servo field 1812 may be embedded into the white mark 1704 data fields 1810 to provide synchronization and address information for the data fields 1810.

Figure 19:
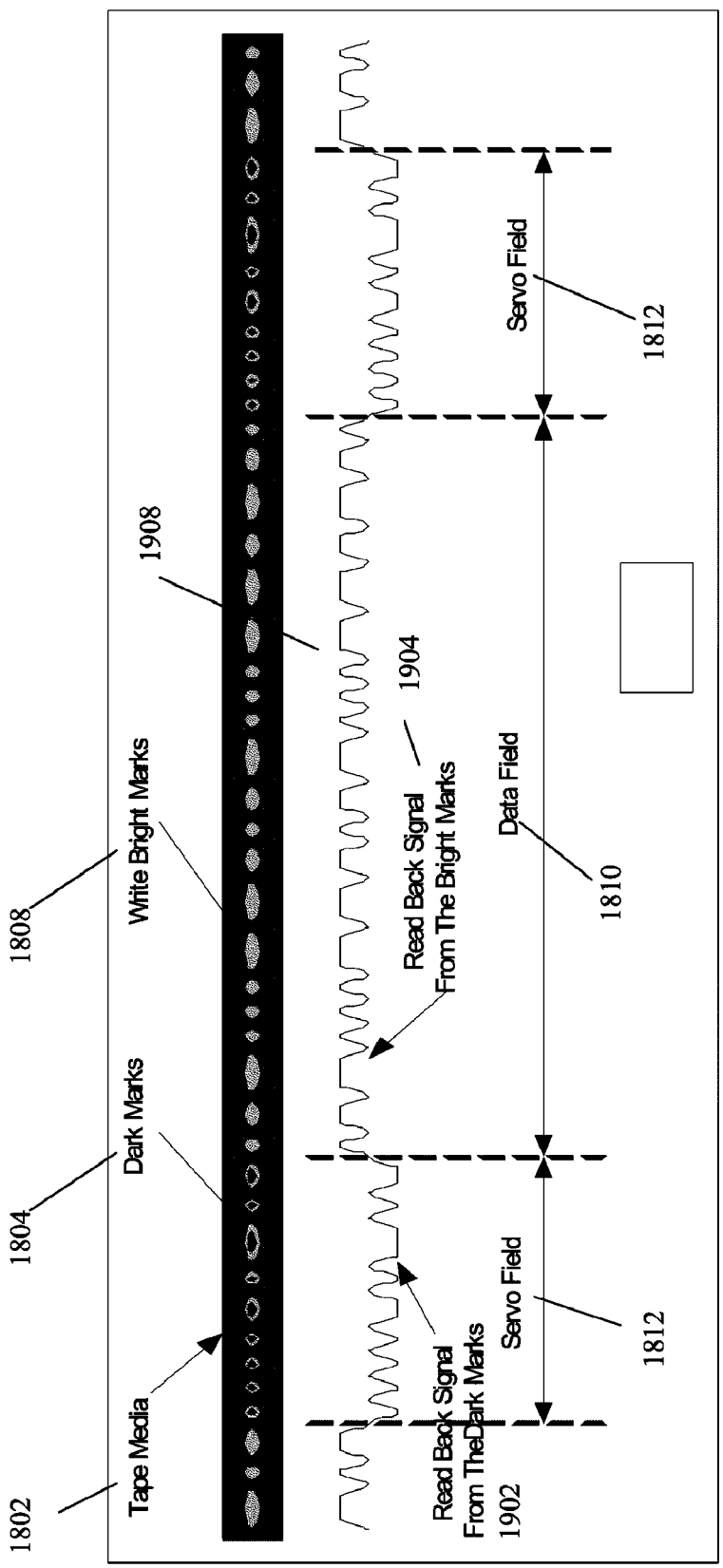
FIG. 19 shows an embodiment of the read back signal resulting from the servo field and data fields using dark and white marks on the optical tape media.

Referring to FIG. 19, an embodiment of the received read back signals 1908 for the dark marks 1804 and the white marks 1808 on the optical tape media 1802 may be shown. As discussed in FIG. 18, the dark marks 1802 of the servo field 1812 may be embedded into the data fields 1810 of the white marks 1808 on the optical tape media 1802. As shown in FIG. 171, the dark marks 1804 may provide a negative read back signal 1902 to the optical head. The white marks 1808 may provide a positive read back signal 1904 to the optical head. In an embodiment, the result may be the read back signal 1908 that may provide for a distinguishable polarity signal for both the dark mark 1804 servo field 1812 and the white mark 1808 data fields 1810. The distinguishable polarity of the read back signal 1908 may allow for reading both the servo field 1812 and data fields 1810 that may be written on the same optical tape 1802 track.

Figure 20:
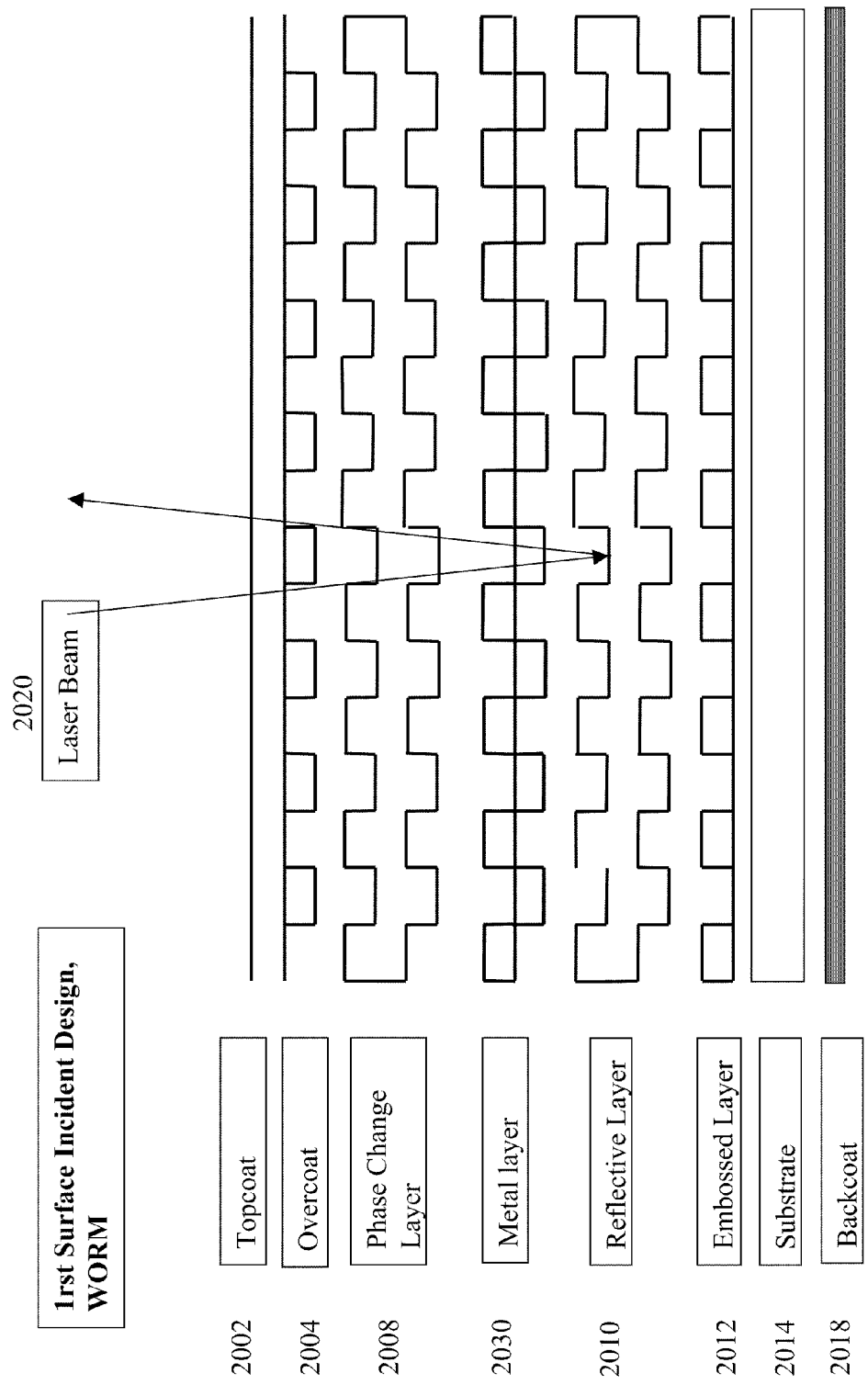
FIG. 20 is a graphical representation of the layer type and stack-up of a possible embodiment of the invention.

Referring to FIG. 20, an embodiment of a first surface incident (air-incident) WORM optical tape media includes a topcoat 2002, an overcoat 2004, a phase change layer 2008, a metallic layer 2030, a reflective layer 2010, an embossed layer 2012, a basefilm or substrate 2014, and a backcoat 2018.

Topcoat 2002 maybe an organic, scratch-resistant film applied by a sputter process, provides a protective layer for the other layers of the media. Topcoat 2002 may include anti-reflective properties (e.g. low index of refraction) to prevent unwanted reflections of laser light 2020 from layers within the media.

In the possible embodiment of FIG. 20, overcoat 2004 may be an optically transparent, near zero absorption protective layer, made from material such as ZnS (tradename ZS80). Alternatively overcoat 2004 may also contain SiO2 or other such materials that may protect lower layers from physical damage. Overcoat 2004 may be applied by a sputter process and may include anti-reflective material to allow laser light 2020 to penetrate through it more efficiently.

In this possible embodiment, the phase change coating 2008 may be a phase-change alloy such as Te—Ge—Sb, (tellurium-germanium-antimony), however other phase change materials known as a write-bright phase change material may be included. When composed of Te—Ge—Sb, phase change coating 2008 may be approximately nineteen nano-meters thick. Write-bright material changes from an amorphous to a crystalline phase when subjected to sufficient heat from laser 2020. Once changed, the composition of the material prevents it from changing back to the amorphous phase. The resulting crystalline spots, being more reflective than the surrounding amorphous material, creating a high contrast against the surrounding area, may be means for storing data in the WORM optical tape media. Phase change film 2008, in this possible embodiment, may be created using a sputter process.

Metal layer 2030 may be a very thin aluminum layer. In this embodiment, metal layer 2030 may be approximately composed of aluminum approximately one to two nano-meters thick.

The energy of a laser impacting a phase change material transfers its energy to the material with a three dimensional Gaussian profile. The center of the laser impact area will quickly rise in temperature to the phase change material melting point while the wing area will rise only to the crystallization temperature, which may be lower than the melting temperature. This energy transfer process produces a "donut" like mark with a hole in the middle surrounded by a bright ring. Such marks produce the advantages of high contrast and high signal to noise ratio. In addition, the process may be very fast, rendering it possible to use such media for recording at very fast data rates. However, without metal later 2030 a laser with read power greater than approximately 0.3 mW may cause read etching, which may be unintended bright tracks in the phase change layer of the media.

Metal layer 2030 enhances the media such that it not only provides all the desirable characteristics of a high contrast and fast WORM media, but also may be very resistant to read etching. A laser with read power as high as at least 0.8 up to as much as 1 mW will not cause a read etching problem with this embodiment. In this embodiment, not only may be the sensitivity to read etching reduced, but also the carrier to noise ratio of write marks may be improved by about 5 to 10 dB over optical media without metal layer 2030.

Metal layer 2030 may contribute these advantages by acting as a barrier to prevent migration of metal in reflective layer 2010 into phase change layer 2008 during laser writing. Alternatively it may be possible that some atomic aluminum in metal layer 2030 may migrate into phase change layer 2008 during deposition. Such migration may retard the phase change layer 2008 crystallization process while not materially altering the melting temperature.

Reflective layer 2010, made of a metal material such as aluminum, or antimony, reflects light from laser 2020 that passes through phase change layer 2008 and thin metal layer 2030. When composed of antimony, reflective layer 2010 may be approximately twenty to thirty nano-meters thick. Reflective layer 2010 may be created using an electron-beam, may be thermally evaporated, may be sputtered, may be ion beam deposited, or a like process. Reflective layer 2010 further reflects light from below, attenuating and blocking any light from below from passing through and mixing with laser light 2020, which may introduce noise in reflect laser light 2020. Reflective layer 2010 may also aid in the crystallization of phase change 2008, creating a suitable thermal profile by facilitating nucleation.

Embossed layer 2012, contains the physical land and groove structures used for servo tracking. Embossed layer 2012 may be formed from a monomer fluid by a drum embossing and UV curing apparatus where it may be embossed with the land and groove structures and cured at the same time. While curing, it coverts from a liquid monomer to a solid polymer and may be permanently attached to substrate 2014.

Below embossed layer 2012 may be substrate or basefilm 2014 which provides mechanical support. Basefilm 2014 may be created from a high-performance thermoplastic polyester film such as polyethylene naphthalate (PEN), polyethylene terephthalate (PET), or similar material having appropriate mechanical, thermal, and hydroscopic properties for a data storage product.

A backcoat 2018 may be deposited on a back side of basefilm 2014. Backcoat 2018 may be a partially conductive layer to minimize the buildup of static charge, and has a textured surface acting as a conduit to release entrapped air generated during tape subsystem operation. In addition, backcoat 2018 optical properties absorb and scatter incident laser light 2020 that penetrates reflective layer 2010. Backcoat 2018 may be one of a material selected from a set including carbon black film created by slurry-coating, aluminum sputtered layer, and nickel chromium sputtered layer. Backcoat 2018, when made of aluminum, nickel chromium, or other metallic material may also be applied to magnetic tape media to achieve similar static discharge and release of entrapped air.

FIG. 2 may be a representation of waveforms of test signals captured while performing a 3T operation on the media depicted in FIG. 20, with the media adapted by removing overcoat 104. Because overcoat 2004 may be an optical antireflection interference layer, it does not affect the working of the remaining layers of media in a significant way during the 3T write operation.

Figure 21:
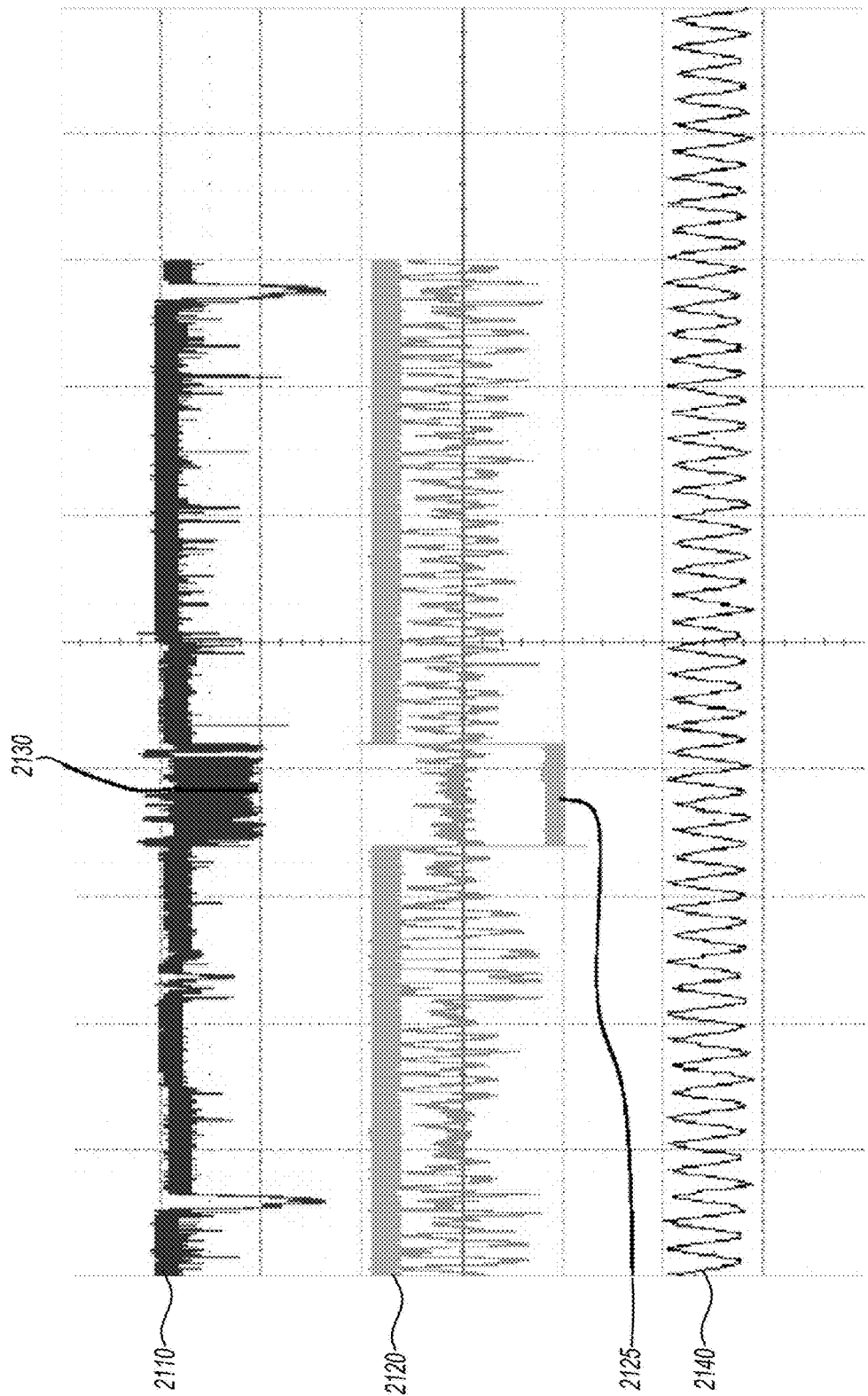
FIG. 21 is an oscilloscope display of certain signal activity while an adapted embodiment of FIG. 20 is being tested.

Signal 2110 depicts a time domain voltage measurement of a read signal representing the results of reading laser marks on the media. Signal 2120 depicts a control signal used to determine when the read signal has relevant data. As can be seen in FIG. 21, during the period when signal 2120 may be low 225, the read signal has relevant data. Signals 2110 and 2120 may be captured and displayed on the oscilloscope using a 5 ms per division time scale. Using the capabilities of the oscilloscope, a representative portion 2130 of the read signal, may be selected and displayed using a 1.46 us per division time scale as signal 2140. To one skilled in the art, the waveforms of FIG. 21 depict carrier-to-noise characteristics of the embodiment of optical media depicted in FIG. 20.

Figure 22:
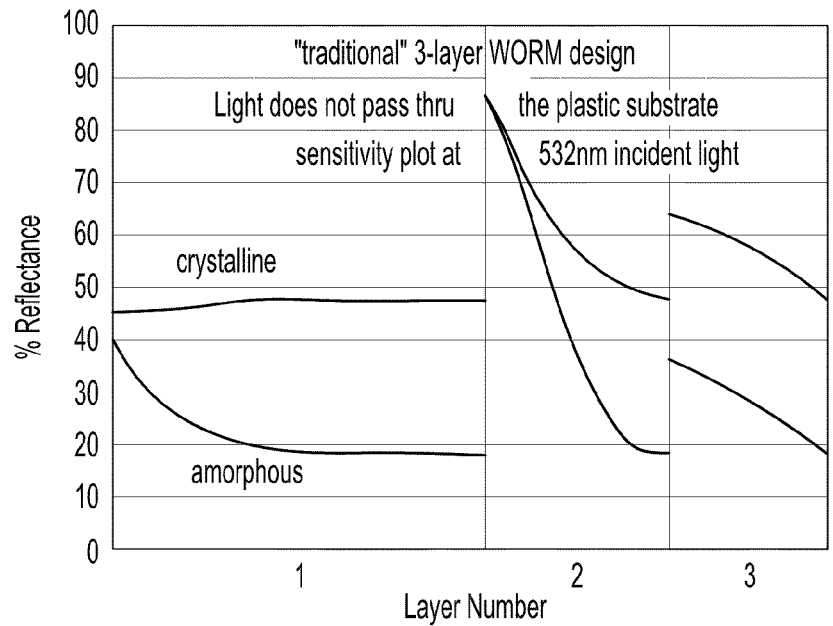
FIG. 22 is a graph showing the reflection sensitivity in a 3-layer WORM media at 532 nm wavelength incident light.
Figure 23:
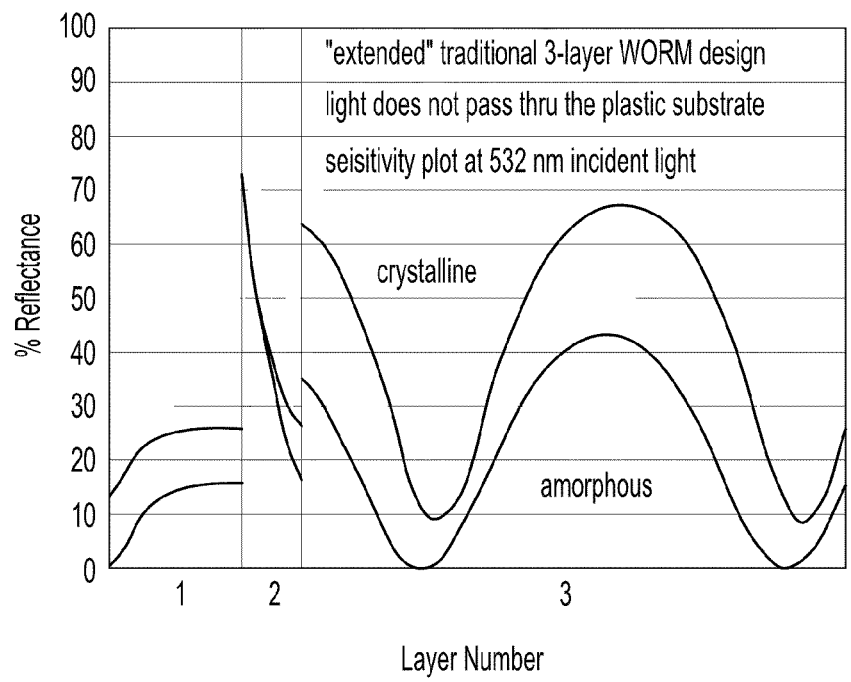
FIG. 23 is an extension of FIG. 22 showing reflectivity of media with layer thickness approx ten times that used to generate the graph of FIG. 22.

Sensitivity plots may be a derivative tool showing the effect of "micro" changes on a "macro" property. FIGS. 22, 23, 24, and 25 show the reflection sensitivity to changes in the thickness of each layer in a thin film stack. In FIGS. 22 and 23 only the last layer may be of primary interest; in FIG. 24 the first and third may be of primary interest, in FIG. 25 the second and fourth layers may be of primary interest.

Figure 24:
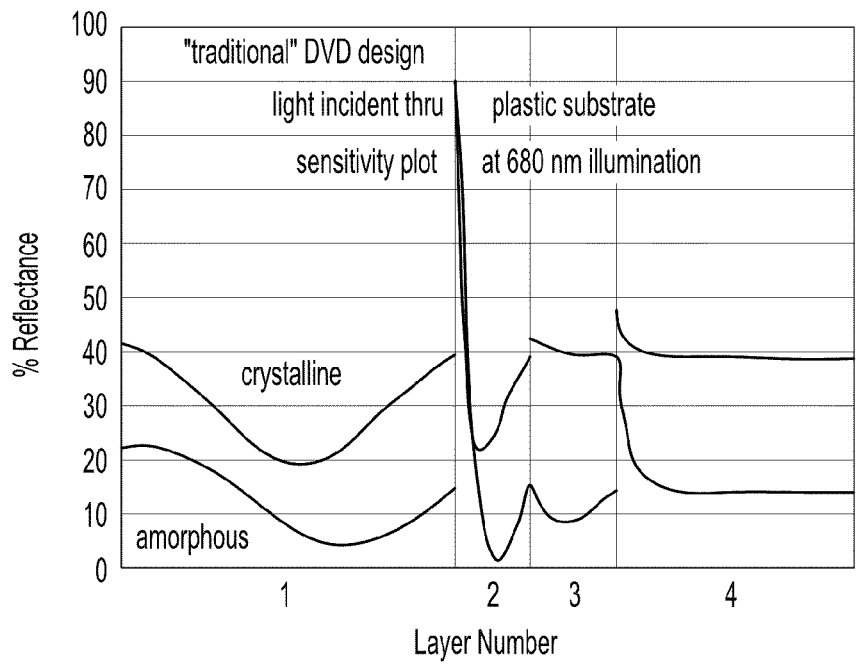
FIG. 24 is a graph showing the reflection sensitivity in a DVD media at 680 nm wavelength incident light.

In both designs shown in FIGS. 22, 23, and 24, note that the amorphous and crystalline curves may be parallel and the amorphous curve may be always lower than the crystalline one. FIG. 23 may be an extension of FIG. 22 to show the curves remain parallel even with ten times the layer thickness. An extended curve of FIG. 24 would show the same phenomena and may be omitted.

Figure 25:
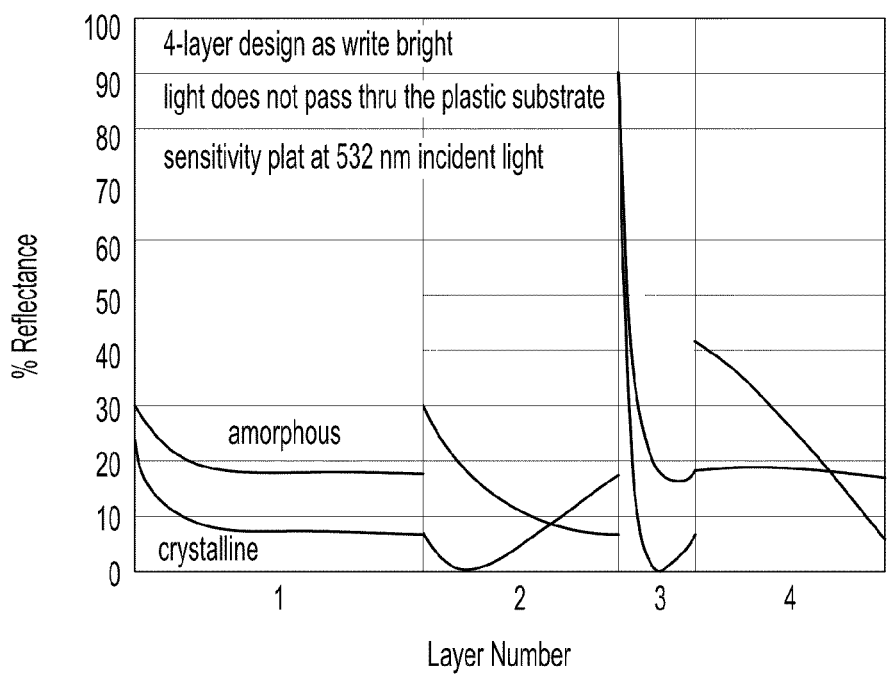
FIG. 25 is a graph showing the reflection sensitivity of a media.

FIG. 25 shows an embodiment with amorphous and crystalline curves which cross. This means one can design a phase change system (e.g. as part of optical tape media) to be either high reflectivity in the amorphous state and low reflectivity in the crystalline state, or high reflectivity in the crystalline state and low reflectivity in the amorphous state. This may be either a write bright or a write dark system.

For example, a conventional DVD disk would not work properly in a WORM disk player because the WORM disk player would be looking for an increase in reflectivity when the disk may be exposed the WORM laser beam while the DVD disk would decrease in reflectivity when exposed to the laser beam.

Figure 26:
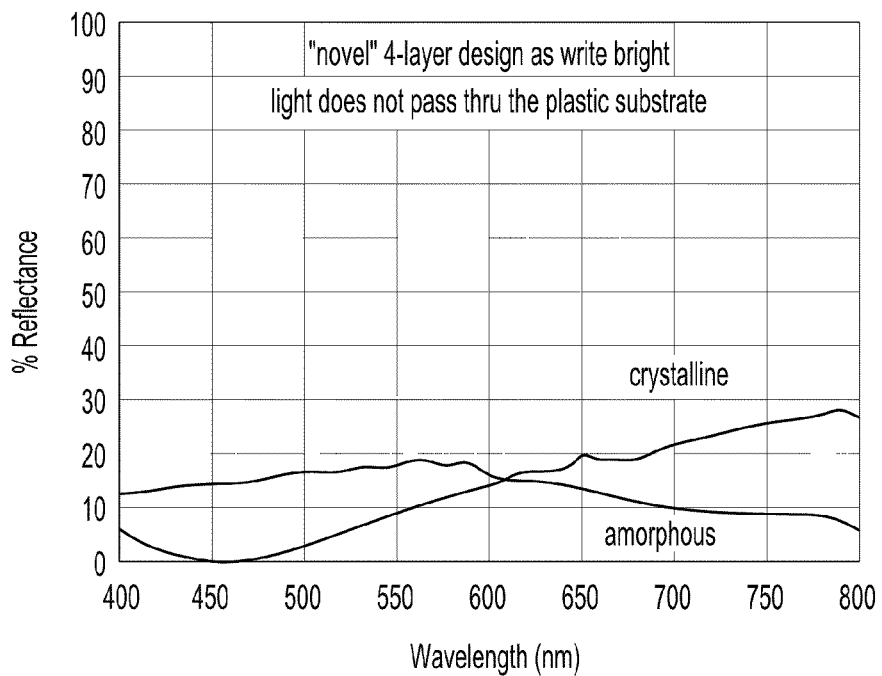
FIG. 26 is a graph showing the reflection sensitivity of a LOTS media.

However a LOTS drive may be a WORM drive and the only way erasable tape could be used in a LOTS drive may be if erasable tape could be made such that its reflectivity increases when exposed to a laser beam. The design depicted in FIG. 26 shows reflectivity increases when exposed to a laser beam at a wavelength of 532 nm, corresponding to a LOTS wavelength.

In embodiments, a four layer optical tape, composed of phase change layers, amorphous to crystalline reflectivity change may change from positive to negative as the thickness of the layers changes.

A media (e.g. optical tape media) with amorphous and crystalline reflectivity curves which cross can be either high reflectivity in the amorphous state and low reflectivity in the crystalline state, or high reflectivity in the crystalline state and low reflectivity in the amorphous state. This may be either a write bright or a write dark system.

In embodiments, a four layer optical tape, composed of phase change layers, amorphous to crystalline reflectivity change may change from positive to negative as the thickness of the layers changes.

Figure 27:
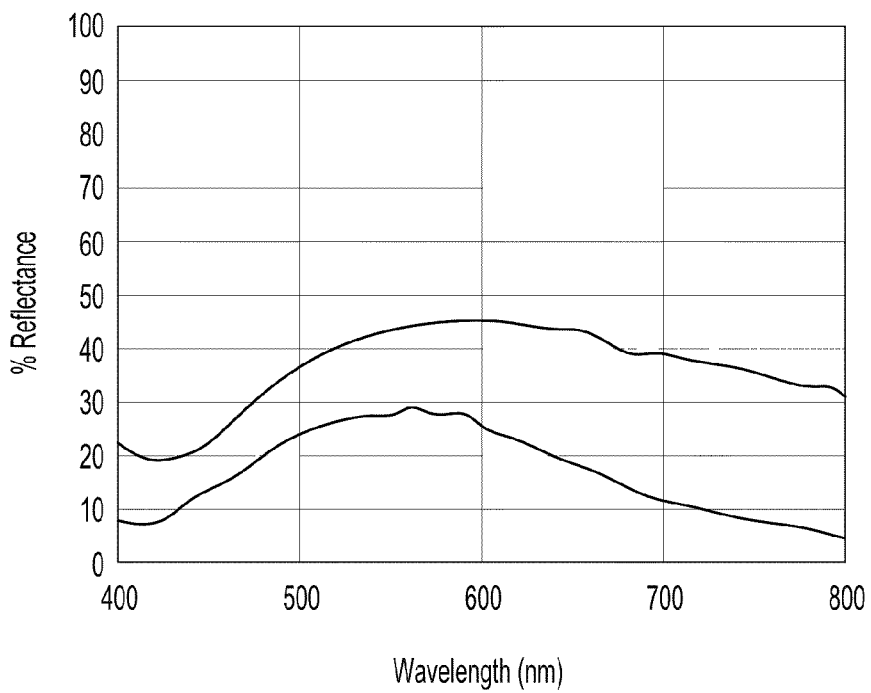
FIG. 27 is a graph showing the reflection sensitivity of a DVD media versus wavelength of incident light.

An initializer for optical media may comprise a high power laser delivering energy to an optical media sufficient to initialize a phase change media to a crystalline state. The high power laser may be automatically focused onto the phase change layer of the media by a lower power laser. However a lower power laser may be saturated when a media with parallel reflectivity curves (e.g. as shown in FIG. 27) may be initialized.

Figure 28:
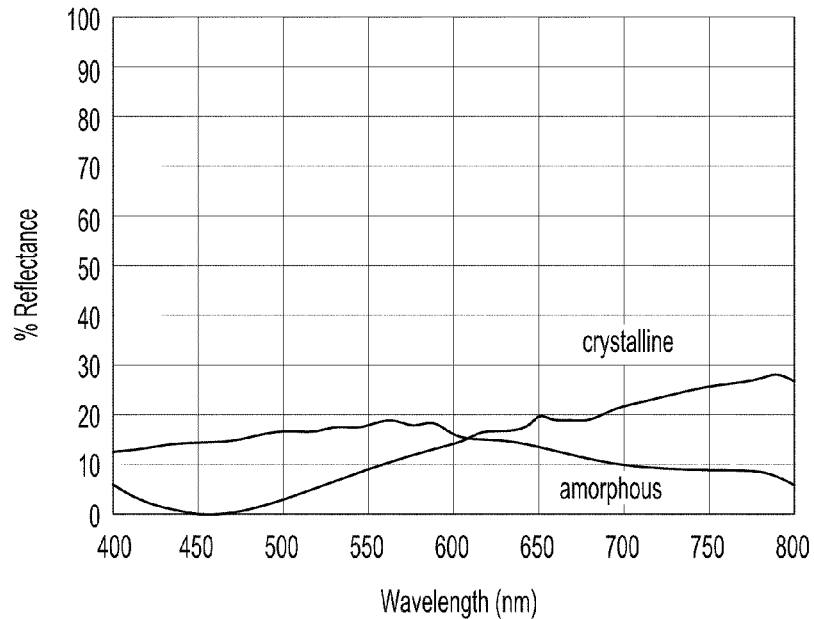
FIG. 28 is a graph showing crossing reflection sensitivity curves for a media.

In embodiments a four layer optical tape, whose phase change reflectivity curves may be not parallel, may be initialized with a high power laser automatically focused by a lower power laser wherein the lasers' wavelength may be approximately at that which the reflectivity curves intersect (e.g. as shown in FIG. 28). Therefore, an initializer apparatus whose focusing wavelength may be approximately equal to the media reflectivity cross over wavelength may not be saturated. Such an apparatus may be advantageous with phase change materials with shorter wavelengths.

A novel formulation (REWORM) would include depositing in a high reflectivity amorphous state, initialization to a low reflectivity crystalline state, and writing to a high reflectivity amorphous state.

An advantage of this formulation may include faster erase times because writing to the amorphous state from the crystalline state does not depend on the phase change media's intrinsic crystal growth mechanism which includes a constraint of minimum time to change from amorphous to crystalline states.

An apparatus may be disclosed herein which can erase a tape by returning the phase change media to a low reflectivity state. Such an apparatus would erase any information written on a tape in a high reflectivity state by changing the high reflectivity information to a low reflectivity state.

Such an apparatus may be useful as a stand alone device, separate from another device used to write and read information on the tape.

In particular, such an apparatus may be useful in applications using write bright tape.

An apparatus may be herein disclosed which, when used with optical tape media, writes information to the tape, masking any previously written information on the tape, rendering the previously written information unreadable by an optical tape reading apparatus.

This may have the advantage of preventing sensitive information on a tape to be masked such that the sensitive information previously written to the tape would not be readable. This advantage would benefit a first user with sensitive information on optical tapes that must be erased by an optical tape system because it prevents a second user of the optical tape system from reading the sensitive information before performing the erasing.

Erasable phase change tape media may be manufactured on a continuous sputter coating machine in which all the layers may be simultaneously deposited to the media. This may be accomplished by depositing a second layer on top of a first deposited layer shortly after the first layer may be deposited, and simultaneously depositing the first layer on further portions of the media. In an embodiment, this may achieved by positioning sputter (layer depositing) sources around a rotating heat extracting drum (chill drum) and moving the media past each sputter source sequentially. Thin films may be deposited as described above with the first layer being deposited on a web of polymer type material which may be in contact with the chill drum as the media moves past each sputter source.

Applying this technique to Tellurium-based erasable phase change formulations of one or more of the deposited layers, may enable producing graded material interfaces between layers.

Advantages of this media with graded material interfaces between layers may include strain relief or thermal conductivity transition, which may result in improved performance to the resultant phase change structure. Such improved performance may be exhibited as reduced signal jitter or increased erase cycleability.

In embodiments, different gradations for each interface throughout the multilayer media may be desirable.

Aspects herein may relate to improved optical pick up head systems adapted for reading and/or writing data from/to optical tape. The optical head may be capable of reading and/or writing data on an optical tape. The optical tape may include formatted digital data in a phase change layer and it may be adapted to be written upon, re-written upon, erased and/or read from. The optical head may include a transport facility for the optical head, a read head, a write head, a read/write head, a direct read after write head, an articulation unit for optical head positioning, demodulation facility for decoding the data on the optical tape, and the like. The optical head may include a light source, a lens, an actuator, a beam splitter, a beam polarizer, an electro-optic integrated circuit, and/or other systems.

It should be understood that the optical head may be capable of reading, writing, reading and writing, directly reading after writing, or it may be otherwise configured to meet the needs of the particular application. Several different aspects of the optical head and related facilities are described herein; the different aspects may be combined into an optical head or may be used individually.

In an embodiment, an optical pickup head (OPH) as described herein may be used in a direct read after write (DRAW) mode with optical tape media.

In an embodiment, a low power direct read after write (DRAW) laser diode may be used in conjunction with a higher power laser diode in a pick up head (PUH). The two laser diodes may have essentially the same wavelength. In an embodiment, a Holographic Optical Element (HOE) may be inserted in the DRAW laser beam path, and the +1 (first order) and −1 beams may be used for the DRAW function. The +1 first order beam may be used in a first of media motion while the −1 first order beam may be used in a second direction.

There may be two methods of realizing the DRAW function in the PUH. An embodiment of the first method may be having a higher power laser diode LD1 2902 for writing only and a lower power second laser LD2 2914 that may have essentially the same wavelength for read, servo read, and DRAW. The beams from the two lasers may be combined to produce all the required functions in the PUH in addition to DRAW. An embodiment of the second method may be having LD1 2902 be used for the write, read, and servo functions, while the lower power LD2 2914 may be for the DRAW.

Referring to FIG. 29, an embodiment of the DRAW based method one having a higher power laser diode LD1 2902 for writing only and a lower power second laser LD2 2914 that may have essentially the same wavelength for read, servo loop, and DRAW may be shown. There may be two optical paths, one for the high power laser diode LD1 2902, and the other for the low power laser diode LD2 2914. The path associated with LD1 2902 may be to deliver write energy to the media. The collimator denoted as COL1 2904 may be an astigmatic lens providing a collimated and astigmatism free beam that may be focused by the objective onto the optical tape media.

The path associated with LD2 2914 may be more complex to provide the read, servo loop, and DRAW functions. The holographic optical element (HOE2) 2920 associated with this path may contain a grating and a hologram as shown in FIG. 31. The grating 202 may split the outgoing collimated beam into 3 beams, namely, the 0th order and the +1st order and the −1st order beams. The 0th order beam may be used to provide both the servo functions of focusing and tracking and may provide a nominal reading function. The + and −1st order beams may be used for the DRAW. HOE2 2920 may contain a phase hologram 204, that may diffract the returned +/−$1^{st}$ order beams in the orthogonal direction to create 6 spots on a segmented detector. The signals from the segmented detector array may be utilized to generate focus and tracking signals, as well as the DRAW signals simultaneously. The segmented detector array and the signal amplifiers may be integrated onto one electro-optic integrated circuit EOIC2. Since LD2 2914 may be a lower power laser diode, it may be integrated with the EOIC.

The two collimated beams from LD1 2902 and LD2 2914 may be combined at the objective lens to maintain the focus of LD1 2902 and LD2 2914.

The distance between the focus point of the $0^{th}$ order beam and the +,−$1^{st}$ order beams may be controlled by the focal length of the objective lens, $f_{obj}$, and the grating 202 pitch, $\Lambda$, of HOE2 2920 through the formula:

$$d = f_{obj} \cdot a_{\pm 1} = -f_{obj} \frac{\lambda}{\Lambda}$$

where $\lambda$ may be the LD wavelength.

For example, if a $\Lambda$ of 0.1 mm, LD wavelength of 650 nm, and $f_{obj}$ of 2.5 mm may be used, then $\alpha_{+1}$ equals 37 degrees and d equals 13 microns.

Figure 30:
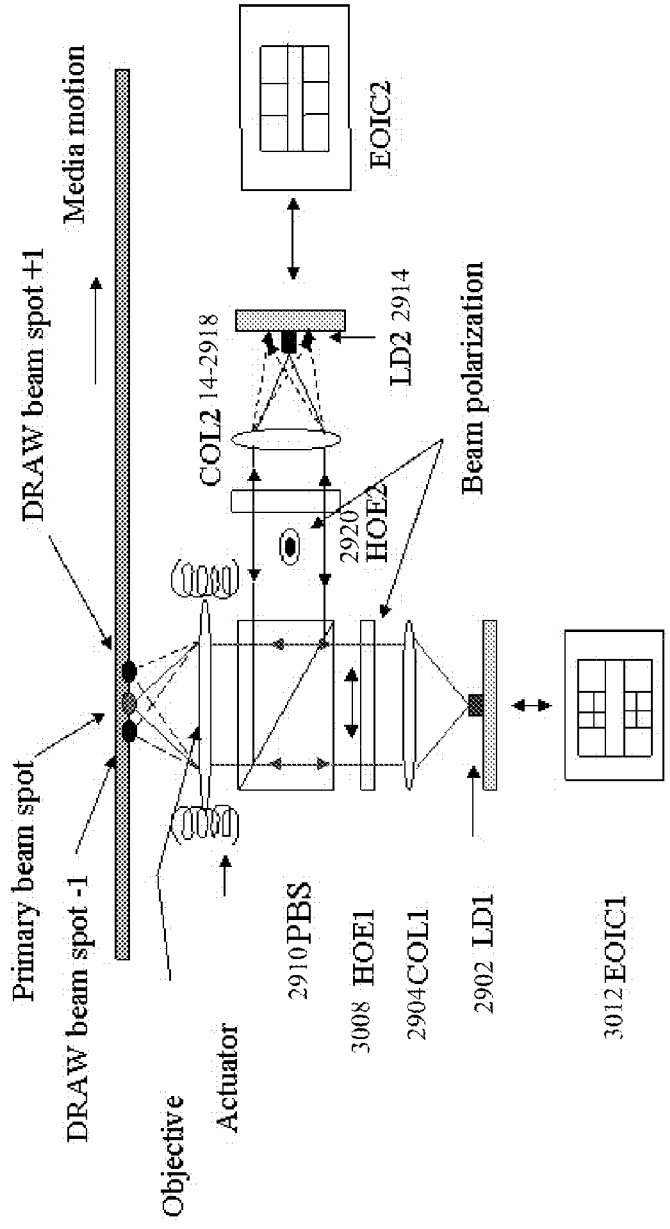
FIG. 30 shows an embodiment of a direct read after write (DRAW) optical tape pickup.

Referring to FIG. 30, an embodiment of a DRAW optical pickup based on method two for optical media (e.g. optical tape) may be shown. There may be two optical paths through the optical pickup, one for the main or primary beam, and another for the second beam used for the DRAW. The primary beam may be used mainly for writing, focus, tracking, and nominal reading.

The light source LD1 2902 may be collimated by lens COL1 2904 and then through holographic optical element (HOE1) 3008. The HOE1 structure may be the same as described in FIG. 31. The grating in this case may be needed only to utilize a three-beam tracking scheme. If a single returned beam to generate focus and track signals may be used, the grating may not be needed. A hologram may be used to diffract the returned beam to the sides of the LD1 2902 source.

The laser source LD2 2914 may be collimated by lens COL2 2918 and then by HOE2 2920. Since the purpose of the second beam may be direct read after write, HOE2 2920 may be for this purpose. The grating in HOE2 2920 may be a 0th (zeroeth) order suppression grating with most of the energy diffracted in the +/−1 orders as shown in FIG. 32. The +1 order may be ahead of the focus of the primary beam spot, and the −1 order behind the primary beam spot, as far as the tracking direction goes. One order may be used for DRAW when the media may be moving in a first direction and the other may be used when the media may be moving in a second direction.

It may be important to have the right groove depth in holographic element HOE1 3008 in order to control the 0th order suppression. For example, if the holographic element HOE1 3008 may be a glass plate with a refractive index of 1.55, the groove depth may need to be 550 nm when using a light source with a wavelength of 655 nm to completely suppress the 0th order beam. Complete suppression of the 0th order beam may be desirable but may not be necessary. That is, one may use smaller groove depths. For example, at a depth of 380 nm, the energy may be evenly distributed in the three order beams −0, +1, and −1. This may work adequately. More 0th order energy may be undesirable since it could cause more Relative Intensity Noise (RIN) noise.

As shown in FIG. 32, holographic element HOE2 2920 may also contain a phase hologram. The purpose of the phase hologram may be to diffract the returned ±1st order beams into the correct location for data detection.

Referring to both FIG. 29 and FIG. 31, the primary and secondary beams may be merged together using a polarizing beam splitter, PBS 2910. With the polarizing beam splitter PBS 2910, the reflected beams may return to their own original directions.

Referring to FIG. 33, another feature may be the orientation of the two laser diodes. The polarization directions of the two beams may be essentially perpendicular to each other. For example, light source LD1 2902 may be polarized in a direction that may be mainly parallel to the direction of tape motion and the media plane, and light source LD2 2914 may be polarized in a direction that may be perpendicular to tape motion but may be parallel to the plane of the media. This may make it possible to combine the two beams at the polarizing beam splitter PBS 2910. Since the single spatial mode light coming out of a laser diode may be polarized mostly parallel to the P-N junction plane 3402, the P-N junction planes 3402 of light source LD1 2902 and light source LD2 2914 may be perpendicular to each other.

Many other versions of optical path arrangements for the two beams may be possible if the laser diodes are not integrated into the electro-optic integrated circuit detector array. However, such configurations may be less compact than the integrated LD-EOIC array. Another version of the DRAW pickup head may be shown in FIG. 34, where the laser diodes and the two electro-optic integrated circuits may be integrated onto one silicon chip.

Figure 36:
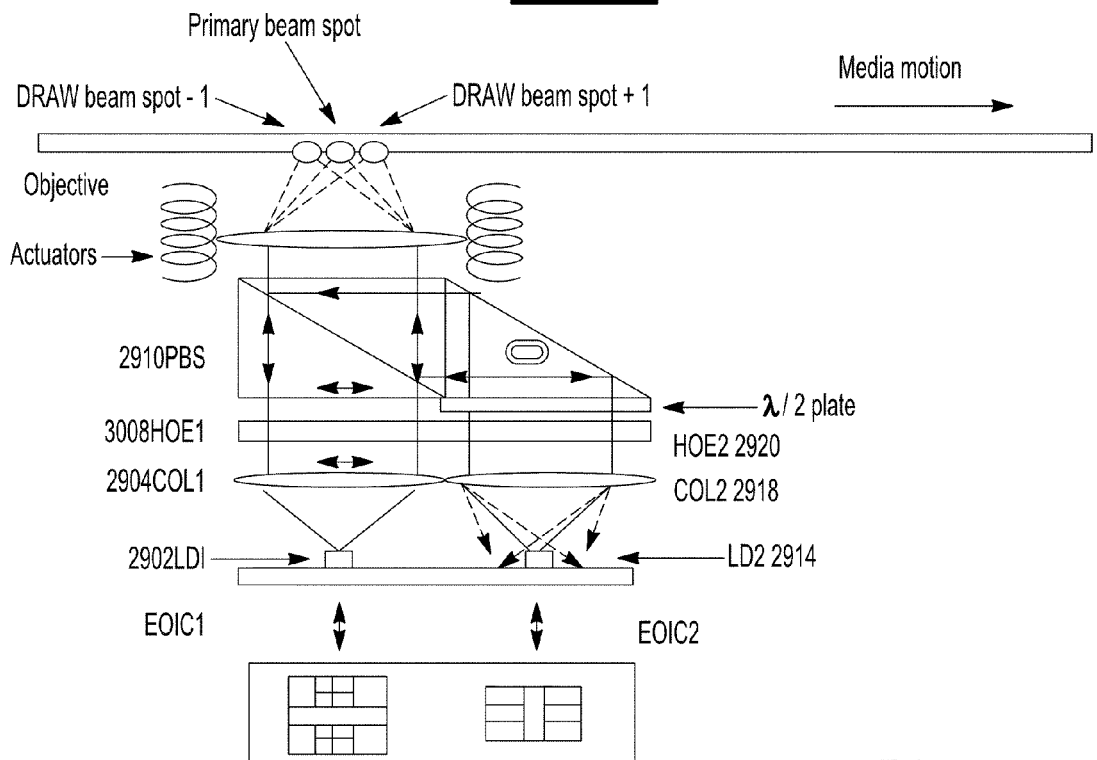
FIG. 36 shows an embodiment of a compact DRAW optical tape pickup head.

Since mounting two laser diodes on one silicon chip at an angle of 90° to each other, as shown in FIG. 33, may present some manufacturing challenges, two other versions are shown in FIG. 35 and FIG. 36, where the two laser diodes have an identical orientation. The embodiment shown in FIG. 35 may provide the same function as the first embodiment discussed in FIG. 29. The embodiment shown in FIG. 36 may provide the same function as the embodiment discussed in the FIG. 30 based method two. However, in these versions, another birefringent plate 3602 may be added to the second beam to rotate its polarization by 90°.

Since, in embodiments, light source LD 1 2902 may be used for writing while light source LD2 2914 may be used for DRAW read, the light source LD2 2914 power requirements may be much less demanding, and less costly, lower power lasers may be used for light source LD2 2914.

In an embodiment, an optical pickup head (OPH) may be adapted to permit a large tracking range of optical media (e.g. optical tape) as described herein.

Figure 37A:
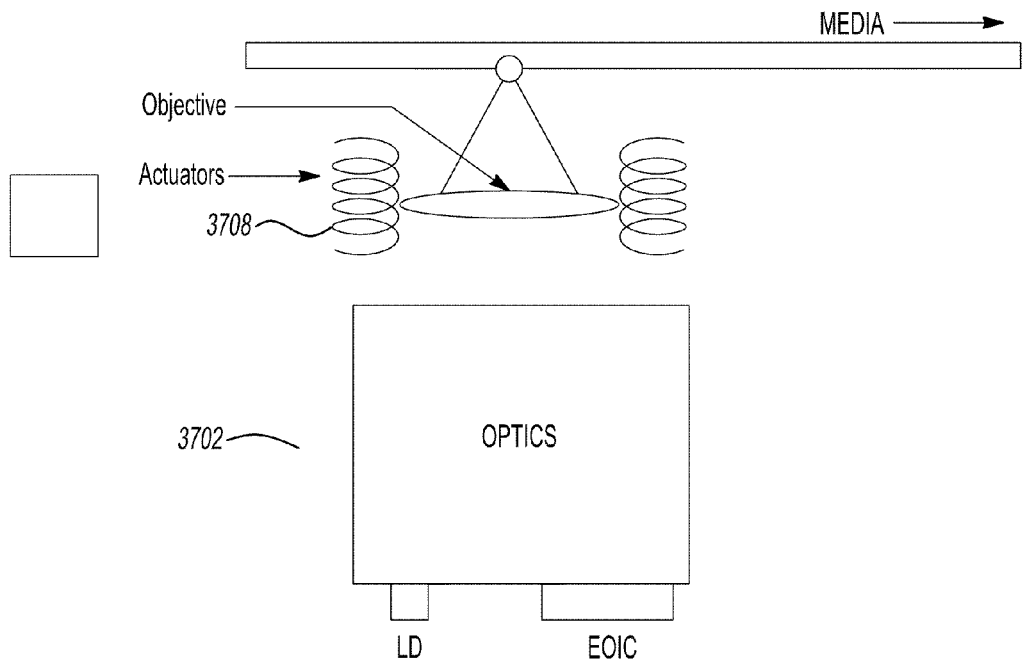
FIG. 37 shows an embodiment of an optical tracking system adapted for optical tape and an embodiment of the invention with the unit moving to track the optical tape.
Figure 37B:
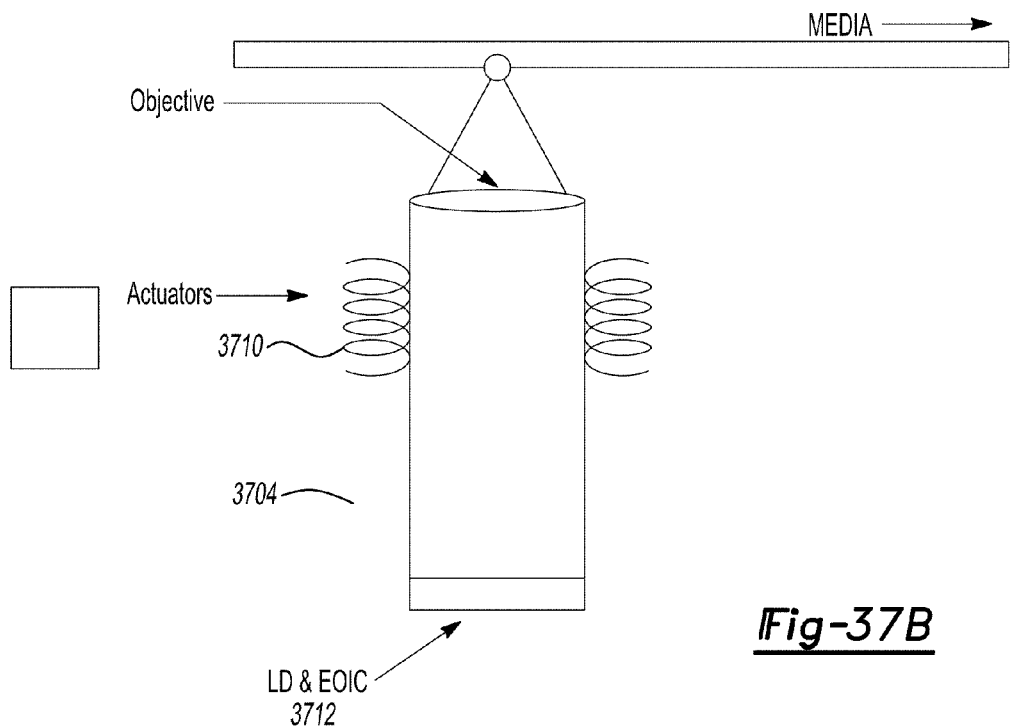

Referring to FIG. 37, an embodiment of a conventional PUH 3702 (FIG. 37A) and an embodiment of the integrated electro-optic assembly 3704 (FIG. 37B) are shown. Using the optical actuator 3708 to move just the objective lens may lead to undesirable beam movement in relation to the remainder of the optic assembly; this may lead to servo tracking errors as the beam focal point moves away from a proper position range. Using the optic assembly 3704 the entire optical lens assembly may be moved by the actuators 3710 to track the optical tape. This may maintain the proper position of the return beam on the electro-optic integrated circuit 3712. Thus the tracking range may now be based on the range of the actuator rather than by optical vignetting and beam walking problems discussed below.

Referring to FIG. 38, an illustration shows the optical vignetting caused when only the objective lens may be moved to track the optical tape tracks. Conventional pick up heads (PUH) may have track range limitations due to problems caused by optical vignetting and beam walking. When the track center may be near the center of the Gaussian beam profile before emerging from the objective lens, a perfect push-pull pattern may be obtained on the quad detector.

When the track under consideration moves downward from a first position 3804 to a second position 3808 due to media runout, the servo loop may cause the lens to also move downward. The focal point will thus try to follow the track center; however, this may cause the Gaussian beam profile impinging on the objective lens to be no longer centered on the aperture. This slight imbalance may cause the push-pull pattern at the detector 3802 to also be imbalanced, resulting in a small error signal. A finite conjugate objective lens 3810 may be used where the beam impinging on the objective lens has a divergent wave front. When the lens moves to follow the track runout, the return beam may suffer from a beam walking problem on the detector 3812.

In the conventional PUH embodiment, the imbalanced push-pull pattern and beam walking at the detector may create less desirable beam position at the electro-optic integrated circuit EOIC. The less than desirable beam position may limit the number of tracks that the PUH may be able to cover to tens of tracks.

Referring to FIG. 39, an embodiment of the invention may be shown with the electro-optic integrated circuit (EOIC) 3902, laser diode (LD) 3904, astigmatic lens 3908, holographic optical element (HOE) 3910, actuator 3912, and objective lens 3914 all part of a single assembly 3918. By moving the objective lens 3914 with the assembly 3918, the optical vignetting and the optical shift problems may be eliminated. To position the pick-up head (PUH) assembly 3918 accurately requires sufficient servo bandwidth and thus the assembly 3918 may require a low weight. The low weight may be provided by an integrated design.

In the integrated design, the laser diode LD 3904 may be mounted directly on the electro-optic integrated circuit EOIC 3902. The electro-optic integrated circuit EOIC 3902 may include a silicon chip with a segmented detector, a current amplifier, and a voltage amplifier. A simple grating may be used for the holographic element HOE 3910; the holographic element HOE 3910 may divide the beam into 0th and ±1 orders. The 0th order may have 50% efficiency while the ±1 orders may have approximately 25% efficiency each. The 0th order beam may be used for read/write, as well as the focus/track functions. When the 0th order beam may be returned to the holographic element HOE 3910, the two first order beams may be diffracted to the left and right six-segment detectors of the electro-optic integrated circuit EOIC 3902. Each one of the diffracted beams may be used for focus/track and read/write functions. The signals in the two segments may be equivalent and may be summed to improve the SNR (signal-to-noise ratio) by 3 dB.

In another embodiment, the simple grating may be replaced by an on-axis hologram. It may provide both positive and negative lensing effects such that, for example, one six-element segment may receive light from before the best focus, while the other six-element segment may receive light from after the best focus on the media. This may allow for a differential spot focusing method to be used. Another significant advantage of the hologram may be that the two first order beams in the outgoing beam may be out of focus; this may produce a low amount of return light into the detector. The two first order spots may be unwanted and therefore the low return light may be ignored.

In an embodiment, by moving the entire assembly when tracking the optical tape media, the optical-electric assembly may maintain a balanced push-pull pattern without beam walking at the detector on the electro-optic integrated circuit EOIC 3902. The improved focus with a consistent balanced push-pull pattern of the optical-electric assembly may provide for a greater number of covered tracks on the optical tape; the integrated optical-electric assembly may be able to cover thousands of tracks.

Referring to FIG. 40, an embodiment of a Direct Read After Write (DRAW) feature may be shown incorporated into the integrated design assembly 3918. The DRAW may be described further in FIG. 29 through 34. The DRAW may be an additional low power laser diode that may provide a ±1 order beam. The ±1 order beam may allow the optical pickup head (PUH) to perform a read immediately after a write to minimize write errors. The incorporation of the DRAW into the integrated design assembly 3918 may provide the same improved tracking to the DRAW as the primary beam receives from tracking the entire assembly 3918.

In an embodiment, a transport as described herein may be adapted for transporting multiple optical heads used to interface with optical tape in an optical tape facility.

The tape drive may have a tape guiding system without any discrete guiding mechanism between a removable cartridge reel and a take-up reel. When the removable cartridge may be inserted into the tape drive the media may be pulled onto the take up reel using a take up leader that may attach to the leader material in the media cartridge.

Referring to FIG. 41, an embodiment of a re-orientation of the optical head transport facility at the tape position extremes may be shown. A head transport facility 4102 may be positioned between the cartridge reel 4104 and the take up reel 4108. The head transport facility 4102 may be located on a mechanism that may allow for lateral positioning such that the distance from the head transport facility 4102 to the media may be controlled; the head transport facility 4102 may be required to be a distance from the media for optimal read/write operations. As the media may be moved from the cartridge reel 4104 to the take up reel 4108 the head transport facility 4102 mechanism may adjust for the changing distance to the media. The head transport facility 4102 may also adjust for the changing angle of the media to the head transport facility 4102 as the media may be transferred between the reels. In an embodiment, as the media moves from the cartridge reel 4104 to the take up reel 4108 the angle and distance relative to the head transport facility 4102 may change based on the amount of media on each of the reels; the angle and distance may continuously change during operation of the tape drive. The exact position of the head transport facility 4102 may be determined by an algorithm in the compensation system of the servo controlled mechanism.

Multiple heads may be used in a single head transport facility to increase the data transfer rate of an optical drive. Each individual head may use it's own servo control positioning system for the accurate positioning of the head, then the head transport facility 4102 may be used to approximately position the array of heads close to the tape. This may greatly minimize the complexity of using many optical heads.

Referring to FIG. 42, the head transport facility 4102 may include a plurality of optical heads 4202, each with its own servo controlled actuator and positioning system. The optical heads 4202 may be arranged such that each optical head 4202 may be responsible for reading and writing data in a zone 4204 of optical tape. In an embodiment, a zone 4204 of the optical tape may be a number of optical tape tracks. There may be enough optical heads 4102 in the head transport facility 1102 to cover all of the tape's zones 4204 or tracks. Each optical head 4202 may be capable of being positioned to any of the recording tracks within the optical head's 4202 zone 4204 without affecting the other optical heads 4202; the range of motion of each optical head 4202 may be entirely within the servo controlled actuator range of motion. Additionally, the focusing control for each optical head 4202 may have enough range of motion to permit each optical head 4202 to maintain focus during the rotational motion of the tape as it moves from the beginning to the end of the optical tape; the maintaining of focus may be in either direction of optical tape motion.

Referring again to the tape drive of FIG. 41, there may not be guiding members 4112 to fix the position of the optical tape, therefore the head transport facility 4102 may move laterally and rotate to maintain a proper orientation with the optical tape. In an embodiment, the head transport facility 4102 may have it's own closed loop servo system with information originating from the individual optical heads 4202. An advantage of this system may be that the head transport facility 4102 may use sensor information from the optical heads 4202 there may not be a requirement for extra sensors for the head transport facility 4102.

Systems and methods may also allow for a head transport facility 4102 on both sides 4110 of the media, at least two head transport facilities 4102 4110 may be connected to the same head transport system.

FIG. 42 shows an embodiment of the head transport facility containing a number of individual heads 4202. In an embodiment, the number of individual optical heads 4202 in the head transport facility 4102 may be based on the size of the head transport facility 4102 and the number of tracks and optical tape width required to be covered. For example, if there are one thousand tracks on the optical media and each individual optical head 4202 may be capable of covering two hundred tracks within a zone 4204, there may only be five individual optical heads 4202 in the head transport facility 4102. In an embodiment, the number of optical heads 4202 may not be directly related to the number of tracks and the number of tracks that each individual optical head 4202 may cover; there may be a certain number of tracks overlapped between individual optical heads 4202 and therefore increase the number of optical heads 4202 needed for a certain number of tracks. Each optical head 4202 may be independent in its ability to control both focus and data track acquisition. Each optical head 4202 may be aligned to any of the plurality of data tracks within a dedicated zone 4204.

In an embodiment, an optical tape drive may be adapted as described herein for high density storage using optical tape media.

In a typical tape drive there may be rotating rollers that guide the media from the cartridge reel, past the head transport facility to the take up reel. One of the purposes of these machined rollers may be to reduce the lateral tape motion created by the cartridge and take up reels; however the rollers themselves may create lateral tape motion at higher frequencies than the reels. In embodiments, servo controlled positioning systems for the head assemblies may create the ability for such a system to compensate for low frequency motion from the reels may be improved and may be superior to that for the roller higher frequencies.

Figure 43:
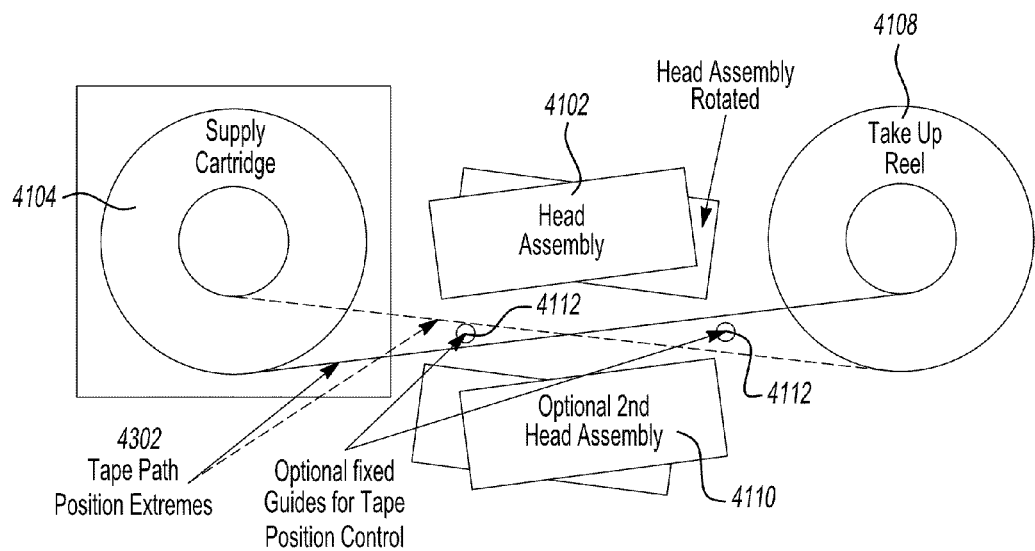
FIG. 43 shows an embodiment of a re-orientation of the head transport facility at tape position extremes.

Referring to FIG. 43, an embodiment of the re-orientation of the head transport facility 4102 to the tape extremes 4302 may be shown. An aspect may have a tape guiding system without any discrete guiding mechanism between the removable cartridge reel 4104 and the take-up reel 4108. When a removable cartridge 4104 may be inserted into the tape drive, the media may be pulled onto the take up reel 4108 using a take up leader that attaches to the leader material in the media cartridge.

The head transport facility 4102 may be positioned between the cartridge reel 4104 and the take up reel 4108. The head transport facility 4102 may be located on a mechanism that allows for lateral positioning such that the distance from the head assembly to the media may be accurately controlled. In the case of a no contact recording, the head may be required to be a certain distance from the media. As the media may be moved from the cartridge reel 4104 to the take up reel 4108 the angle of the tape may be constantly changing as the amount of tape on each reel changes. As the media may be moved from the cartridge reel 4104 to the take up reel 4108 the head transport facility 4102 may adjust for the changing distance to the media. The head transport facility 4102 may adjust for the changing angle of the media to the head transport assembly 4102. The exact position of the head transport facility 4102 may be determined by an algorithm in the compensation system of the servo controlled mechanism.

The lateral tape motion (LTM) in this tape path may originate from the supply reel 4104 and the take up reel 4108 only. In an embodiment, the manufacturing tolerances for these two components may be controlled to several thousandths of an inch larger than the tape width; therefore, the tape may be provided with adequate guidance without the use of guide rollers. The frequency of the LTM may be substantially at the rotation frequency of the reels; the frequency may be 10 to 400 Hz. This frequency may be significantly less than the frequency the guide rollers may introduce; guide roller 4112 LTM frequencies may be many hundreds of hertz. At the lower frequencies, the servo controlled head transport facility 4102 positioning system may be very efficient using a bandwidth of about 1 kHz. The head transport facility 4102 servo controls may be able to better adjust for the lower frequency LTM created by the reel-to-reel tape motion. The efficient positioning head transport facility 4102 may have improved tape tracking and therefore may be able to read and write higher density tape tracks.

While the absence of rotating guiding 4112 members may be relied on, in an embodiment, it may be possible to have one or more fixed non-rotating guides 4112 for maintaining positional consistency of the media at the head transport facility 4102.

In an embodiment, this may also allow for using head transport facilities 4102 4110 on both sides of the media since there may not be extra wear on one side due to guiding rollers 4112. The use of a second head transport facility 4110 and recording data on the other side of the media may also increase the high density recording.

A laser head tracking system may track the position of data on a moving optical tape media for the purpose of writing data in the correct position on the media in relation to previously written data on the media.

Figure 44:
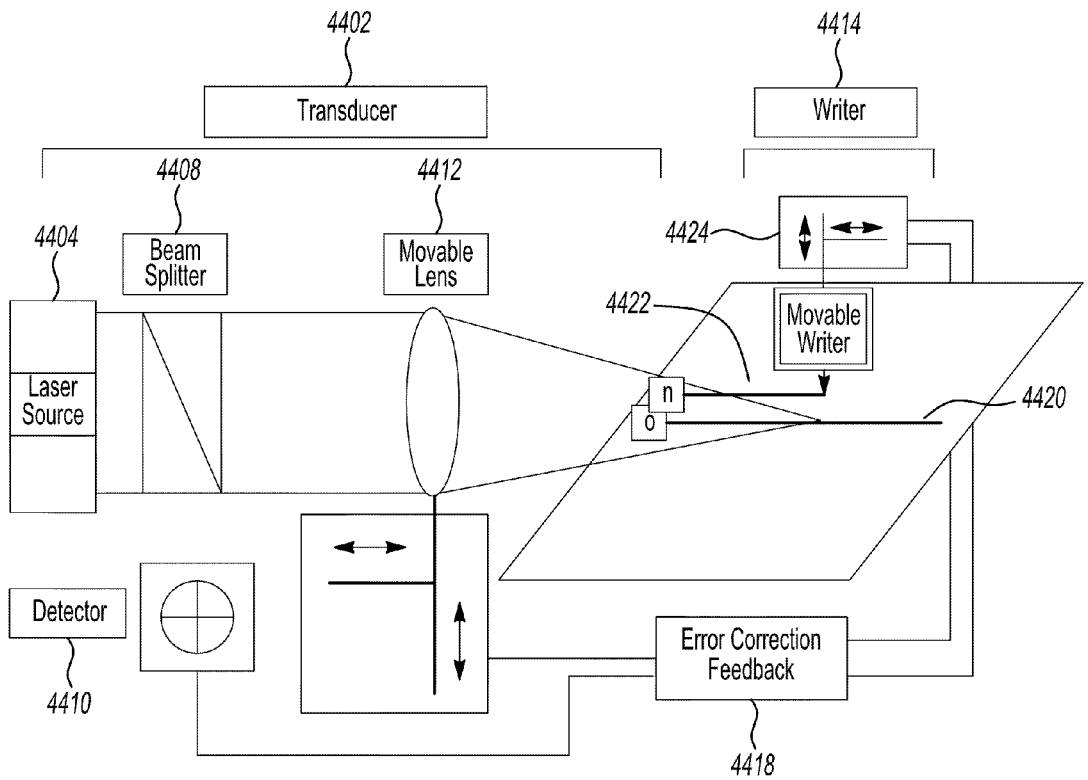
FIG. 44 shows an embodiment of a transducer assembly reading previously written data and providing information to the writer for the next information to write.

Referring to FIG. 44, an embodiment of the invention may be shown. There may be a transducer assembly 4402 that may include a laser source 4404, beam splitter 4408, detector 4410, and a movable lens 4412. The moveable lens 4412 may move independent of the rest of the transducer assemble 4402 or may be moved with the transducer assembly 4402 as a complete unit. The laser source 4404 may provide light that may be focused on the media by the movable lens 4412. The light may reflect back through the moveable lens 4412 to the beam splitter 4408 that may direct the reflected light to the detector 4410. The detector 4410 may be associated with a processor that may be capable of interpreting the light reflected from the media. The position of information on the media may be determined by using the transducer 4402 that may measure the position of information that may have been previously written to the media. In an embodiment, there may be a processor that may calculate the next correct position for information to be written by a writer 4414. The writer 4414 may include a laser source, beam splitter, detector, and moveable lens. The writer 4414 may have actuators 4424 that may position the writer 4414 to a position to write data; the actuator 4424 may move the moveable lens or may move the entire writer 4414 assembly. The writer 4414 may write the new information on the media.

In an embodiment, the writer 4414 may receive positioning information from the transducer 4402 through an error correction feedback facility 4418. In an embodiment, the transducer 4402 may read the previously written data 4420 on the media and may feed the positioning information to the error correction facility 4418; the feed of information may be in real time. The previously written data 4420 may be received by the transducer detector 4410; the detector 4410 may feed the previously written data 4420 position to the error correction feedback facility 4418. The correction feedback facility 4418 may also receive previously written data 4420 positioning information from the moveable lens actuators. In an embodiment, the error correction feedback facility 4418 may contain logic to combine the previously written data 4420 positioning information from both the transducer detector 4410 and moveable lens actuator. In an embodiment, the error correction feedback facility 4418 may calculate the next position 4422 to write information; the next position 4422 may be feed to the writer 4414.

In an embodiment, the writer 4414 may receive the positioning information from the error correction feedback facility 4418. In an embodiment, the writer 4414 may receive the positioning information directly to the writer actuators 4424. In an embodiment, the writer 4414 may receive the positioning information to a processor that may calculate the next position 4422 for writing data to the media. In an embodiment, the next position 4422 for writing data may be in relation to the previously written data 4420 read by the transducer 4402.

In an embodiment, the next written data 4422 may be a set position from the previously written data 4420; the set position may be part of the read/write logic and therefore may not require positioning information to be written into the written data 4422.

In an embodiment, the next written data 4422 may not be a set position from the previously written data 4420; the data spacing may be written as part of the data written to the media.

In an embodiment, the next written data 4422 may be a set position based on a system variable; the system variable may be based on the required data density. In an embodiment, the position information may not be written into the written data 4422. In an embodiment, the system variable may be stored in the transducer 4402, the writer 4414, the error correction feedback facility 4418, or the like.

In an embodiment, multi-demodulation of received signals may be included in an optical tape facility for fast and accurate signal processing.

Modulated signals received by a multi-demodulator may represent a plurality of information such as amplitude, phase, frequency, and the like. The information may be a transmitted communication signal, a temperature, a position and velocity of an electromechanical device received electronically, or the like.

These modulated signals may also identify different types of products and their properties such as product type, product serial number, product distinguishing factors, attributes transmittable electronically or optically, and the like.

The multi-demodulator may determine the type of the received signal and an instantaneous value based upon the shape and carrier frequency; this information may be provided to a host device. The host device may apply a set of rules and decisions for the operation of the device based on the type and instantaneous value information provided by the demodulator.

The real time demodulation capability of this system may enable an application a fast and accurate signal processing for applications such as real time data and signal processing in communication systems, electromechanical control systems, and the like.

Figure 45:
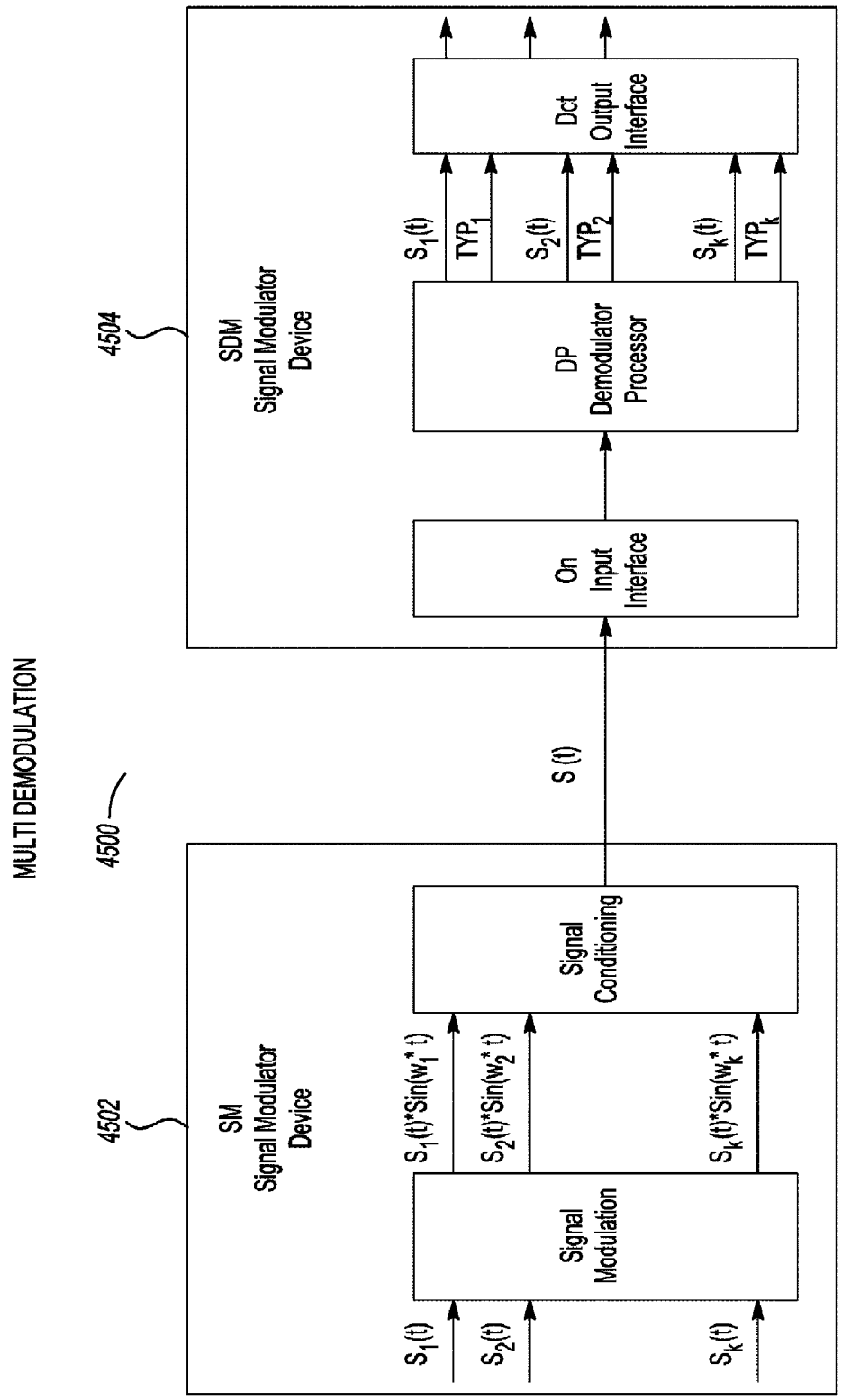
FIG. 45 shows a high level embodiment of a signal modulator and signal demodulator.

Referring to FIG. 45, a high level embodiment of the demodulator 4500 may be shown. The demodulator 4500 may include a signal modulator input device 4502 to receive and condition the signals and a signal demodulator device 4504 that may demodulate the combined signal S(t) to individual outputs. The conditioning of the signals may include signal amplification, signal filtering, analog to digital conversion, or the like. A modulated signal S(t) may be received by the demodulator 4500 and may be a single modulated signal representing one of many types of modulated signals with different carrier frequencies as described by Eq1. The modulated signal S(t) may be a sum of these modulated signals as in Eq2.

$$S(t) = \{S1(t)*\sin(w1*t)\} \text{ Or } \{S2(t)*\sin(w2*t)\} \ldots \text{ Or } \{Sk(t)*\sin(wk*t)\} \quad (Eq1)$$

Or $$S(t) = \{S1(t)*\sin(w1*t)\} + \{S2(t)*\sin(w2*t)\} + \ldots \{Sk(t)*\sin(wk*t)\} \quad (Eq2)$$

The demodulator 4500 may be able to determine the presence of the plurality of Sk(t) signals in the received signal S(t) and may also be able to demodulate the instantaneous values of any Sk(t) signals presented in S(t).

Figure 46:
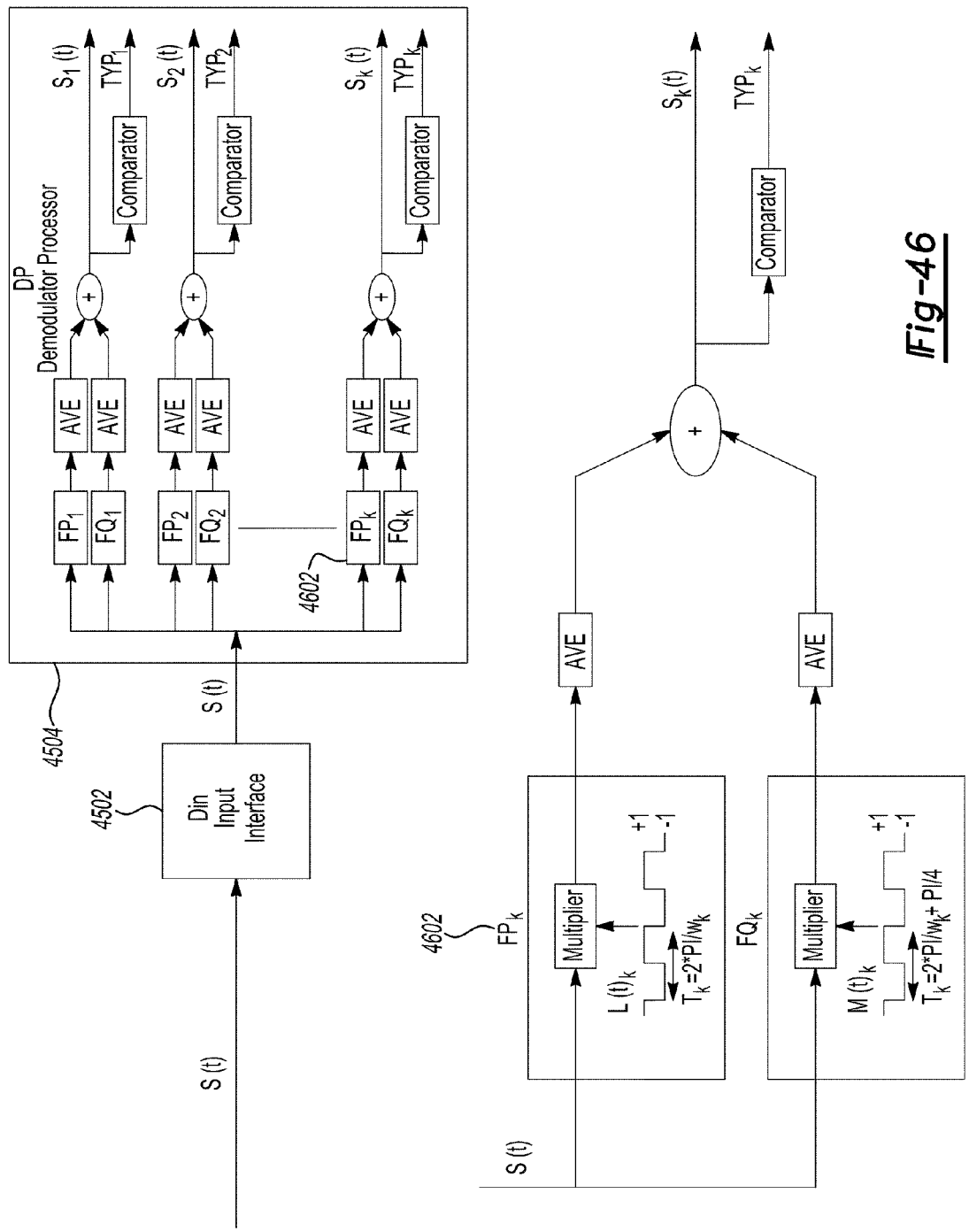
FIG. 46 shows an embodiment of a signal demodulator.

Referring to FIG. 46 a more detailed embodiment of the demodulator may be shown. In an embodiment, the signal S(t) may first be conditioned by a device input interface (Din) 4502 and then may be processed by a set of complimentary filters in the signal demodulator 104:

[FP1&FQ1], [FP2&FQ2], . . . [FPk&FQk]

The complimentary filters may determine the presence and type of the different signals Sk(t) in the S(t) signal and may report the type of signal by a set of output signals.

TYP1, TYP2, . . . TYPk and their instantaneous (real-time) magnitudes by:

S1($t$), S2($t$), . . . Sk(T)

The demodulation process may be either analog or digital. The function of the Din 4502 in the analog design may be to adjust the level and amplitude of input signal S(t) for processing. In the digital design the Din 4502 may be an analog to digital converter (ADC) and the level and amplitude of S(t)n (S(t)n=sampled S(t) at Ts sample rate) may be adjusted later in by a system microprocessor or an application specific integrated circuit (ASIC). The operation of the complementary filters may be:

[FP1&FQ1], [FP2&FQ2], . . . [FPk&FQk]

The received signal S(t) may be described in the set of equations:

$$P1 = S(t)*L(t)1$$

$$Q1 = S(t)*M(t)1$$

$$P2 = S(t)*L(t)2$$

$$Q2 = S(t)*M(t)2$$

$$\vdots$$

$$\vdots$$

$$Pk = S(t)*L(t)k$$

$$Qk = S(t)*M(t)k$$

Where L(t)k may be a rectangular function with the frequency wk associated with the carrier frequency for signal {Sk(t)*sin(wk*T)}. M(t)k may be a rectangular function with a frequency wk, the frequency may be 90 degrees out of phase with L(t)k signal.

Further processing may produce:

$$FP1 = AVE(P1)$$

$$FQ1 = AVE(Q1)$$

$$FP2 = AVE(P2)$$

$$FQ2 = AVE(Q2)$$

$$\vdots$$

$$\vdots$$

$$FPk = AVE(Pk)$$

$$FQk = AVE(Qk)$$

Where AVE (Pk) and AVE Q(k) may be the running sum averages in real time of the Pk and Qk signals.

From the Fourier Transformation theorem the following derivations may be made:

$$S1(t) \propto FP1 + FQ1$$

$$S2(t) \propto FP2 + FQ2$$

$$\vdots$$

$$\vdots$$

$$Sk(t) \propto FPk + FQk$$

where $\propto$ indicates the proportionality.

Thus, the amplitude of any signal Sk(t) or its presence or non presence in S(t) may be determined in this method.

In an embodiment, an optical tape facility as described herein may be configured for error correction using multi-channel ECC interleaved with in-line ECC.

User data may be formatted into logical Kbyte blocks of data. For the logical Kbyte blocks of data, ECC symbol blocks may be generated to create an ECC entity that may include the logical Kbyte blocks of data and the ECC symbol blocks. This ECC entity may be referred to as the ECC coding scheme (C+D, D) where C+D may be the total number of blocks that make up the ECC entity and D may be the number of ECC blocks that may be generated. D may also be the number of blocks that may be corrected in the ECC entity during reading of the tape.

Once data may be formatted into ECC entities, the blocks of data that may make up the entity may be encoded with a per channel ECC that may correct bytes of error data out of the Kbytes blocks of data. The formatted data blocks may be interleaved to create an ECC block to be recorded on the tape. The ECC block may be a multiple interleaved block from the channel ECC entity to form a multi-block recorded ECC frame on the tape.

In an embodiment, during the read process the inline ECC may correct up to 10 bytes of data in error per logical Kbyte blocks of interleaved data. As data may be read, any blocks that may be in error may be corrected for up to about 10 bytes. If the ECC cannot correct the data, the block in error may be corrected by the cross-channel ECC that may use data recorded in other tracks on tape.

In an embodiment, a servo tracking system may be described for multiple optical heads of a transport facility that may provide a feed forward tracking signal for the multiple optical heads.

Figure 47:
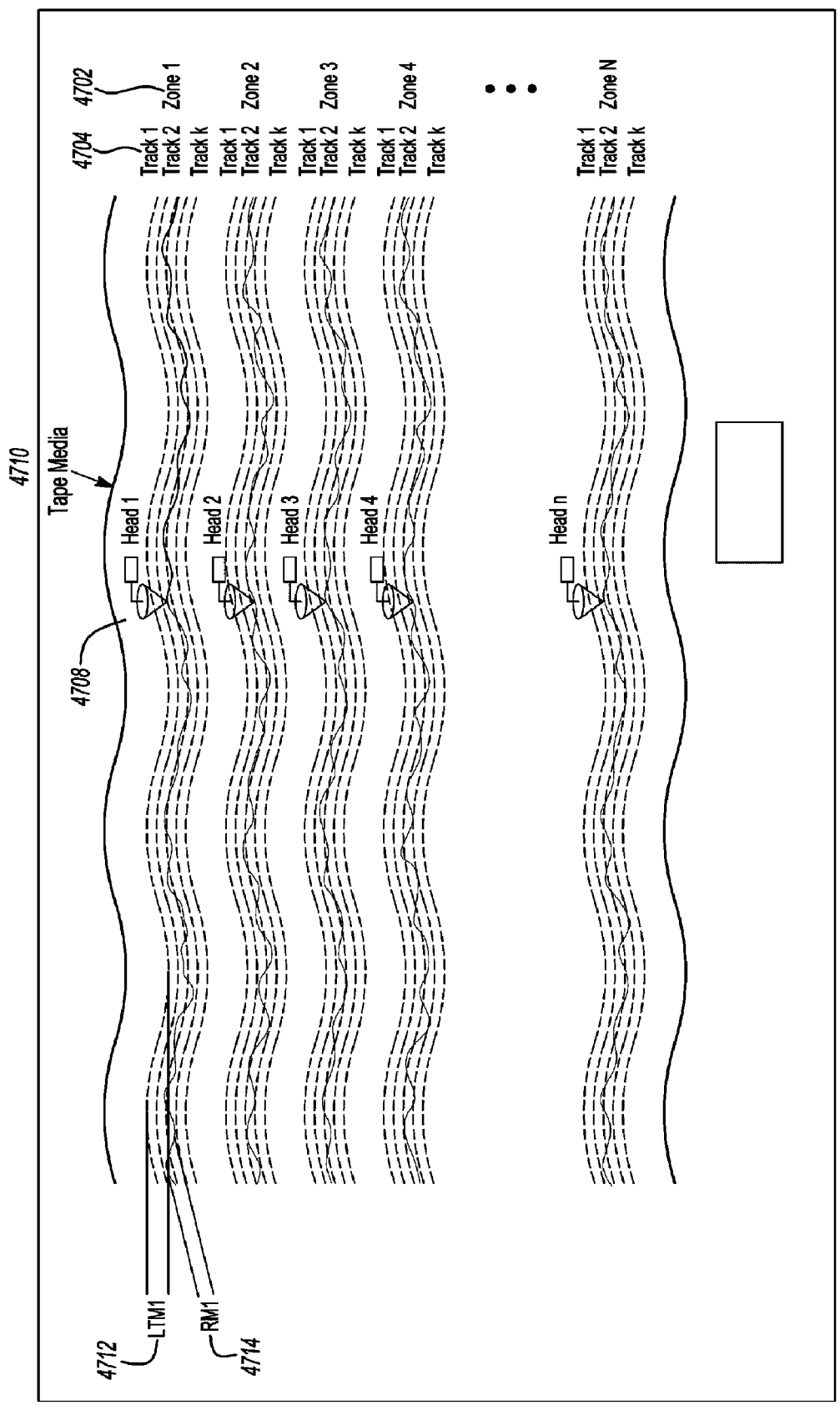
FIG. 47 shows an embodiment of the lateral tape movement (LTM) and residual motion (RM) of each individual optical head.

Referring to FIG. 47, a formatted optical tape media 4710 may have multiple track zones 4702 (N track zones). There may be multiple tracks 4704 (K tracks) within each of the multiple track zones 4702.

Each multiple track zone 4702 may have it's own dedicated optical read/write head 4708. In this manner, data may be written and read from the optical media 4710 in a parallel data streaming fashion as the optical tape moves past the stationary heads 4708.

A track misregistration (TMh) for each multiple track zone 4702 may be governed by two major components. The track misregistration may be the movement of an individual track in relation to the optical head 4708. Lateral tape motion (LTM) 4712 may be common for all the heads 4708 and a residual motion 4714 (RMh) of each head 4708, which may be specific to each head. LTM 4712 may be the motion of the optical tape media 4710 in relation to the head transport facility. Thus:

$$TM1 = LTM + RM1$$

$$TM2 = LTM + RM2$$

$$TM3 = LTM + RM3 \quad \text{EQU 1}$$

$$\cdot$$

$$\cdot$$

$$\cdot$$

$$TMN = LTM + RMN$$

The servo sensing head for each multiple track zone 4702, which may be the same as the read/write head 4708, may only be able to detect the relative motion of each track with respect to the specific head 4708 dedicated to that multiple track zone 4702. The servo sensing head may only be able to determine the total value of the TMh for a particular multiple track zone 4702. TMh may be a relative motion signal and it may be used as a feedback signal in the device servo system for each multiple track zone 4702 and the device servo system may have predetermined bandwidth capabilities for the servo performance.

A head transport facility that may use multiple heads 4708 and for multiple track zones 4702 the summation of all TMh's (SUM) may be computed by the device servo processor to aid the servo system in determining the TMh and RMh contributions to the total TMh for each head as follows:

Since the LTM 4712 may be the same for all heads, from EQU 1, the sum of all optical head misregistrations is:

$$SUM = TM1 + TM2 + TM3 + \cdots + TMN = N*LTM + (RM1 + RM2 + RM3 + \cdots RMN)$$

Thus to determine LTM:

$$LTM = SUM/N + (RM1 + RM2 + RM3 + \cdots RMn)/N \quad \text{EQU 2}$$

The combined RMh may be a non-correlated component for the combined TMh contribution in the term $(RM1+RM2+RM3+\cdots RMn)/N$ of EQU 2 and it's value may be reduced considerably as N increases. Therefore, the LTM 4712 value may be approximated by the following equation:

$$LTM = SUM/N \text{ (Approximated)} \quad \text{EQU 3}$$

The LTM 4712 may be an absolute and common value with respect to all the heads 4708 and LTM 4712 may be independent from the motion of the individual head sensor. The approximated LTM of EQU 3 may be used as a Feed-Forward signal for each head 4708 and multiple track zone 4702 servo system to improve the servo error suppression performance for each head 4708. The LTM 4712 Feed-Forward signal may be combined with each individual optical head 0708 RM signal for improved optical head tracking.

In an embodiment, a method and system may be described for reading, demodulating, and decoding servo information.

Servo track information may be preformatted information on an optical tape media. This preformatted information may include data and coding synchronization patterns and track addresses. Servo markings may be placed on the optical tape media to create a sinusoidal pattern that may be retrieved from the media by the servo demodulator.

Figure 48:
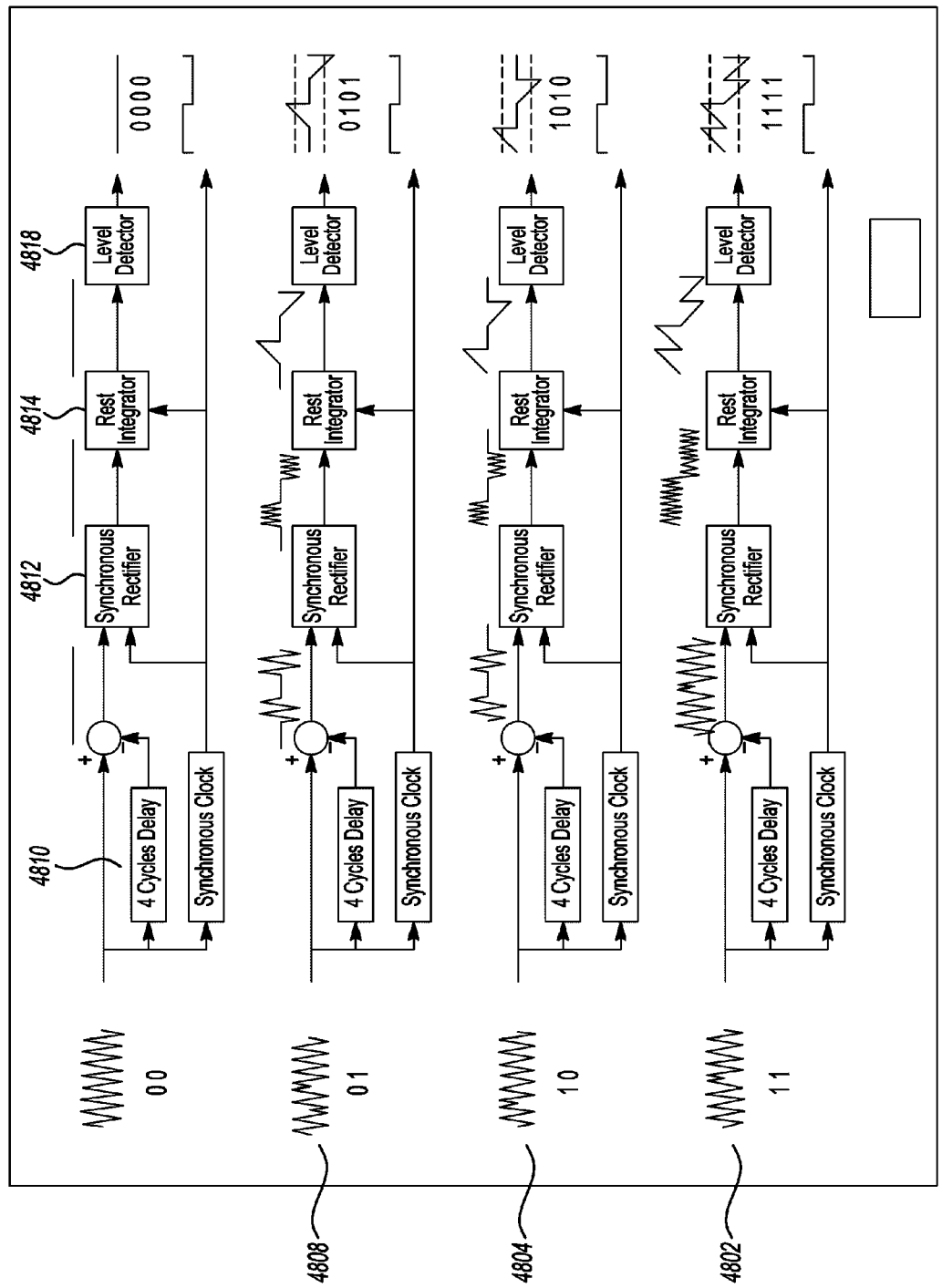
FIG. 48 shows an embodiment of the servo track signal decoding.

Referring to FIG. 48, an embodiment of phase reversal of a sinusoidal pattern may be shown that may be used to produce a signal encompassing a track address and data synchronization information.

In an embodiment, the frequency of the sinusoidal may determine the carrier frequency of the modulation and may provide timing for a synchronous demodulator/decoder. Each eight cycles of the pattern may represent a cell. In an embodiment, any N cycle pattern may be used for the sinusoidal signal. Each cell may carry information on synchronization and address bits. A 4-cycle reversal of the phase of the sinusoidal in the cell may indicate a "1-1" bit 4802 that may also be a synchronization pattern bit. The synchronization pattern may signal the beginning of the address subfields and may be used for synchronization. In the address subfield, the reversal of phase of the two first sinusoidal cycles in the cell may indicate "1-0" 4804 which may be decoded as bit "1" for the address and the reversal of phase for the second two cycles "0-1" 4808 in the cell may be decoded as bit "0" for the address.

The decoder may use an analog or digital delay 4810 in order to delay the detected sinusoidal signal and subtract it from the detected signal. In FIG. 48, the delay 4810 may be shown as a four cycle delay, but the delay 4810 may be any number of cycles. This may be robust method of detecting the reversal of the phase in phase modulated patterns, since it may use the shape of the phase shifted sinusoidal itself and not the timing properties of the pattern.

Figure 49:
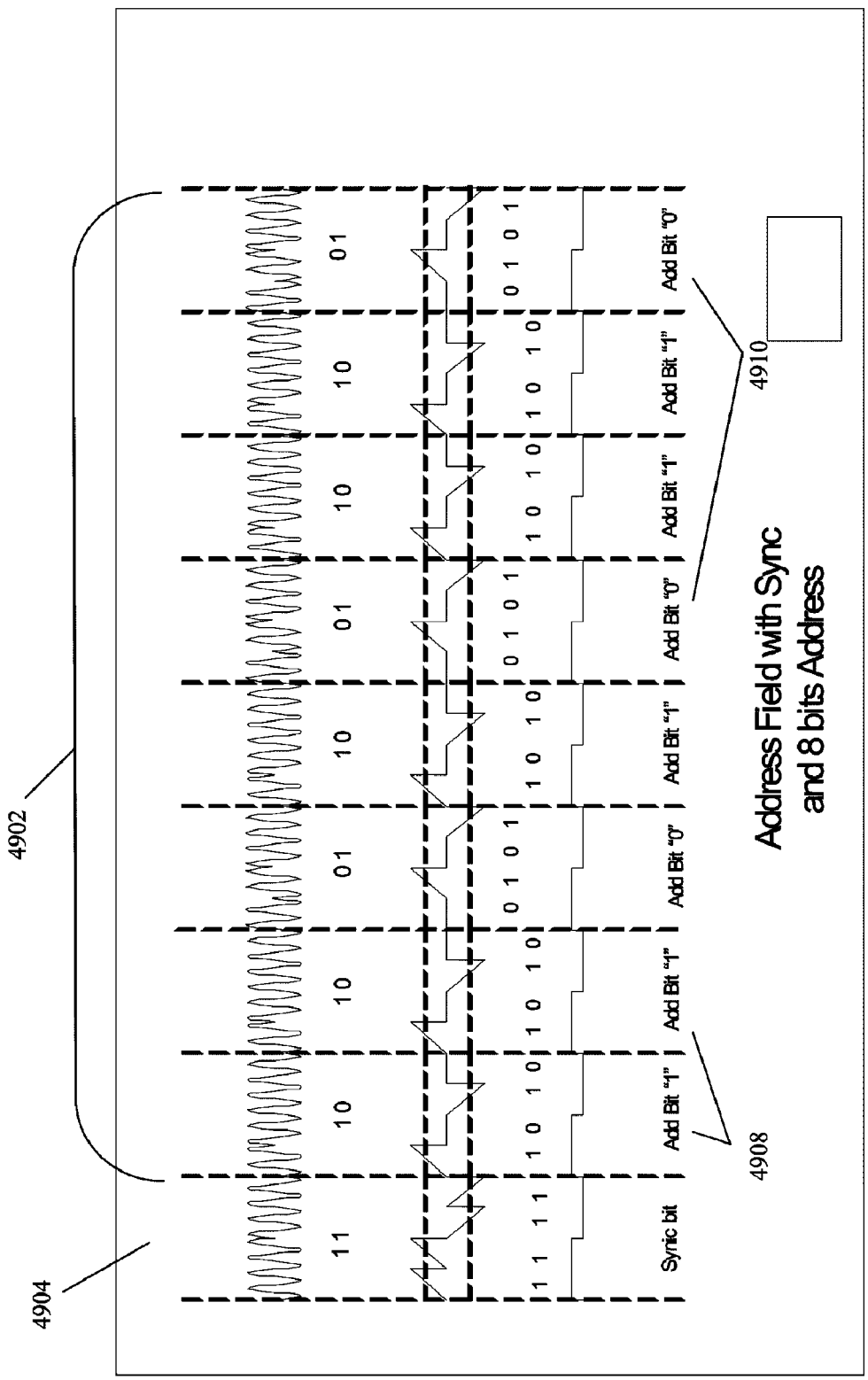
FIG. 49 shows an embodiment of the sync bit and address bits of the servo signal.
Figure 50:
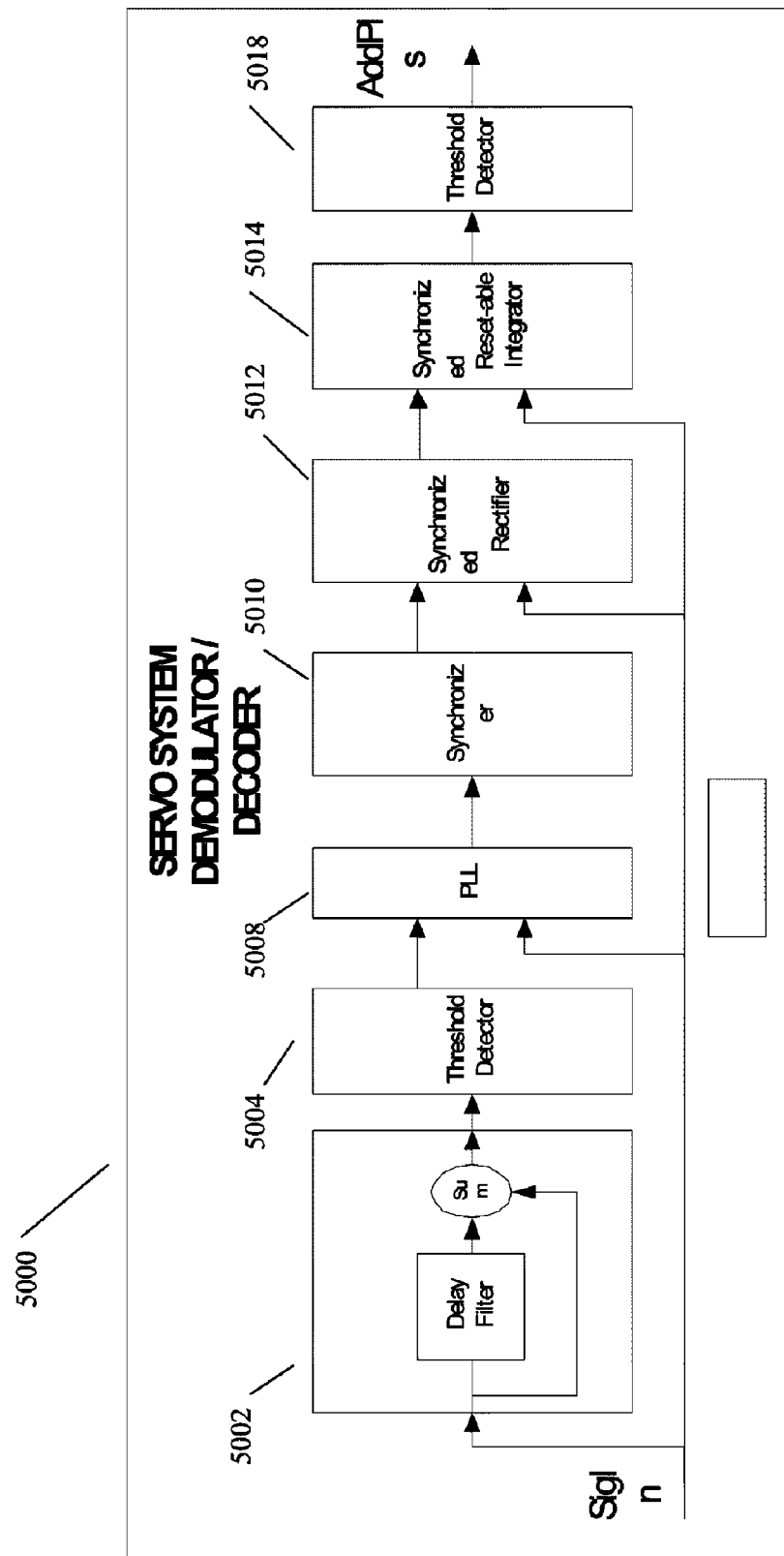
FIG. 50 shows an embodiment of a servo system demodulator/decoder.

In addition, a synchronous rectifier 4812, a rest-able integrator 4814, and a level detector 4818 may be used to decode the synchronization and address patterns as shown in FIG. 48, FIG. 49, and FIG. 50.

Referring to FIG. 49, an embodiment of an eight bit address field 4902 and synchronization bit 4904 are shown. The eight bit address field 4902 may be a combination of the reversal of the phase sinusoidal signals as discussed in FIG. 48. A "1-0" 4804 may represent a "1" bit 4908 and a "0-1" 4808 signal may represent a "0" bit 4910. The sync bit 4904 may signal the beginning of the address subfields and may be used for synchronization.

Referring to FIG. 50, an embodiment of a block diagram of the servo demodulator/decoder 5000 may be shown. The demodulator/decoder 5000 may demodulate and decode the sinusoidal servo signals into synchronization and address bit information. The demodulator/decoder 5000 may include a delay filter 5002, a first threshold detector 5004, a PLL 5008, a synchronizer 5010, synchronized rectifier 5012, a synchronized resettable integrator 5014, and a second threshold detector.

A method for producing tools for creating nickel electroformed shims for optical tape embossing is disclosed herein. The tools may be also called PDMS shim fathers.

Figure 51:
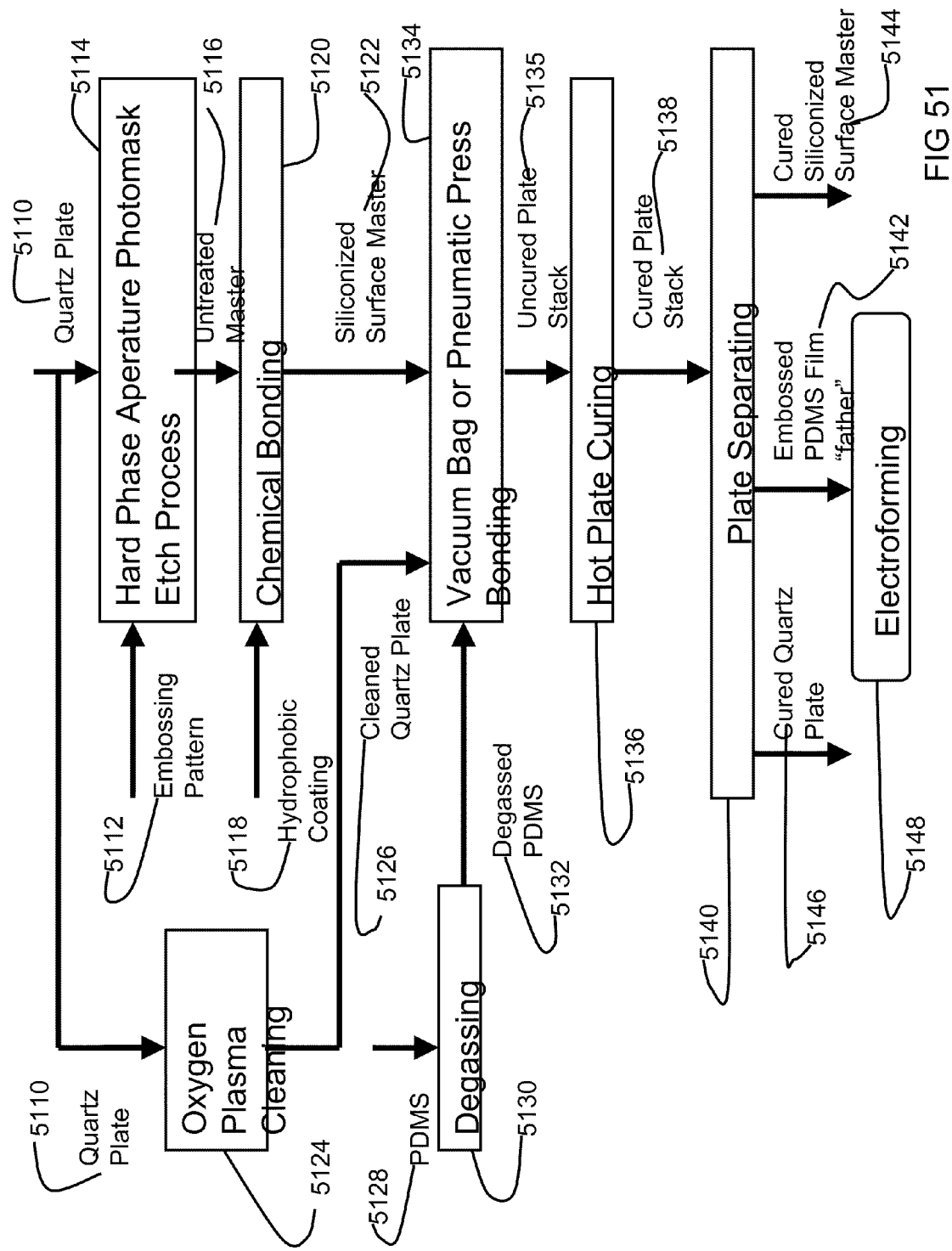
FIG. 51 is a flowchart of a possible embodiment of the shim producing process.

Referring to FIG. 51, one of a plurality of quartz blank plates 5110 may be embossed with an embossing pattern 5112 using a hard phase aperture photomask production etch process 5114, the result being an untreated master 5116. Untreated master 5116 may be treated with one or more hydrophobic coatings 5118 which produce 5120 chemically bound alkylsilicone or polydimethylsiloxane "siliconized" surface master 5122 (United Chemical Technologies Glassclad 18 or Glassclad 6C).

A blank quartz plate 5110 may be oxygen plasma cleaned 5124, generating a cleaned quartz plate 5126. Raw PDMS 5128 (Dow-Corning Sylgard 184 or equivalent) may be degassed 5130, generating degassed PDMS 5132. Degassed PDMS 5132 may be applied to siliconized surface master 5122, and cleaned quartz plate 5126 may be vacuum bagged or pneumatic pressed bonding 5134 against exposed surface of degassed PDMS 5132, resulting in uncured plate stack 5135.

Uncured plate stack 5135 may be then cured on a hot plate 5136. Cured plate stack 5138 may be then separated 5140, resulting in an embossed PDMS film 5142, cured siliconized surface master 5144, and cured quartz plate 5146.

Embossed PDMS film 5142 may be a near zero shrinkage replica of quartz untreated master 5116, and may be further used to electroform 5148 nickel shims (not shown). Embossed PDMS film 5142 has advantages over photopolymer or photoresist replications that include ease of releasing of the nickel electroformed father and very faithful pattern replication.

A method for producing an electroformed nickel embossing drum using two or more discrete nickel electroforms is disclosed herein.

Figure 52:
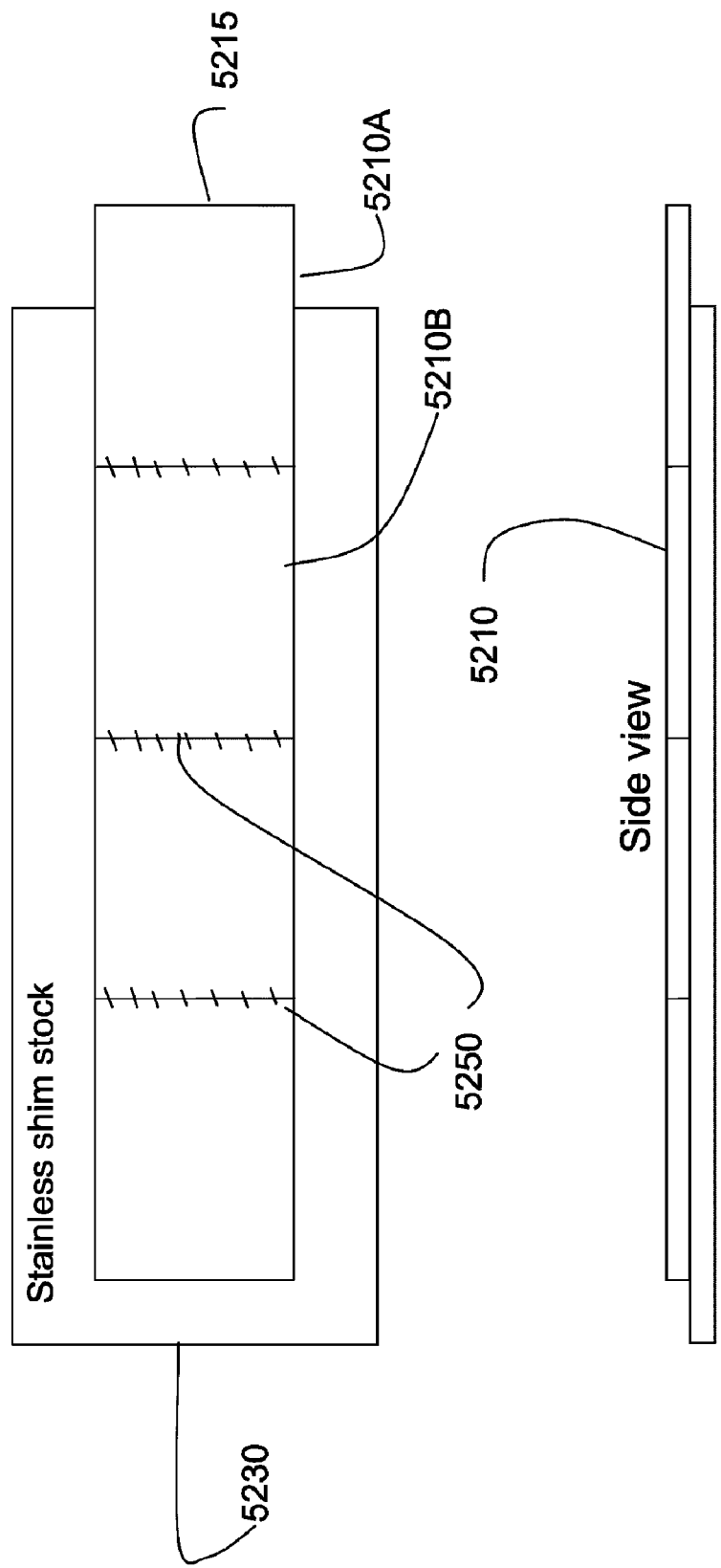
FIG. 52 is a side and top view of a possible embodiment of the planar assembly of the embossing drum.

Referring to FIG. 52, a plurality of nickel electroforms 5210 may be produced using a process selected from a set including conventional PVD mastering technology (laser beam recorder), photopolymer fathers, PDMS fathers, and photoresist fathers made from an etched quartz master.

Nickel electroforms 5210 may be precision-cut to align their edges along the electroformed format. The cutting may be done with a grinding machine using a resin bond diamond grinding wheel.

Stainless steel or aluminum perforated shim stock 5230, having a possible thickness ranging from 0.003" to 0.010", may be cut to approximately the nickel electroform width and a multiple of the nickel electroform length, resulting in a stainless steel or aluminum shim 5230 whose length substantially equals the circumference of an embossing drum (not shown).

Shim stock 5230 may be placed on a magnetic chuck on a measuring microscope, and may be aligned parallel to the axis of travel of a stage.

A first nickel form 5210A may be placed with a leading edge 5215 offset shim stock 130 and may be held in place by the magnetic chuck, the magnetic force adjusted to permit movement of nickel electroform 5210. Nickel electroform 5210 may be adjusted parallel to the axis of travel of the stage. Full force may be applied to the magnetic chuck to draw nickel electroform 5210 in intimate contact with shim stock 5230, and cryanoacrylate may be used to tack down the edges of nickel electroform 5210.

A second nickel electroform 5210B may be placed beside first nickel electroform 5210A, aligned first nickel electroform 5210A, and tacked in place. Subsequent nickel electro forms 5210 may be placed beside and aligned to previously placed electroforms 5210 and tacked. This place, align, tack procedure may be repeated until the desired number of nickel electroforms 5210 may be reached.

Shim stock 5230 with bonded nickel electroforms 5210 may be laser welded at each electroform seam 5250 that may be perpendicular to the long axis of the shim stock 5230. Leading edge 5215 seam aligning and bonding may be performed on a convex magnetic chuck having the appropriate radius of curvature. Leading edge 5215 seam may be also laser welded on the convex magnetic chuck.

The assembly may be removed from the magnetic chuck and an inner diameter seam of shim stock 5230 may be laser welded, and cryanoacrylate may be applied to all perforations on the inner diameter of the resulting drum.

A roller guide apparatus for transporting optical tape media in an optical tape system may be herein described.

Figure 53:
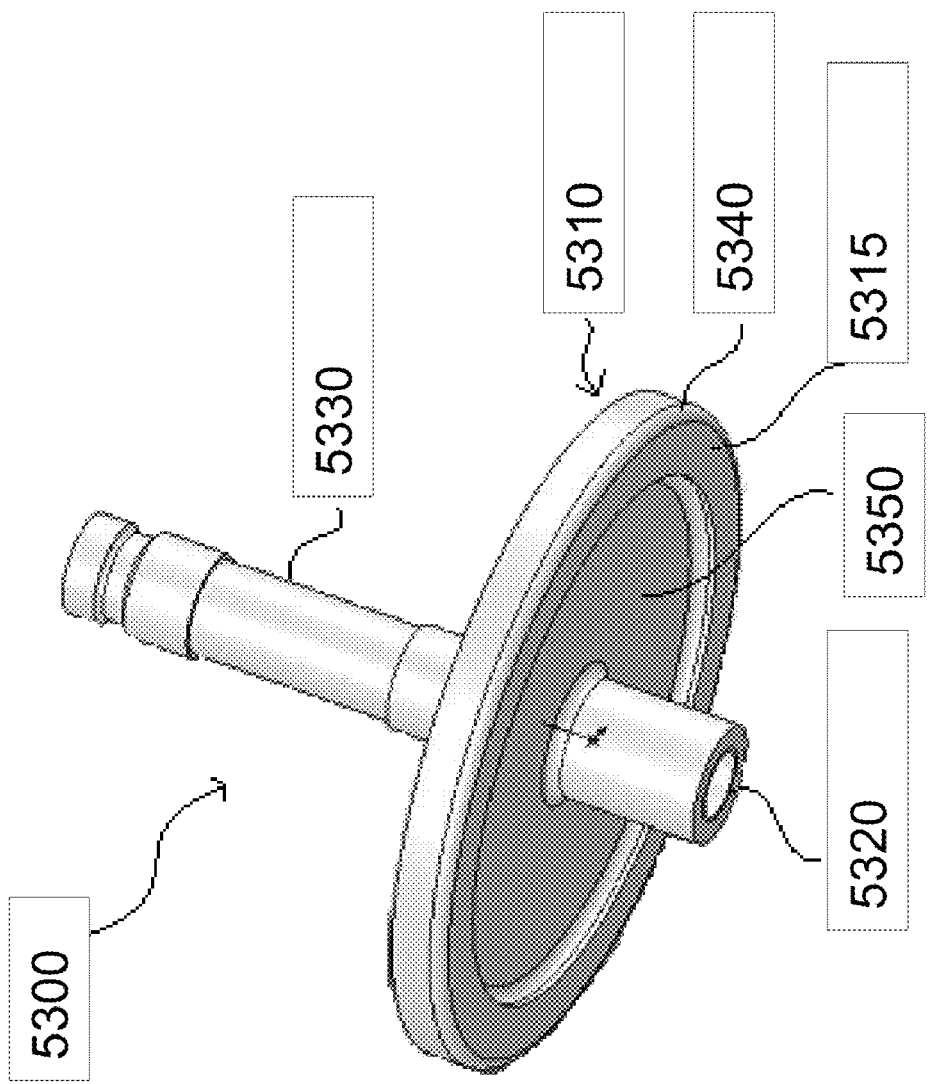
FIG. 53 is an isometric view of a possible embodiment of a roller shaft.

Referring to FIG. 53, roller shaft 5300 has a large flange 5310 near a threaded end 5320 of center post 5330. Flange 5310 may be precisely machined such that at least a bottom surface 5315 of raised annulus 5340 may be substantially perpendicular center post 5330 long axis. A method for ensuring perpendicularity of surface 5315 includes a machining turning operation. When end 5320 may be inserted into a predetermined diameter hole in the base plate, surface 5315 of annulus 5340 may be brought into contact with the base plate surface ensuing roller shaft 5300 may be perpendicular to the base plate. Roller shaft 5300 may be secured to the base plate by means of a screw (not shown) that may be inserted into the threaded end 5320.

Flange inner surface 5350 may be flexible under appropriate force. The flexibility of inner surface 5350 allows precise adjustment of the height of roller shaft 5310 relative to the base plate. As the screw securing roller shaft 100 to the base plate may be further tightened, center post 5330 may be drawn further into the hole in the base plate. With surface 5315 of annulus 5340 resting on the surface of the base plate, inner surface 5350 flexes, allowing center post 5330 to be adjusted in height while maintaining precise perpendicularity to the base plate. Flange inner surface 5350 acts as a built-in spring and allows very precise height control, typically better than 1 micron. Factors that contribute to the range of motion and precision of adjustment include material for roller shaft 5300, diameter of center post 5330, thickness of flange inner surface 5350, and screw thread pitch in threaded end 5320.

Figure 54:
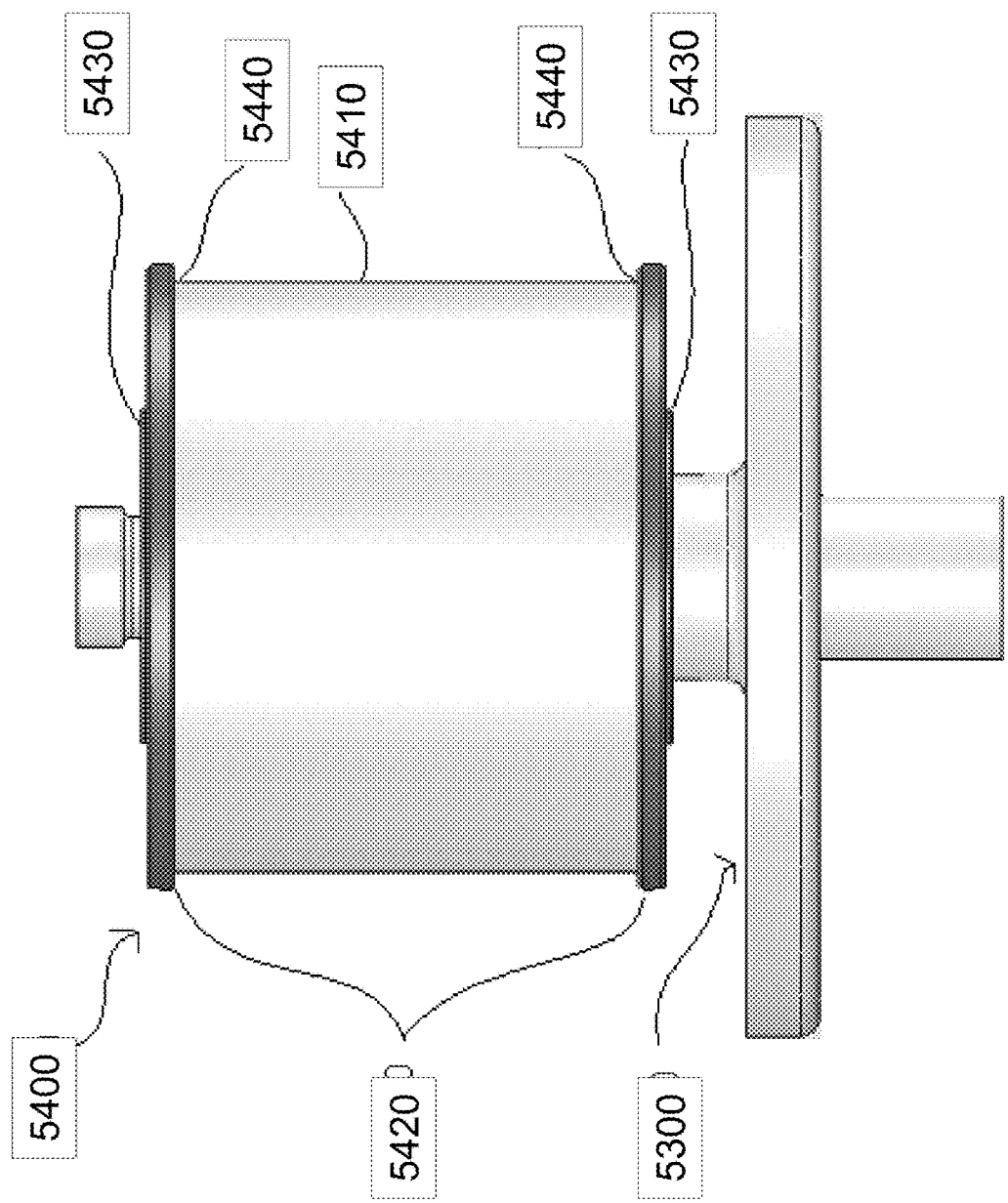
FIG. 54 is side view of a possible embodiment of a roller guide assembly of the invention mounted on the roller shaft of FIG. 53.

Referring to FIG. 54, tape damage may be reduced and control may be increased through application of roller assembly 5400. Roller assembly 5400 comprises a roller body 5410, stops 5420, bearings 5430, and roller shaft 5300. In this possible embodiment roller body 5410 may be cylindrically shaped and hollow. Roller body 5410 walls may be fabricated as thin as possible so as to minimize rotational inertia, resulting in lower lateral tape motion (LTM), reduced tape wear, and fewer tape disturbances.

Stops 5420 may be substantially round disks having a diameter slightly greater than roller body 5410 and may be assembled to each end of roller body 5410. Stops 5420 may be polished to achieve appropriate flatness. Stops 5420 perform the vertical guiding of the tape, may be used to reduce the effects of lateral tape motion, and increase the ability of the tape drive to produce dense data recording. Transition area 5440 between stops 5420 and roller body 5410 may be a precision 90 degree corner. The distance between stops 5420 may be designed to be slightly wider (approximately 5 microns) than the width of the tape.

By the nature of the tape, one edge of the tape will run against one of stops 5420. Thus transition area 5440 where roller body 5410 and stop 5420 meet will exert an influence on the tape. The absence of a fillet in transition area 5440 allows the tape to remain planar, eliminating deformation of the tape. This will increase the life of the edge of the tape, thus preserving the tape drive's ability to control LTM.

Roller bearings 5430, assembled to stops 5420, opposite of roller body 5410, provide a smooth bearing surface for the assembly of roller body 5410 and stops 5420 to roll smoothly around roller shaft 5300.

Herein described may be a helical transport apparatus and method for using the helical transport with optical tape media in an optical tape system.

Figure 55:
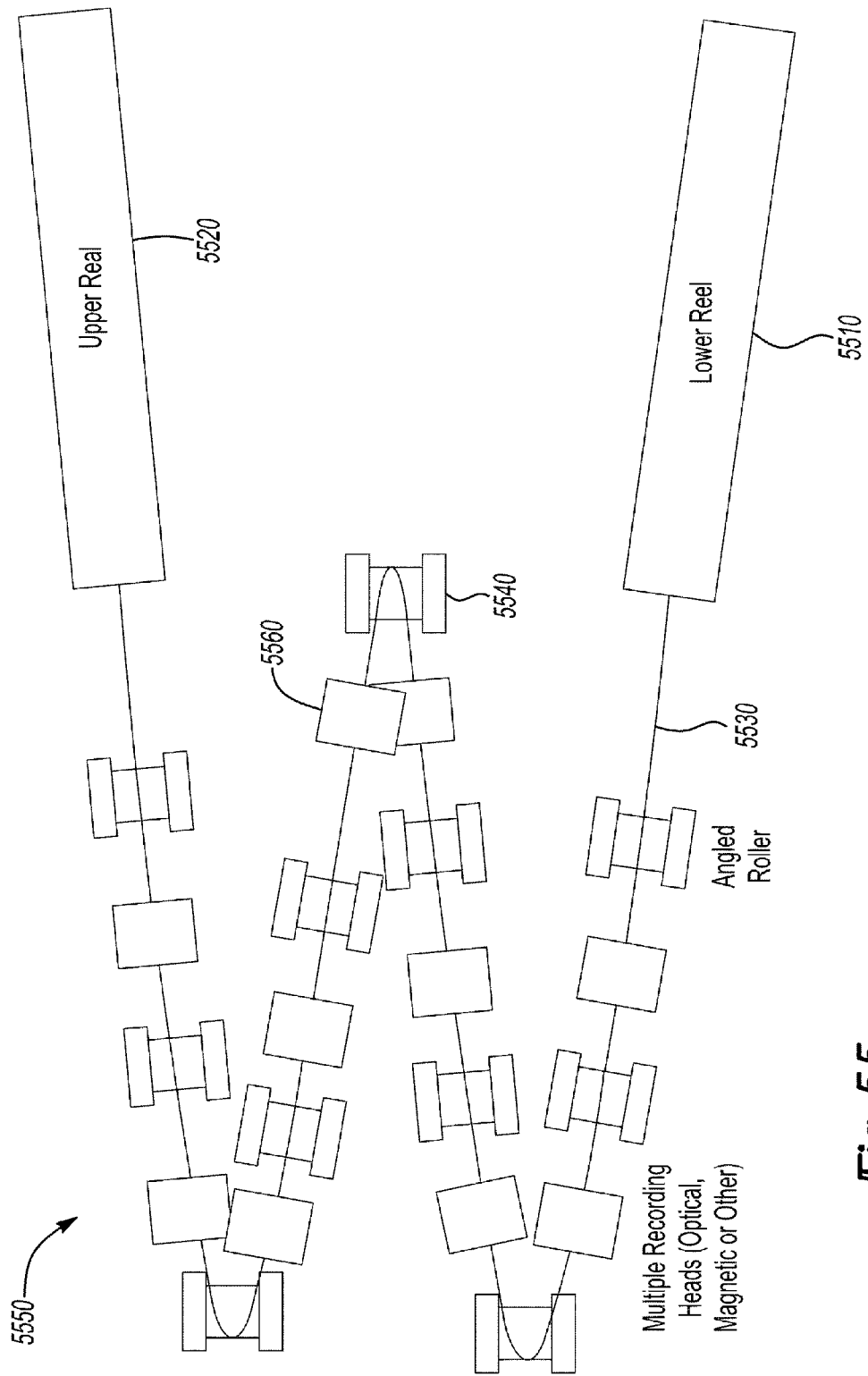
FIG. 55 is a side view of a possible embodiment of the tape support apparatus of the invention.

Referring to FIG. 55, the possible embodiment of the invention includes a tape transport with a lower reel 5510, an upper reel 5520, wherein a tape 5530 can be transported between lower reel 5510 to upper reel 5520. The possible embodiment further includes a plurality of rollers 5540 arranged along a substantially helical path 5550 for purposes of supporting tape 5530 as it transports between lower reel 5510 and upper reel 5520, effectively causing tape 5530 to spiral in a substantially helical path.

Rollers 5540 may be mounted to a frame (not shown) such that rollers 5540 axis of rotation 5560 may be perpendicular to helical path 5550. Lower reel 5510 and upper reel 5520 axis of rotation may be also substantially perpendicular to helical path 5550. The resulting tape path distance from lower reel 5510 to upper reel 5520 may be dependent on the number of, and spacing of rollers 5540.

In another embodiment of the invention, the number of loops of helical path 5550 may be a value greater or less than that shown in FIG. 55.

In another embodiment of the invention, interface heads 5560 may be placed along helical path 5550 for performing operations such as reading information from or writing information to tape 5530. Tape 5530 may include media from a set including optical media, and magnetic media, or may be of another type. The number of head 5560 may be more or less than that shown in FIG. 55.

Figure 56:
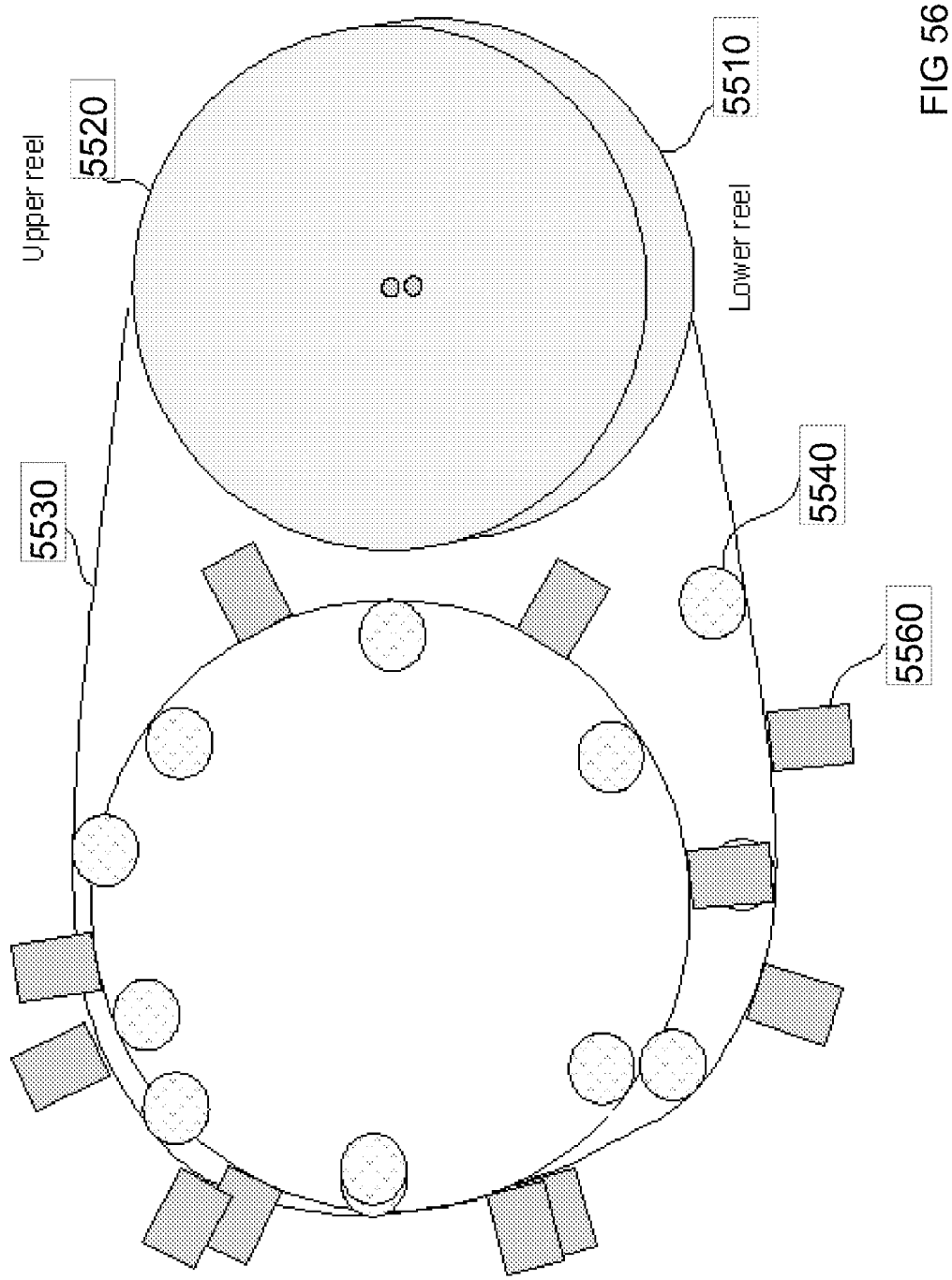
FIG. 56 is a top view of the possible embodiment of FIG. 55.

Referring to FIG. 56, the possible embodiment of FIG. 55 may be shown from a top view wherein lower reel 5510 and upper reel 5520 may be substantially aligned along their axis of rotation. However alternate orientations of lower reel 5510 and upper reel 5520 may be possible in other embodiments.

In another embodiment of the invention, lower reel 5510 and upper reel 5520 may be replaced by other means of providing tape 5530 for transport including tape manufacturing means, tape format means, and the like.

An adjustable roller guide, as herein described may be used for precisely adjusting the height of optical tape media in an optical tape system.

Figure 57:
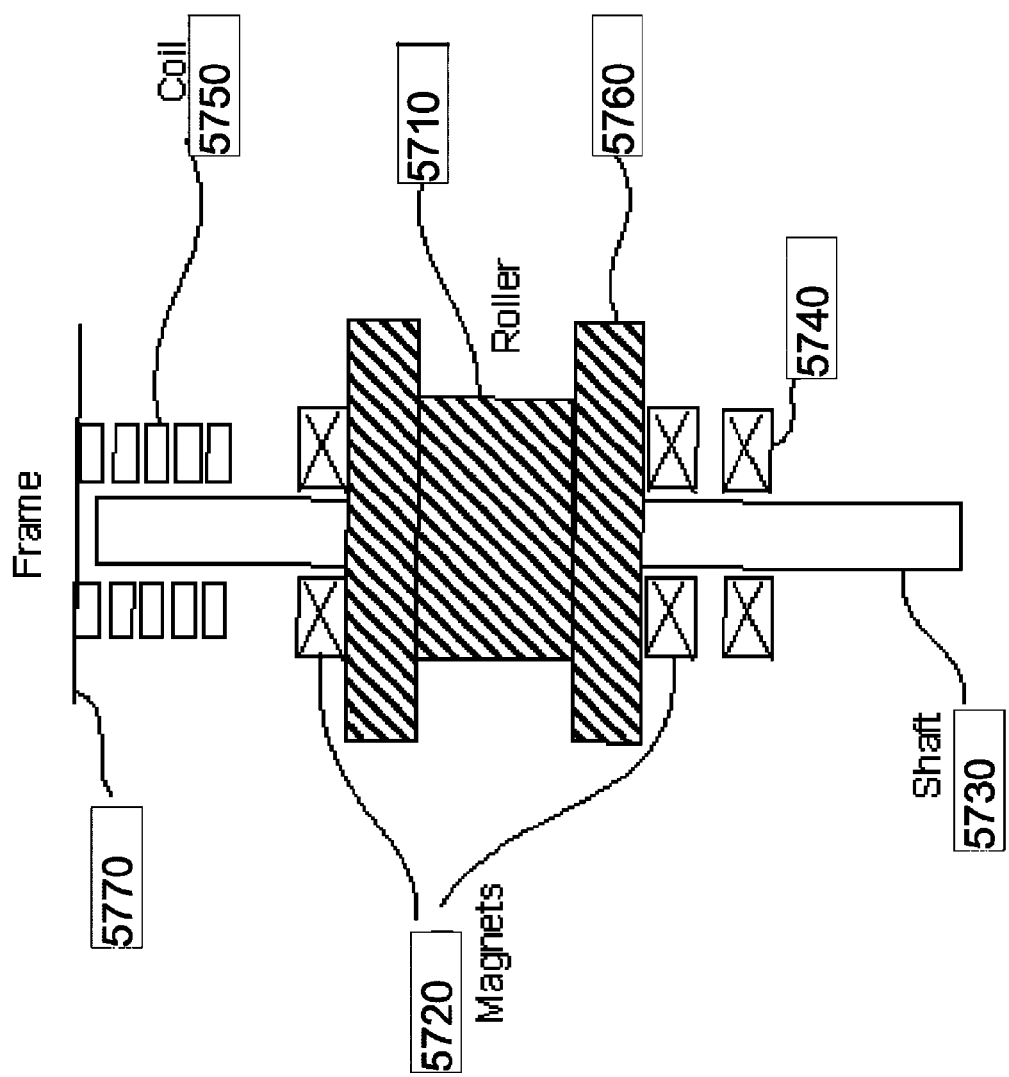
FIG. 57 is a cutaway plan view of a possible embodiment of the guide roller of the invention.

Referring to FIG. 57, a rotating roller 5710 with magnets 5720 attached to roller 5710 top and/or bottom surfaces, rolls around a shaft 5730. Roller 5710 may be free to move axially along shaft 5730. A magnet 5740 or electromagnetic coil 5750 may be attached to a frame 5770 to which shaft 5730 may be also attached. At the opposite end of shaft 5730, an electromagnetic coil 5750 or magnet 5740 may be attached.

In response to a lateral position error signal delivered to coil 5750, a current may be applied that changes a magnetic field of coil 5750, causing magnet 5720 (and consequently attached roller 5710) to move along shaft 5730. The objective of the movement of roller 5710 may be to adjust a tape being guided by roller 5710 to compensate for an unwanted shift in the tape lateral position. As roller 5710 compensates for a shift in tape position, the position error signal may be reduced.

An embodiment of the invention may also be used to adjust roller 5710 position to account for tape of differing widths. In an embodiment with a second, stationary roller, roller 5710 can be moved along shaft 5730 to "trap" the tape between a top or bottom flange 5760 on roller 5710 and a bottom or top flange on the second roller. This embodiment may be well suited for use with narrow width tapes. Alternatively, for wide width tapes, roller 5710 can be positioned so that the top or bottom flange 5760 may be coincident with the position of the top or bottom flange of the stationary roller.

In another embodiment with a plurality of rollers 5710, each roller can be positioned based on the tape width to allow high density tracking.

Writing wobble cycles on a seamless drum, as herein described may be useful for embossing optical tape media, resulting in an adjustment zone beneficial to an optical tape system adapted to use the adjustment.

Referring to FIG. 58A, a typical wobble cycle embossing drum 5800, having a center diameter 5850 that may be smaller than an outer edge diameter 5860, results in a varying number of embossed wobble cycles across the width of a tape media.

Figure 58:
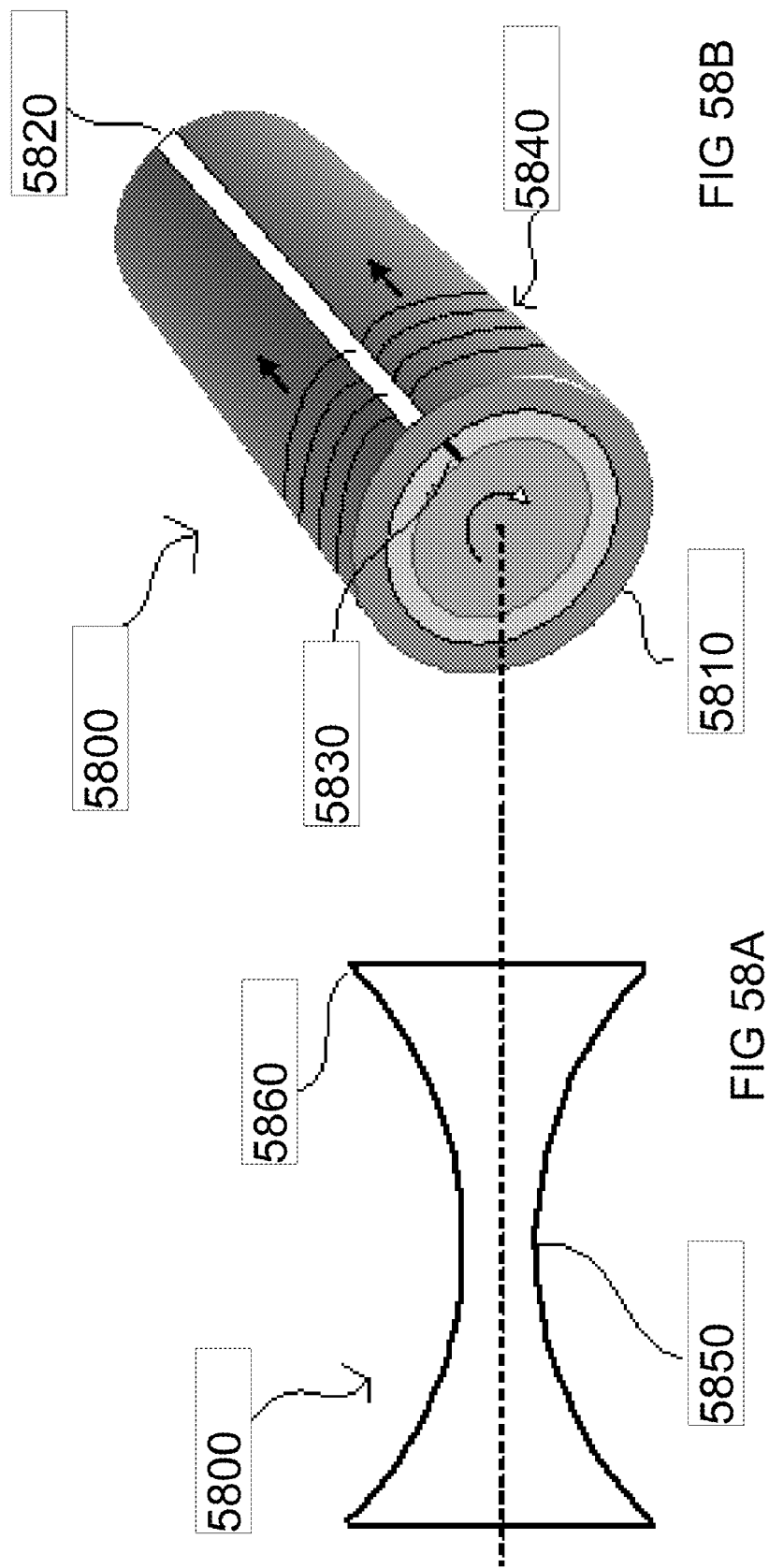
FIG. 58A is a profile of a typically shaped mechanical drum for embossing a servo track on media.
FIG. 58B is a perspective view of an embodiment of the adjustment zone of the invention on a mechanical drum.

Referring to FIG. 58, a wobble cycle embossing drum 5800 of an embodiment of the invention comprises a drum embossing region 5810, an index mark 5830, and wobble cycles 5840. Using information selected from a set including embossing drum 5800 maximum diameter and embossing drum 5800 minimum diameter, the method of writing wobble cycles 5840 may be adjusted to ensure an adjustment zone 5820 may be present across the length of an embossing drum 5800.

Figure 59:
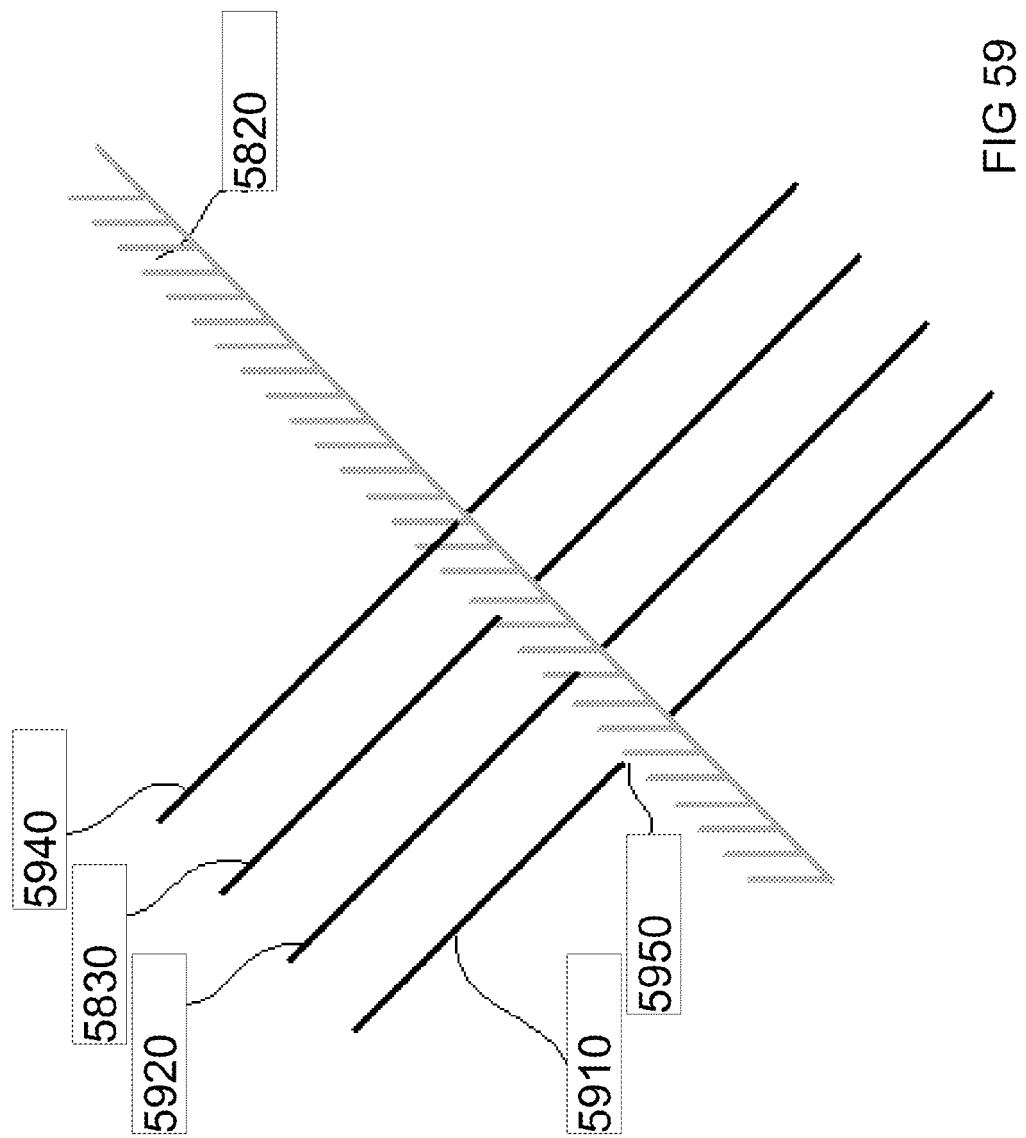
FIG. 59 is a plan view of the adjustment zone and wobble cycle relationship.

Referring to FIG. 59, based on embossing drum 5800 diameter along a circumference where each wobble cycle 5910 through 5940 may be written, wobble cycles 5910 through 5940 extend from index mark 5830 around drum 5800 and may extend into adjustment zone 5820, but will not extend beyond adjustment zone 5820, In the possible embodiment of FIG. 59, wobble cycle 5910 extends to a leading edge 5950 of adjustment zone 5820 while wobble cycles 5920, 5930, and 5940 all extend into adjustment zone 5820

An apparatus, as herein described may provide positional and planarizing support for positioning optical tape media under an optical pickup head in an optical tape system.

Figure 60:
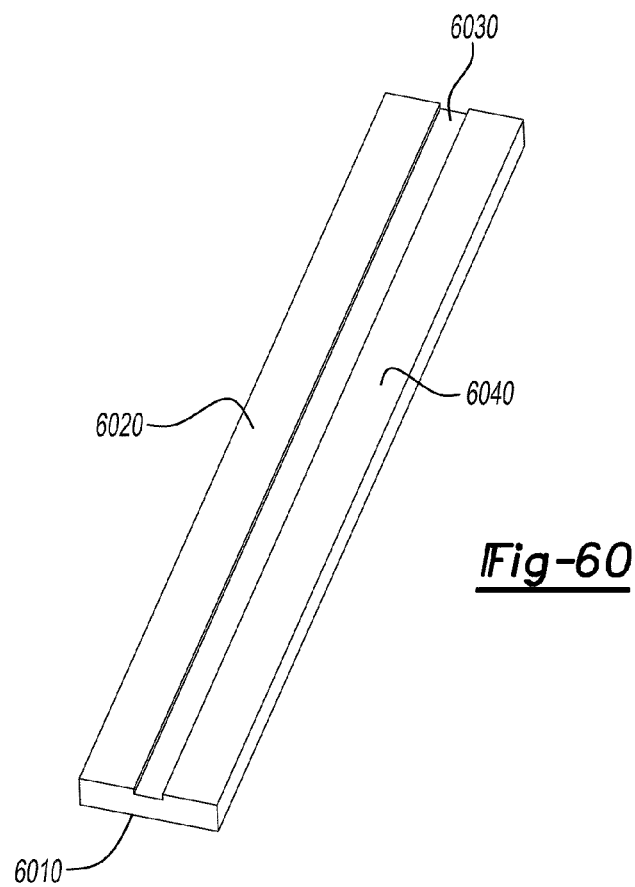
FIG. 60 is a perspective view of a possible embodiment of the tape media position and planarizing support apparatus of the invention.

FIG. 60 shows a possible embodiment of the tape media position and planarizing support. Support 6010 may include an entry surface 6020, a focus channel 6030, and an exit surface 6040; the entry and exit surfaces may be substantially elongated truncated cylinder shapes. The cylinder shapes of the entry surface and exit surface may each have a radius surface; the radius surface may range from 1 mm to 100 mm. Entry surface 6020 may form a surface on which tape media may slide for purposes of removing planar perturbations of the tape media. Tape media moves substantially perpendicular to the long axis of entry surface 6020.

Focus channel 6030 may be a narrow channel separating entry surface 6020 from exit surface 6040, forming a possible separation width of between approximately 0.1 mm and approximately 3 mm. The tape media travels over focus channel 6030 as it moves from entry surface 6020 to exit surface 6040 wherein exit surface 6040 may remove planar perturbations of the tape media.

Referring to FIG. 61, an end view of the possible embodiment of the invention of FIG. 60, focus channel 6030 prevents any minor imperfections in the tape media and/or any minor imperfections in entry surface 6020, which may disrupt the flatness of the tape media as it passes over entry surface 6020, from impacting the flatness of the tape media as it passes under a tape media read/write head 6110 positioned over focus channel 6030.

Referring to FIG. 61, entry surface 6020 and exit surface 6040 may form discontinuous sections of curve, the discontinuity being formed by focus channel 6030. Such a curve shape for the surfaces may ensure the moving tape media 6120 remains substantially in contact with the planarizing surfaces. Focus channel 6030 possible width of between approximately 0.1 mm and approximately 3 mm, ensures tape media 6120 may be substantially flat, traveling in planar form, as it travels under tape media read/write head 6110.

Figure 62:
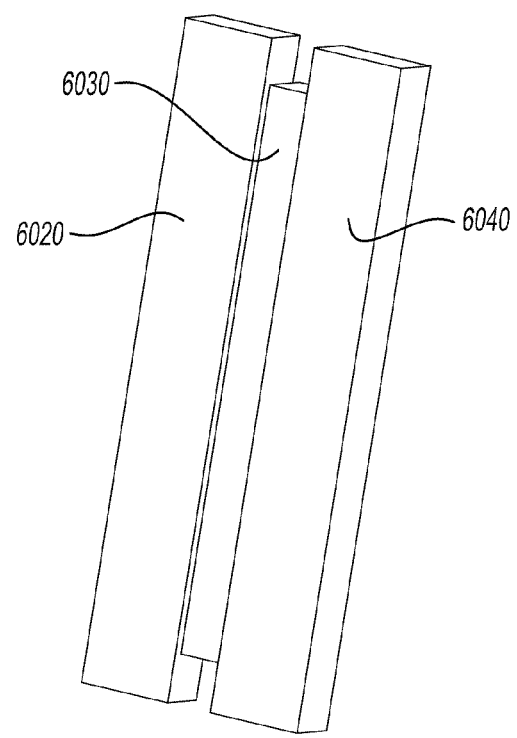
FIG. 62 is a perspective view of another possible embodiment of the invention.

FIG. 62 shows an alternate embodiment of the tape media position and planarizing support apparatus wherein focus channel 6030 longitudinal length may be slightly less than the longitudinal length of either entry surface 6020 or exit surface 6040.

A reel, as herein described may be used with optical tape media in an optical tape system to reduce cost and increase speed of optical tape motion.

Figure 63:
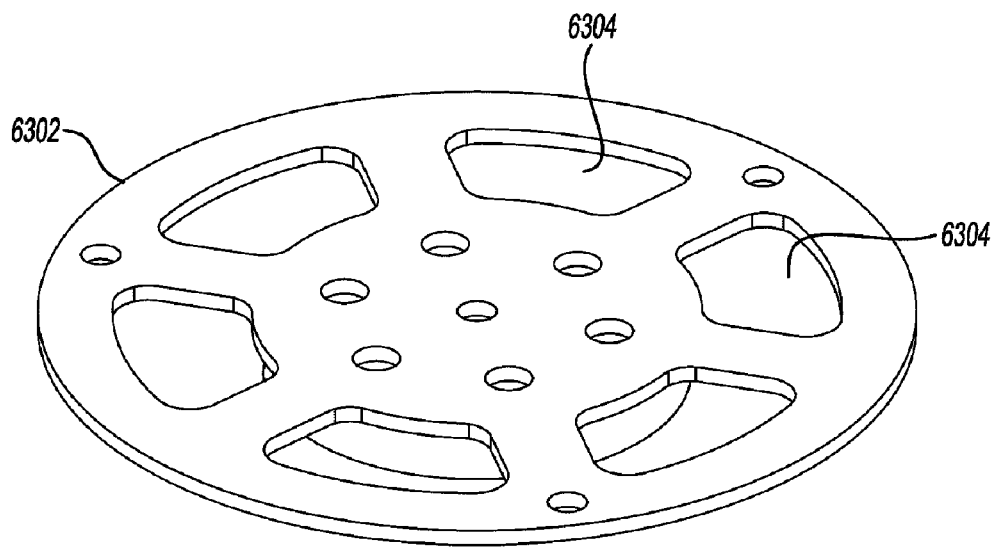
FIG. 63 shows an embodiment of a single side of reel with the mass reducing openings.

Referring to FIG. 63, an embodiment of a single side 6302 of a reel with a plurality of mass reducing openings 6304 may be shown. An embodiment of the invention may include a two piece reel that may produce a high-speed and low-cost reel assembly. The flanges of the reel halves 6302 may be machined, cast, injected molded, or the like to reduce the mass, and thus the inertia of the reel. The reel halves 6302 may be made of plastic, metal, or other material. The low inertia flanges may allow for increased acceleration of the reel and may provide for better control of the tape speed. Additionally, the low inertia flanges may also permit the use of smaller motors, since less current may be needed to drive the reel. The use of smaller motors may have a positive impact on power dissipation in the drive. A reduction in power required to rotate the reel assembly may provide less heat in the tape area.

In addition to providing low inertia characteristics, the mass reduction openings 6304 may also create bleed holes for the air to enter and exit the reel with the media during the winding process. The air entering and exiting the reel with the media may promote even stacking of the media on the reel; this may positively impact lateral tape motion. The mass reduction openings 6304 may also provide a monitoring technique for media stacking on the reel. As the media may be stacked onto the reel, there may be a tendency for the media to stack unevenly on the reel. If there may be uneven stacking, there may occur a shift of the tape position through the tape path that may reduce the tracking accuracy of the closed-loop servo system of the head transport facility.

The mass reduction openings 6304 may allow a monitoring technique to be used to identify if the media may be stacking evenly. A visual method may be used to see if the media has stacked correctly. The media stack may be sensed by a tape drive sensor such as an optical sensor to predict when an uneven stack may occur; this information may be feed to the closed-loop servo system that may compensate for the tape position change.

In an embodiment, this reel design may also have the capability of providing positive and negative pressure conditions in the drive area. The positive pressure may be used to cool the electronics in the drive or may create an air film between the tape layers when the tape may be being wound. The negative pressure may be used to draw air out from the media when the reel may be being unwound.

Figure 64:
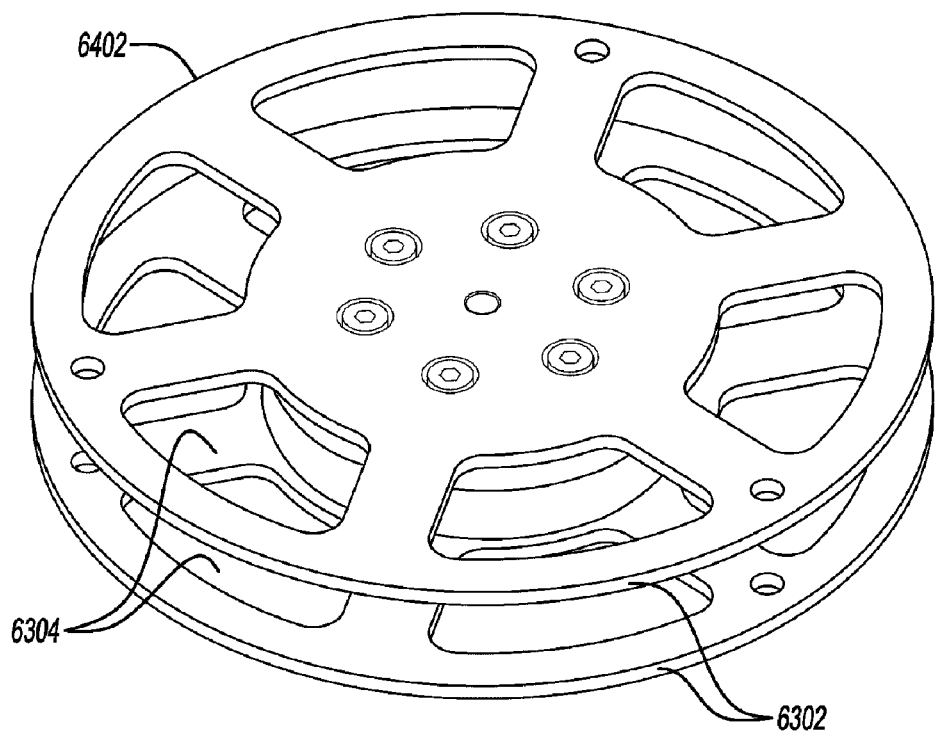
FIG. 64 shows an embodiment of the reel assembly.

Referring to FIG. 64, an embodiment of the reel assembly 6402 may be shown. In an embodiment, the two reel halves 6302 may be joined by screws, bolts, fasteners, mechanical connection, friction fit, adhesive, or the like.

In an embodiment, the mass reduction openings 6304 of the two halves 6302 may be aligned from the first half to the second half.

In an embodiment, the mass reduction openings 6304 of the two halves 6302 may not be aligned from the first half to the second half.

A stamper strip and a process resulting in precise alignment across a seam of the stamper strip, as herein described, may be used to generate optical tape media with precision tracking alignment.

Figure 65:
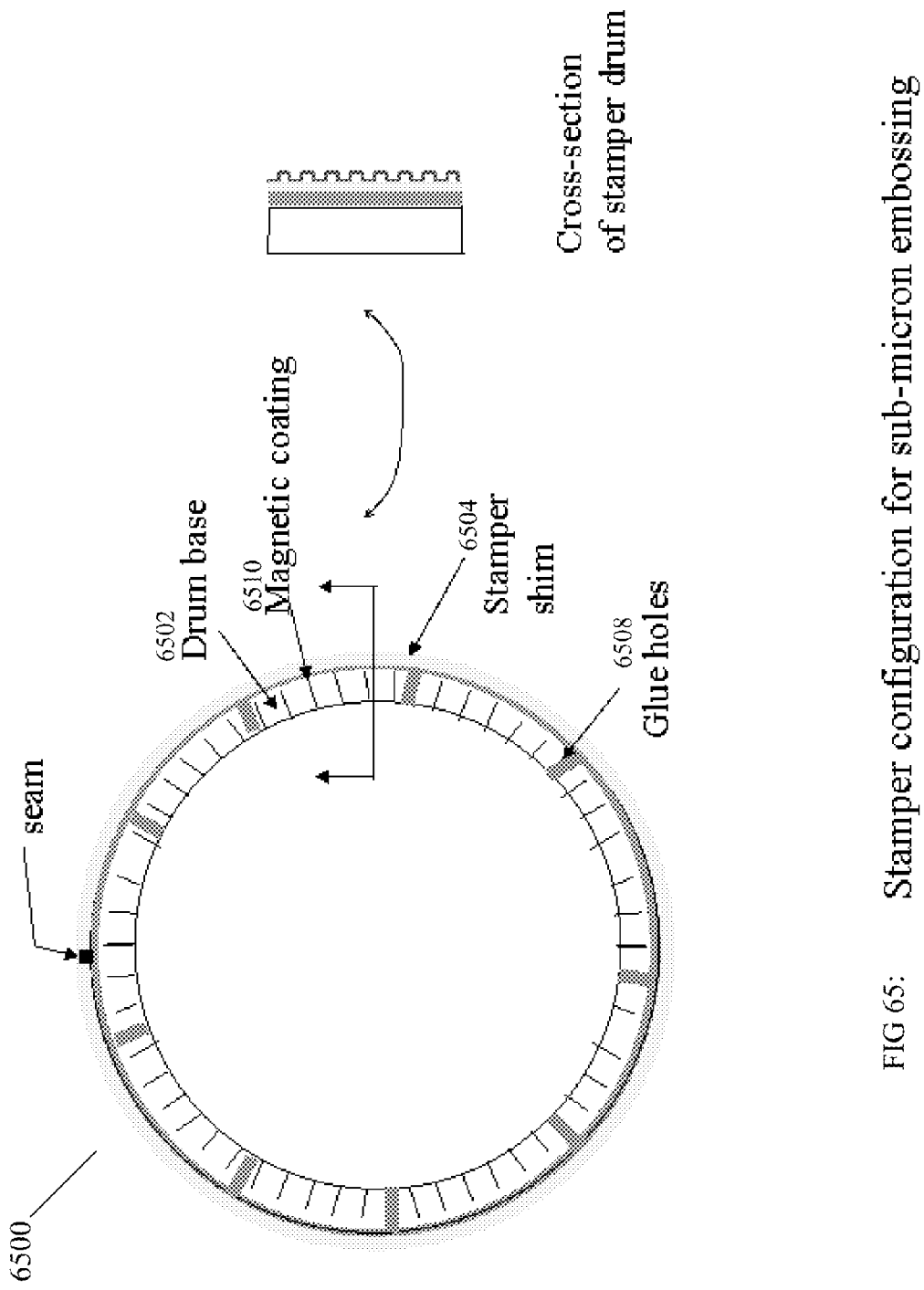
FIG. 65 shows an embodiment of a stamper shim configuration for submicron embossing.

Referring to FIG. 65, an embodiment of a drum assembly 6500 for embossing information onto an optical tape may be shown. One or more the stamper shims 6504 containing the embossing information in the form of a fine surface relief pattern may be wrapped around a drum base 6502. In an embodiment, the stamper shim 6504 may be held in place by a magnetic force, a mechanical connection, an adhesive connection, or the like.

In an embodiment, the drum base 6502 may be magnetic and the outer surface may be polished optically smooth. The drum base 6502 may be made of a magnetic material, may be non-magnetic and have an outer layer of magnetic material; the outer layer may be a magnetic coating applied to drum base 6502. The stamper shim 6504 material may be a paramagnetic material such as nickel or Nichrome that may allow stamper shim 6504 to magnetically attach to drum base 6502 surface. In another embodiment, a non-magnetic stamper shim 6504 may be bonded to a paramagnetic material such as nickel or Nichrome to permit attachment of bonded stamper shim 6504 to magnetic drum base 6502.

In embodiment, the drum base 6502 may be made of a paramagnetic material such as nickel or Nichrome or may have an outer layer of paramagnetic material; the outer layer may be a paramagnetic coating applied to drum base 6502. The stamping shim 6504 may be a magnetic material. In another embodiment, the stamping shim 6504 may be made of a non-magnetic material with a bonded magnetic material to permit attachment of bonded stamper shim 6504 to paramagnetic drum base 6502.

In an embodiment, the stamper shim 6504 may be further held in place to drum base 6502 using an adhesive through glue holes 6508 in the drum base 6502 after alignment has been achieved.

Embossing features, that may be used to provide a format to the optical tape, may be on the outer surface or outer diameter of the stamper shim 6504. At least one stamper shim 6504 may be used to provide one complete set of tracks around the outer diameter of drum base 6502. With the at least one stamper shim 6504 applied around drum base 6502, at least one seam will be formed where the stamper shim 6504 ends meet. It may be important for the corresponding tracks to align accurately across the seam and/or seams. A plurality of stamper shims 6504 may be used around the circumference of the drum base 6502 for practical and manufacturing reasons. In embodiments, when multiple stamper shims 6504 may be wrapped around the drum base 6502, accurate alignment of the tracks across the multiple seams may be required.

In an embodiment, the stamper strip 6504 and the drum base 6502 may be attached by magnetic force and it may be relatively easy to laterally adjust the stamper shim 6504 ends on the drum base 6502 to align the stamper shim ends.

Figure 66:
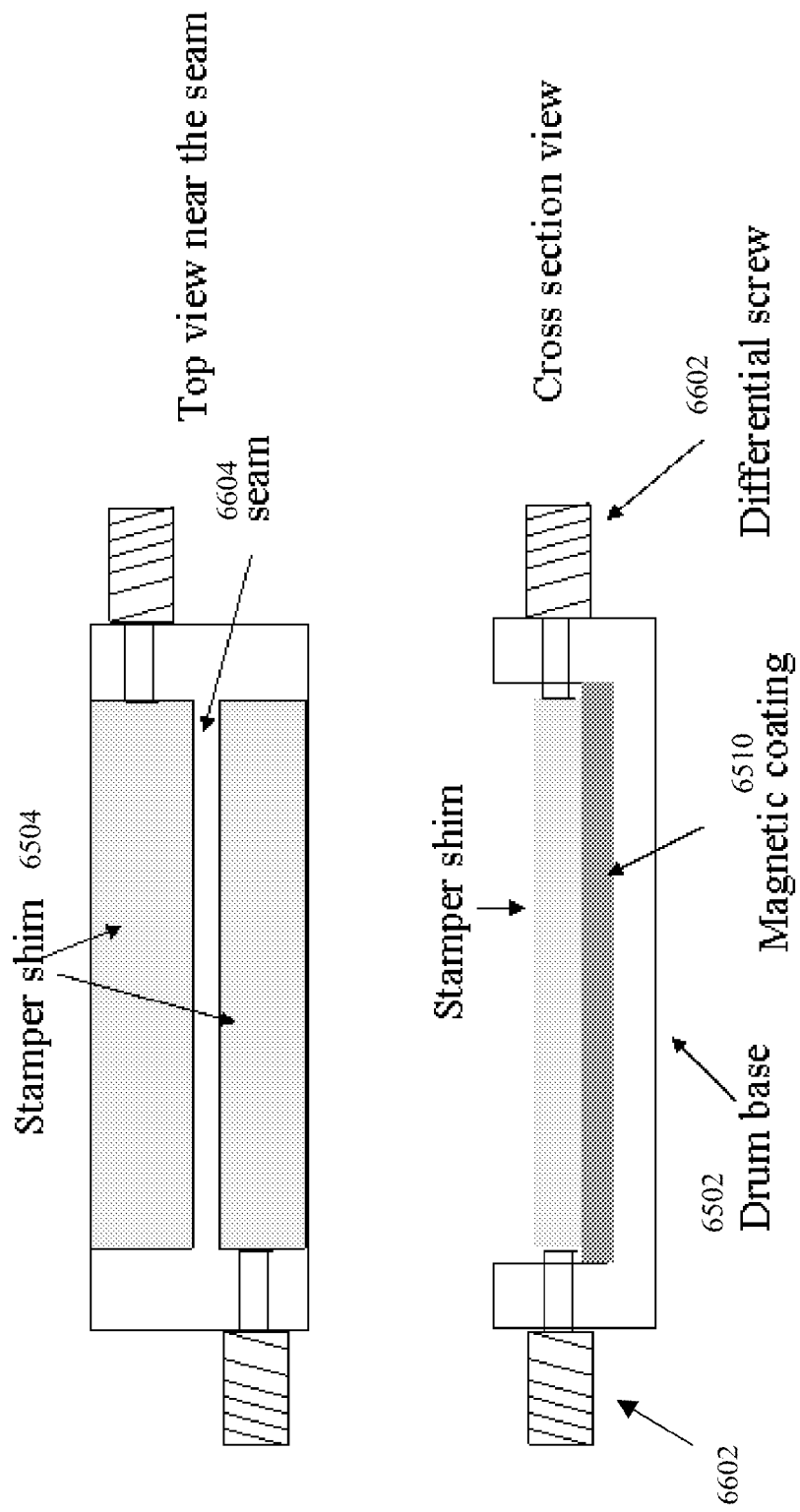
FIG. 66 shows an embodiment of a cross section of a stamper shim and a fine alignment arrangement using a differential screw.

Referring to FIG. 66, an embodiment of a stamper shim 6504 alignment method using differential screws 6602 may be shown. In an embodiment, this alignment method may include a course adjustment followed by a fine adjustment of the stamper shims 6504.

In the coarse alignment step, a microscope such as a stereo microscope may be used to focus on the seam 6604 area of the stamper shims 6504. While viewing through the microscope, the stamper shims 6504 tracks may be aligned to within approximately +/−10 microns. Fiducial marks along the outer tracks and in between tracks may be used for this coarse alignment.

After the coarse alignment has been completed for all the stamper shim 6504 seams 6604, a fine alignment step may be performed for the final alignment of the embossing features.

In this step, the drum may be mounted on a spindle and rotated at a relatively slow rotational speed. This step may be accomplished using an optical media tester such as a Shibu Soku machine. An optical pickup head on the tester may focus on the surface features of the stamping shim 6504. The optical pickup head may focus and lock onto a track, may read the track, and may decode the track address. The optical pickup head may perform this process for the tracks on both sides of the seam. Electronic circuitry may be designed to accommodate the presence of the stamper seam 6604. Once the track addresses are determined for the tracks on both sides of the stamper shim 6504 seam 6604, the track may be aligned. For a drum with multiple shims, the alignment of each pair of stamper shims 6504 seam 6604 may be adjusted laterally with the process described above for each pair of stamper shims 6504 seam until the tracks are aligned.

Continuing to refer to FIG. 66, a first embodiment of a stamper shim 6504 fine adjustment using differential gauges may be shown. At least one differential gauge 6602 may be mounted on the rim of drum base 6502; the differential gauge 6602 may have micron level adjustment capability. The first differential gauge 6602 may be used to push the stamper shim 6504 in one direction. A second differential gauge 6602 may be mounted on the opposite side to push the stamper shim 6504 in the opposite direction. In this manner, the stamper shim 6504 may be adjusted with micron precision in either direction to align the tracks of the stamper shim 6504. There may be at least one differential gauge 6602 at each stamper shim 6504 seam. The process of course and fine adjustment may be repeated for each seam due to a pair of stamper shims 6504 of drum assembly 6500. At least one differential gauge 6602 may be driven by electronic feedback from the pickup head as described above.

Figure 67:
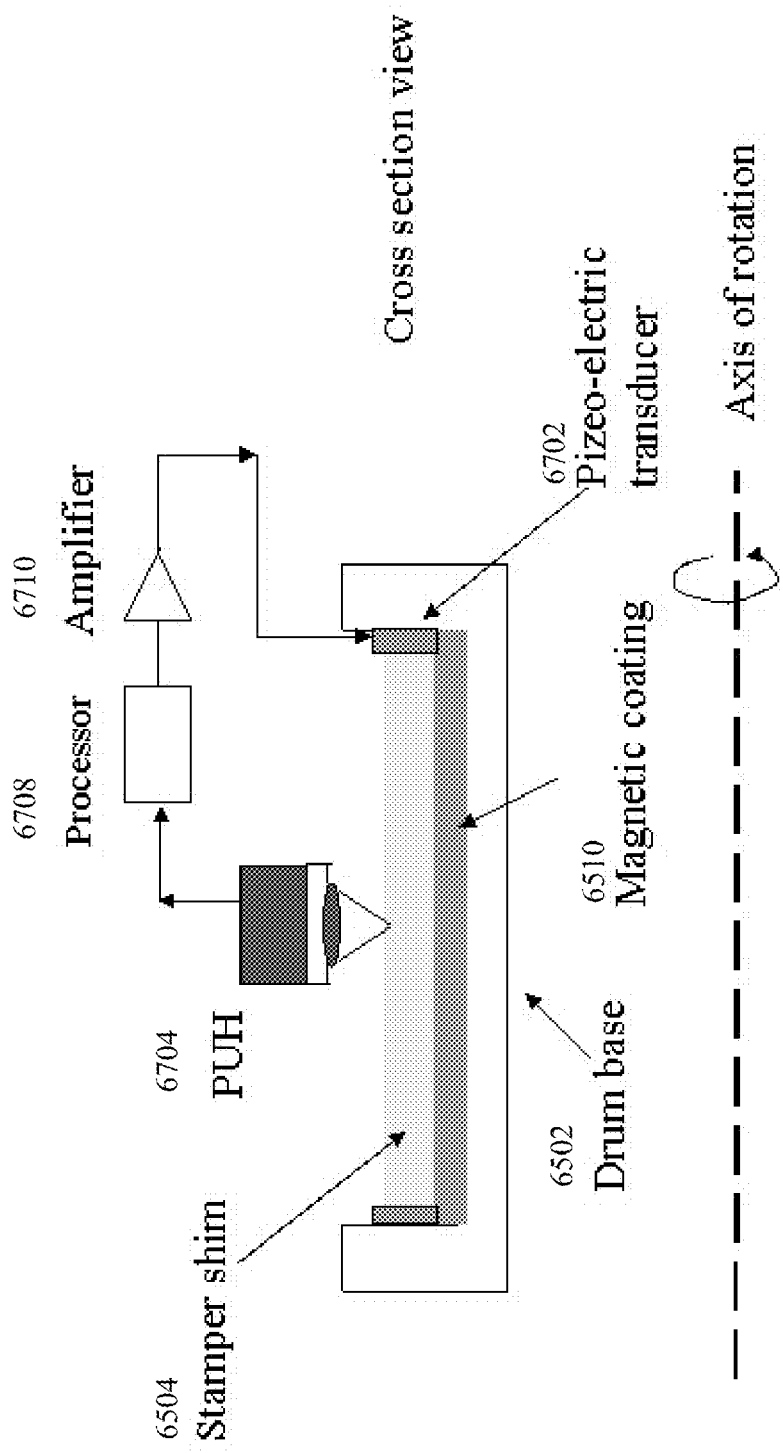
FIG. 67 shows an embodiment of an automated alignment using a closed loop system incorporating a piezoelectric transducer, a pickup head, and process electronics.

Referring to FIG. 67, a second embodiment of fine adjustment using a piezoelectric transducer 6702 to align the stamper shim 6504 seams 6604 may be shown. At least one piezoelectric transducer 6702 may be placed between the drum base 6502 and the stamper shim 6502 at each seam 6604. Using the at least one piezoelectric transducer 6702, the process may be automated by providing an electronic feedback loop where the alignment information may be obtained by the media tester and may be used to drive the piezoelectric transducer 6702 to align the stamper shim 6504.

An automated closed loop system may be developed by using a pickup head 6704 to read stamper shim 6504 tracks and feed the track information into a processor 6708. The processor 6708 may be a microprocessor, microcomputer, microcontroller, or the like. The processor 6708 may contain memory for storing the stamper shim 6504 track position information. The processor 6708 may also be able to provide feedback to piezoelectric transducers 6702 for alignment of the stamper shim 6502. The close loop system may also include an amplifier 6710 to provide the proper signal level for piezoelectric transducer 6702.

The pickup head 6704 may be allowed to move across all the tracks of the stamper shims 6504 to determine the track alignment. As the drum assembly 6500 may be slowly rotated around a center axis, the pickup head 6704 may read and send adjustment signals through the processor 6708 to at least one of piezoelectric transducers 6702 to align the track of the stamper shim 6504. The drum assembly 6500 may be rotated one or more revolutions to align the tracks across the stamper shims 6504.

In an embodiment, after a first pair of stamper shims 6504 across a seam are aligned, the pickup head of the close loop system may move to a second pair of stamper shims 6504 to achieve alignment. In an embodiment, the pickup head 6704 may align all of the shims of the drum assembly 6500.

In an embodiment, the close loop system may use an average of all stamper shim 6504 tracks to provide alignment to all the tracks.

In an embodiment, the close loop system may require perfect alignment of several given tracks for all the shims 6504 around the entire drum perimeter.

A testing apparatus, as described herein may be useful for testing various aspects of optical tape media.

Figure 68:
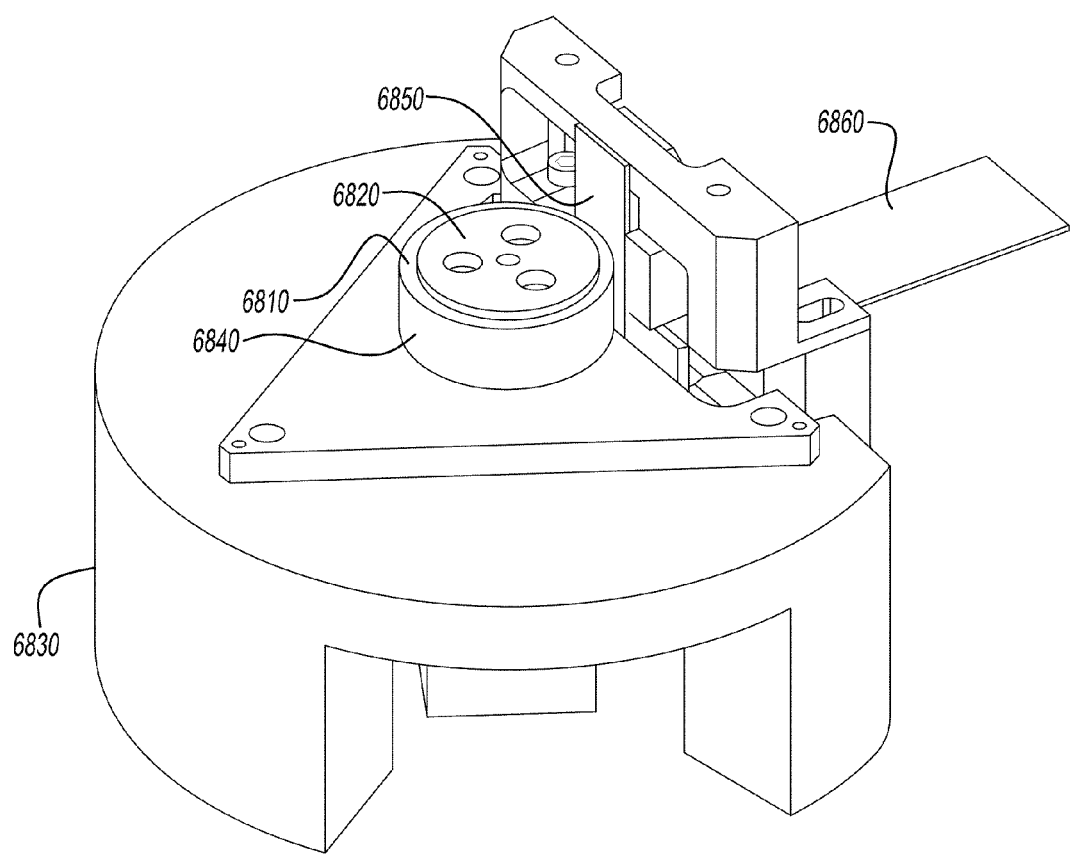
FIG. 68 is a perspective view of a possible embodiment of the optical tape media tester of the invention.

Referring to FIG. 68, a cylindrical drum 6810 may be mounted onto a rotating shaft 6820. In turn shaft 6820 may be coupled to a motor (not shown) which can be remotely controlled to rotate at various desired speeds. The motor may be assembled to a firm base 6830. A length of media 6840, with predetermined features of formatting information, in the form of a continuous loop may be secured to the outside of drum 6810. An optical head 6850 may be positioned at a close distance above media 6840, within focus range of head 6850. The alignment of head 6850 to a surface of media 6840 may be effected by a mechanical adjustment means 6860.

When energized, drum 6810 rotates at a desired speed, and head 6850 reads the features on media 6840, transferring any information read from these features to a computer (not shown) for analysis. One such analysis that can be performed may be a measure of quality of the media.

An adapted optical tape drive, when combined with an optical media tester, results in a test system, as described herein that may be useful for testing optical tape media in a configuration substantially similar to that found in an optical tape system.

Figure 69:
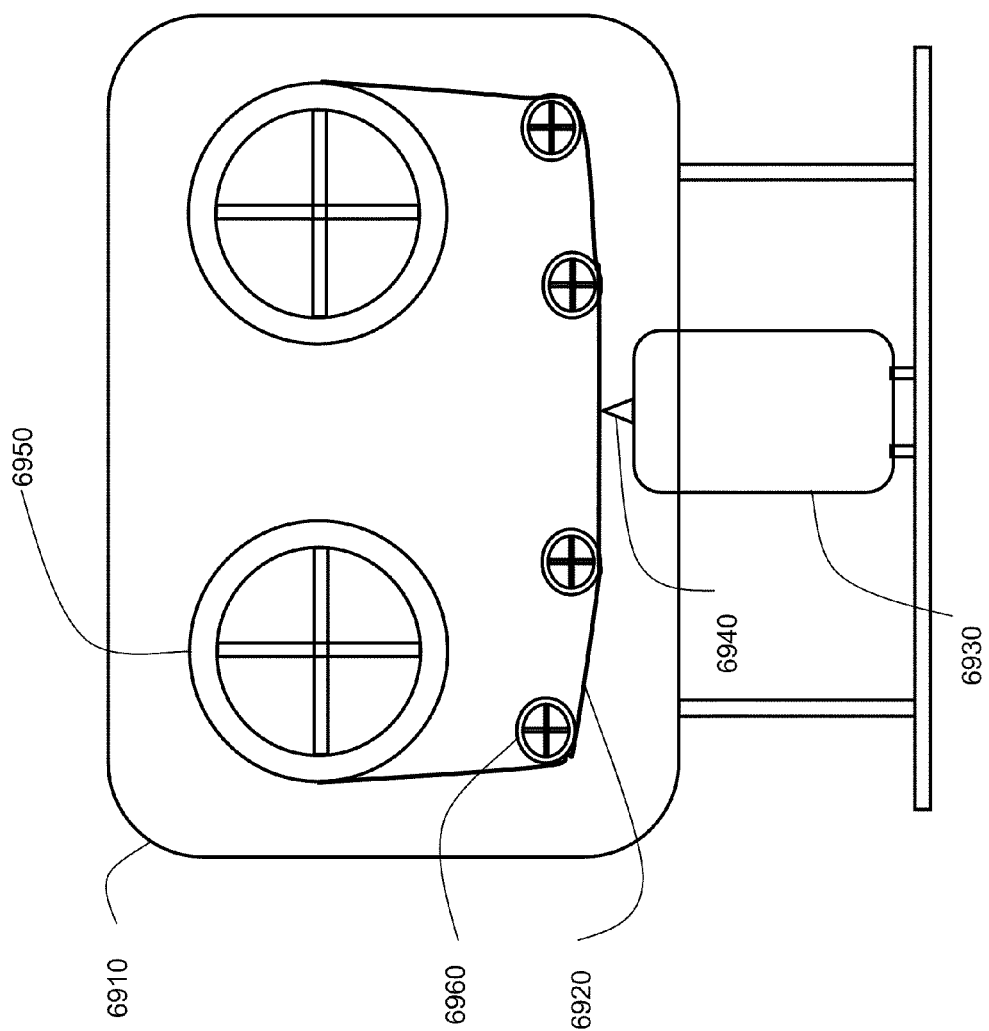
FIG. 69 is a front view of a possible embodiment of the adapted optical tape drive and optical media tester for testing optical tape media.

Referring to FIG. 69, a tape drive 6910 may be adapted to present media 6920 to an optical media tester 6930 horizontally. In this possible embodiment, optical head 6940 of optical media tester 6930 may be oriented vertically, impinging on media 6920 bottom surface.

Optical head 6940 includes functions selected from a set including focus, tracking servo, and data interpretation. Information collected from optical head 6940 while performing one or more of the functions, may be analyzed to assess factors selected from a set including, lateral tape motion, tension variation, tape surface defects, and characteristics that exist in tape drives such as non-uniformities in the reels 6950, rollers 6960, and tape servo system (not shown).

An aligned, seamed, embossing drum and a process for production thereof, as herein described may be used to emboss optical tape media.

Figure 70:
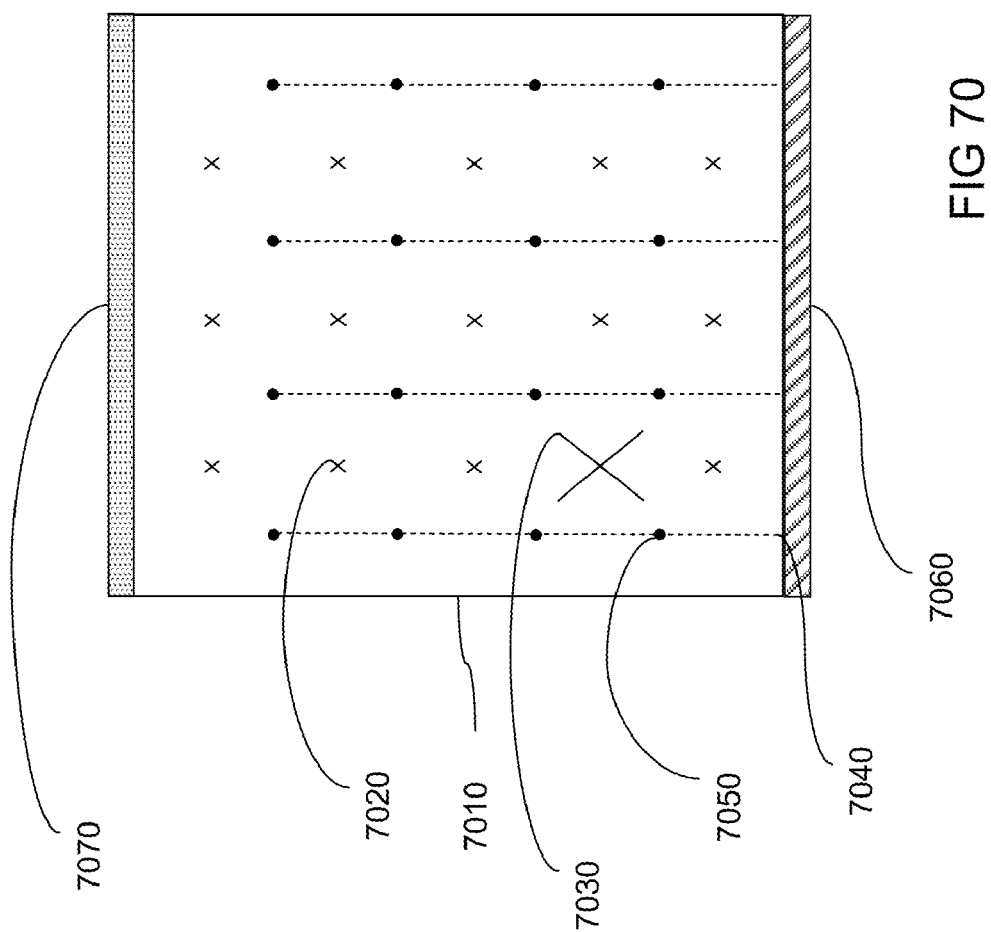
FIG. 70 is a side view of a possible embodiment of the invention showing an embossing drum prior to shim assembly.

Referring to FIG. 70, a hollow, modified vacuum chucking drum 7010 fabricated from Pyrex or other suitable glasses to hold a plurality of shims 7015 around its outer diameter with a wall thickness of approximately 0.5 inches. In this possible embodiment of chucking drum 7010, through-holes 7020 may be formed through a wall of drum 7010 for adhesive dispensing to adhere a precision cut, etched, polycarbonate shim 7015 to drum 7010 outer surface. In this possible embodiment, shim 7015 may be approximately 100 micron thick; however other appropriate thickness of polycarbonate may be used. Shim 7015 may be first cut to a predetermined size for fitting onto drum 7010 from a larger sheet using a cutting method selected from a set including diamond fly cutting, water jet cutting, and diamond wheel grinding. The larger sheet may be etched from a quartz backed photopolymer which may be first produced from a quartz etched master.

In other embodiments, distribution channels 7030 along chucking drum 7010 outer surface may be included for disbursing adhesive from through holes 7020. Alternatively, through holes 7020 may be omitted and distribution channels 7030 may be included, extending to either end of drum 7010 for adhesive application.

Adhesive applied via through holes 7020 and/or distribution channels 7030 may be approximately a UV curable adhesive. However other types of adhesive may be used.

Referring further to FIG. 70, drum 7010 includes vacuum channels 7040 and vacuum ports 7050 working cooperatively to allow a drum vacuum (not shown) to interface through vacuum end cap 7060 to cause vacuuming action through vacuum ports 7050 to temporarily hold shim 7015 in place during adjustment and adhesive curing.

Figure 71:
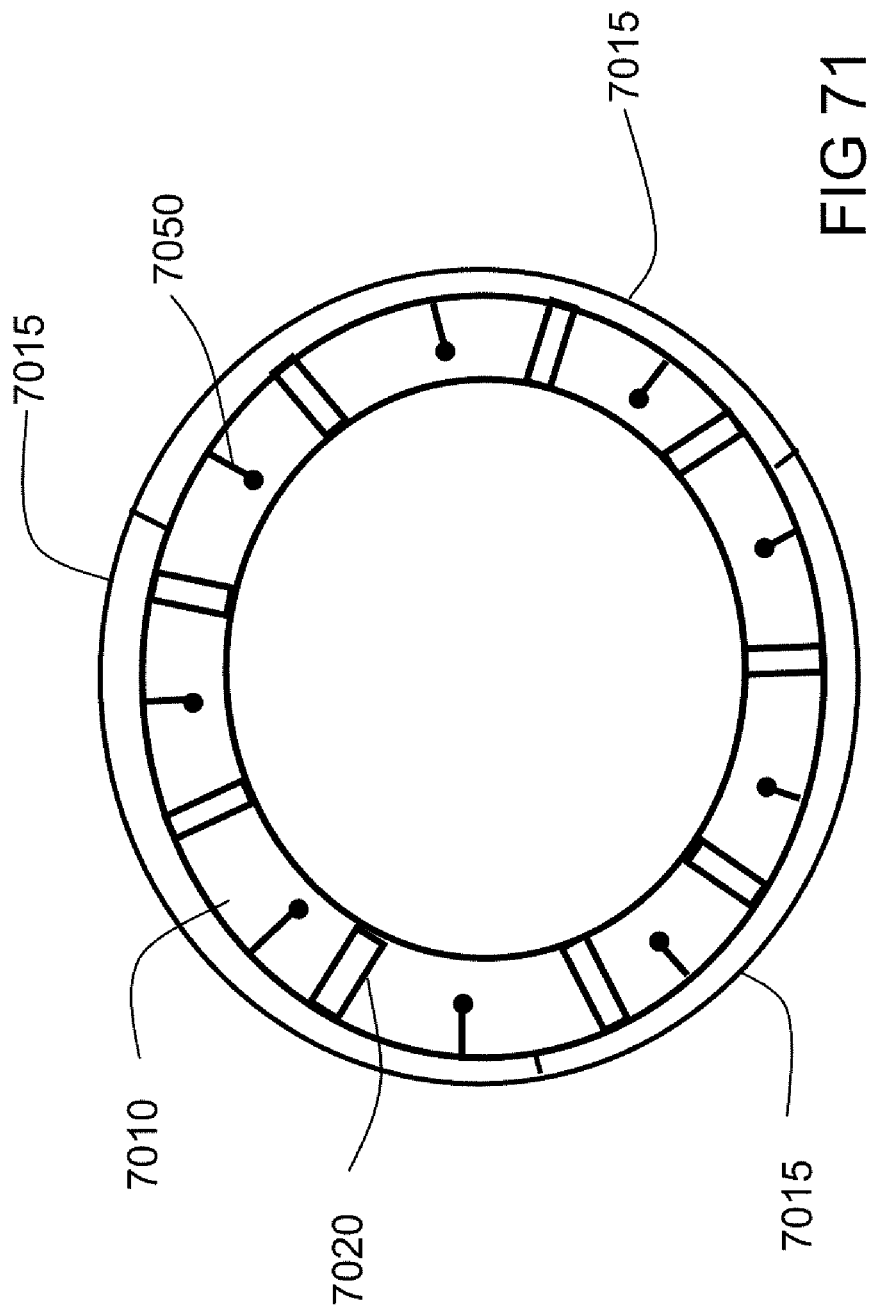
FIG. 71 is a cut away end view of the possible embodiment of FIG. 1, with shims assembled.

Referring to FIG. 71, one or more shims 7015, roughly aligned to end cap 7070 and held in place by vacuum ports 7050, may be checked for alignment using an optical means. Vacuum through vacuum ports 7050 may be modulated to allow micrometer-like movement of shims 7015 along drum 7010 outer surface for final alignment. Adhesive (not shown) may be introduced through either through holes 7020 and/or distribution channels 7030, inspected, and cured. Inspection of adhesive may be performed through shim 7015 or through drum 7010 if the drum may be transparent (such as Pyrex).

Figure 72:
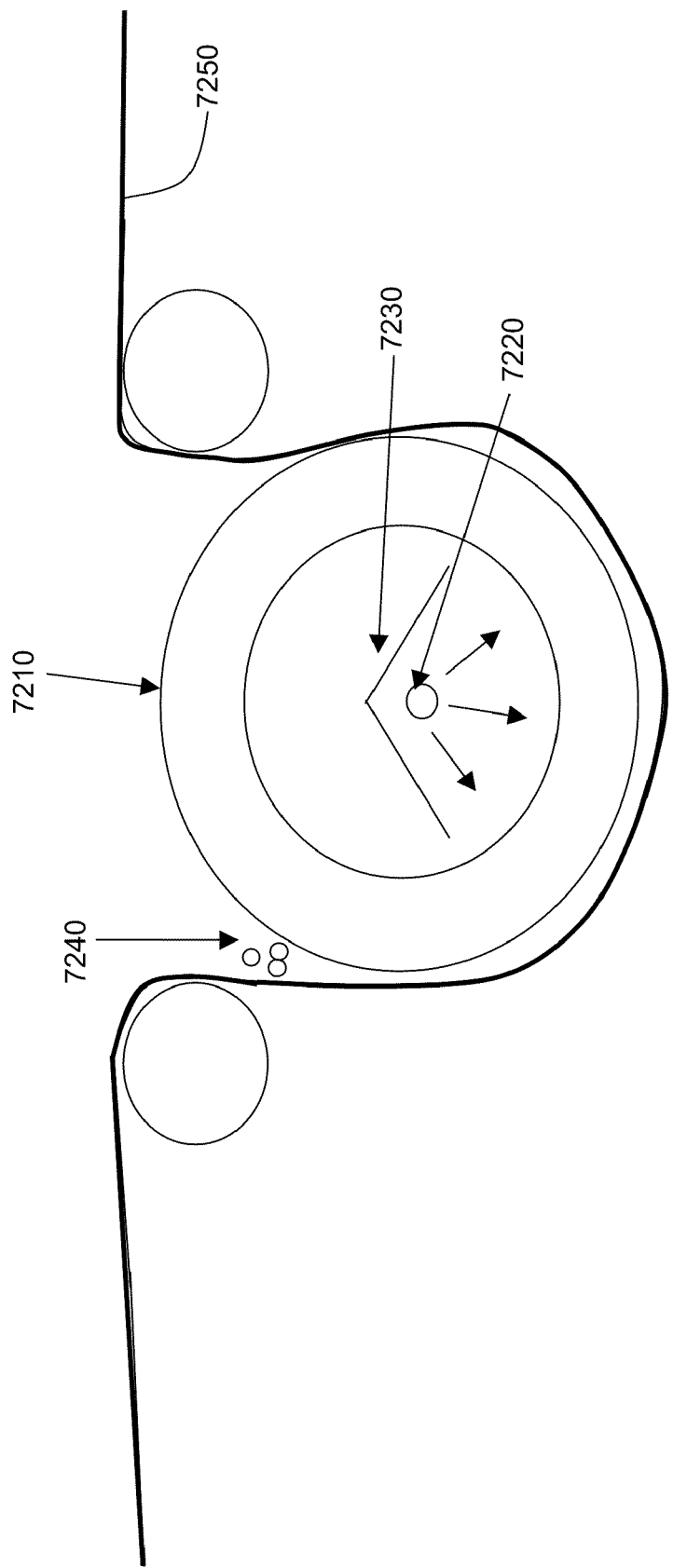
FIG. 72 is an end view of a possible embodiment of the aligned seamed drum of the invention in use.

Referring to FIG. 72, completed drum assembly 7210 may be mounted on a web embosser (not shown), with a UV lamp 7220 inserted in drum 7210, with appropriate shielding 7230. This allows exposing UV embossing monomer (7240) without having to pass UV light through tape base 7250.

In another embodiment of the invention the hollow, modified vacuum chucking drum 7010 can be fabricated from metal. This requires UV lamp 7220 be mounted outside completed drum assembly 7210 such that UV light passes through tape base 7250.

In another embodiment of the invention, vacuum modulation and control may be controllable for each shim individually, allowing none, one, or any plurality of shims to be adjusted simultaneously prior to adhesive curing.

A process herein disclosed improves performance of multilayer optical media (e.g. optical tape) including a monomer layer on a substrate layer. The process disclosed for monomer curing includes exposure of the monomer to ultraviolet light. The process may improve performance by increasing adhesion of the monomer to a substrate, increasing cohesion within the cured monomer, and decreasing tackiness of the exposed surface of the cured monomer.

Figure 73:
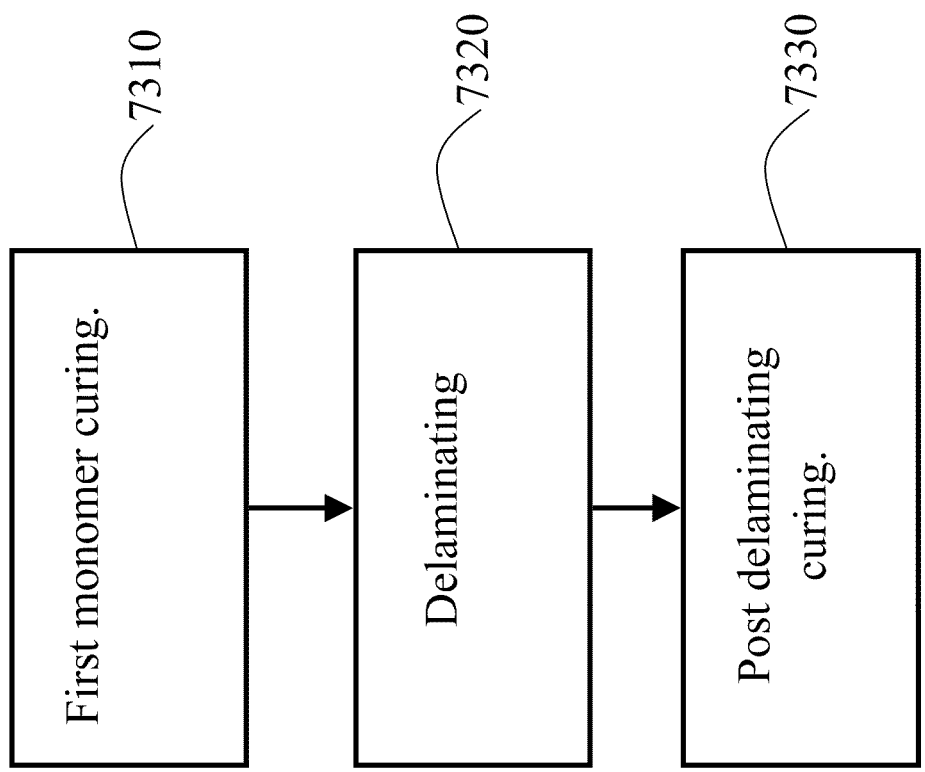
FIG. 73 depicts a process for improved performance of multilayer optical media tape.

Referring to FIG. 73, the process includes exposing the monomer to a broad spectrum ultraviolet light after a delaminating step. First curing step 7310 may use ultraviolet light from light emitting diodes. First curing step 7310 may be performed while the media may be still on an embossing drum, and may be beneficial in that it minimizes the heat input to the thin substrate of the media during embossing. Using ultraviolet light from light emitting diodes also may eliminate heat up of the embossing drum so there would be no need for drum cooling.

In embodiments use of a broader band ultraviolet energy source may provide a broader foundation for monomer curing in first curing step 7310 while possibly increasing temperature of the media and embossing drum.

Referring to FIG. 73, the media may be delaminated in delaminating step 7320.

Referring to FIG. 73, post delaminating curing step 7330 may include use of a broad spectrum ultraviolet light, ultraviolet light from light emitting diodes, or a combination thereof. The combination thereof may reduce media deformation risk from excessive heating with a broad spectrum ultraviolet light alone.

(I) Mod2 Embosser

Substrate Tracking

Alignment of machine has been demonstrated beneficial for facilitating proper web tracking of both 2 mils and 6 micron PEN.

Coated idler roll surfaces may reduce friction and facilitate improved web tracking resulting in fewer creases. For example:

PTFE, Ni-impregnated Teflon on metal and plastic was found to effectively reduce friction in our systems; and TFE coated of Embossing tools (Ni electroforms and Hg'x) may facilitate improved release.

Sequencing of the drive system while Operating Mod2 with 6 micron substrate may facilitate avoiding web breaks. For example:

Setting and engaging web tension prior to driving the web; and

Setpoints for the sections of the machine may include:

Main drive set at 26 rpm (resulting in virtually no web movement, but the motor may be engaged);

Motor 3 Rewind tension set at 1 lb;

Motor 4 Unwind tension set at 0.6 lb;

After tension may be set, rewind tension may be raised in 0.5-0.75 increments up to 2.5 lbs;

Unwind tension may be raised to 0.65-1 lb; and

After tensions may be at aim, main drive line speed can be increased in 1-2 rpm increments Sequencing of the drive while Operating Mod2 with 2 mils substrate may facilitate avoiding overload of motors. For example:

Setting and engaging web tension prior to driving the web; and

Setpoints for the sections of the machine include:

Main drive set at 26 rpm (resulting in virtually no web movement, but the motor may be engaged);

Motor 3 Rewind tension set at 1 lb;

Motor 4 Unwind tension set at 1 lb;

After tension may be set, rewind tension may be raised in 0.5-0.75 increments up to 3.5-4 lbs;

Unwind tension may be raised to 2-3 lbs; and

After tensions may be at aim, main drive line speed can be increased in 1-2 rpm increments.

Sufficiently high rewind tension may facilitate quick machine recovery from temporary perturbations in tension such as those caused by engaging nip rolls.

The above sequencing and operating responses may be built into the control system logic reducing the possibility of operator error during machine operation.

Edge Guides

Unwind edge guide control system may be modified to facilitate dampened response time and reduced creasing which may be due to rapid and excessive changes in the magnitude of the unwind positioning system.

Rewind edge guide control system may be modified to facilitate dampened response time and reduced creasing which may be due to rapid and excessive changes in the magnitude of the unwind positioning system.

Rewind edge guide may be mounted on the moving mechanism of the motor (lateral motion) which may facilitate ensuring that the edge guide may be controlling to the edge of the winding roll, rather than to the backplane of Mod2. This may allow improved uniformity of the edge of the winding roll, which may be likely to be important for the subsequent vacuum coating processes.

Corona Treating

For the monomers tested on Mod2 a power level of 0.75 kw appears to provide good adhesion, assuming that the curing of the monomer may be sufficient. This process window was defined by corona treating substrate, cutting out a stop-action sample, and manually laminating the sample with monomer and curing in the Oriel lamp system for 3 minutes (known to be a sufficient curing level).

For a power level>0.75 kw, measured surface energy of the substrate ~54 dynes.

Monomer Coating

Monomer coating using a manual syringe may be adequate for preliminary testing of the embossing process. At a web speed ~6 fpm, a sinusoidal pattern of droplets on the web at a frequency of ~1 drop/sec may provide a sufficient supply of monomer to the embossing process to yield a generally cross-web embossed CD pattern (with the CD drum). A significantly lower supply of monomer may reduce cross-web coverage. A higher supply of monomer may result in squeeze out from the edges of the drum.

As an example, a coating application technique using an Anilox-to-rubber-to-web was found to produce well-controlled, uniform coatings.

Substrate Anti-Stat Protection

Use of anti-stat devices, may facilitate avoiding poor performance areas. For example improvements using anti-stat devices may include:

Web tracking may be improved for 6 micron PEN; and
Droplets may be better formed on the web surface coating of monomer when using a syringe.

The above may be achieved with the use of Po-210 nuclear antistat bars at 4 locations. The possible locations include:

Post-unwind
Post-corona treat unit
Post-embossing
Pre-rewind

Electrostatic antistat bars were also evaluated and found to work as effectively (in addition to presenting a shock hazard) as nuclear bars.

Embossing Process and Equipment

A nip pressure of at least 15 psi may provide sufficient force to result in good lamination using the CD drum.

Use of a single nip roll (infeed only) appears to allow a higher tension operating point on the embossing drum. This may be a result of Less isolation from the rewind tension level set
Inertia in nip roll #2, the impact of which may be exacerbated when the roll in engaged Use of two nip rolls (infeed and exit) macroscopically results in acceptable operation. Some examples include:

Use of a seamed drum with regular seams may facilitate monitor evenness and ease of flow;

Engaging the two nip rolls with a good match of pressure facilitates tracking; and A better controlled release point of the web from the drum; i.e., with the exit nip roll engaged, the web's drum release point may be "pinned" better due the pressure on the web from the closed nip roll.

The following input nip roller characteristics may be beneficial for thin webs: durometer (harder may be better), surface finish (pattern can print through backside of thin film, and diameter (larger diameter imparts less differential tension to infeed web).

Lamination Process Control

Precise Side-to-side lamination control of nip pressure may facilitate lamination.

Curing Process and Equipment

Equivalent degree of curing was found within the operating range of several different curing systems, for example:

Oriel "solar simulator" which may be a broad spectrum system;

The "belt UV system" which may be a broad spectrum system;

The Xenon flash lamp system; and

Infinilux & UVPS UV LEDs, which output a narrow wavelength light distribution centered at 395 nm.

For all of the above systems, good curing was found at some combination of light intensity setting and exposure time. Using certain monomer formulations may facilitate further good curing.

For the lamp systems, there may be a well defined curing "position" for the substrate which may be based at least on focal point or uniform exposure point of the lamp system For the LED system, UV intensity was measured across the LED "triplet strips" at distances of ½" and 1" from the surface of the strip. It was found that a relatively uniform energy profile exists at a distance of 1" from the strip; at the ½" distance, a significant variation of intensity was measured with a large drop between the LED sources For the Oriel system, using a possible monomer such as ACT2-158-1, good curing was observed with exposure times as low as 5 seconds or less.

The above exposure process operating point may be important, because the Mod2 exposure time using the 4" diameter CD drum, with the placement of the UV LEDs on the unit, may be on the order of 3 seconds (approximately 2 inch exposure window at 6 fpm).

Substrate Rewinding

Substrate rewinding may be affected by surface roughness of the web (a low level of roughness may be incorporated by the substrate manufacturer, generally) to enable some air entrainment and may reduce surface friction and wrinkling at the windup.

By proper set up of the machine (either Mod2 or the Mill Lane; alignment and operating parameters), may facilitate good rolls of substrate being completed (i.e. roll may be "hard", well formed, and has minimal wrinkling; at least as good as incoming substrate).

Web rewinding quality may vary depending on the processing conditions. Note that all of the conditions below utilize no special equipment to assist rewinding (i.e. lay-on rolls or bowed spreader rolls):

2 mils PEN without coating yielded a good roll
6 micron PEN without coating yielded a good roll
2 mils PEN coated with polymer (cured monomer) using a uniform drum without seams yielded a good roll
2 mils PEN coated with polymer (cured monomer) using a patterned drum with seams yielded significant air entrapment in the area of the seam; probably due to excessive level of tackiness in areas where the monomer coating was thicker due to the seams and undercured at these locations. Manifestation was in "bubbled TD areas on the winding roll" which subsequently caused creasing.

6 micron PEN with polymer (cured monomer) using a uniform drum without seams yielded significant creasing in the winding roll coincident with the polymer coated surface contacting the backside surface on the substrate on the rewind.

6 micron PEN with polymer (cured monomer) using a patterned drum with seams yielded significant creasing in the winding roll coincident with the polymer coated surface contacting the backside surface on the substrate on the rewind The bubbling seen with 2 mils PEN appears to be overwhelmed by the creasing problem, or may be simply not present due to the lower beam strength of the thin substrate passing through lamination nip.

Very uniform x-web tension at the rewind may facilitate high quality results when using thin films.

(II) Vacuum Coater

Pilot Roll Coater

Designed and installed new web transport/guide assy featuring backside-only idler and bowed (stretcher) rolls for optimization of thin web handling.

Improved software machine controls

Upgraded deposition capability for 4 tandem sputter targets (2 DC & 2 RF magnetron) to allow doubling the SiO2/ZnS deposition rate.

Designed and implemented in-line reflectance measuring capability based on use of fiber-optic height sensor configured to measure reflectance. One bank of each linear array can be situated between each deposition zone.

Developed hardware to modify degree of isolation between each deposition zone to control interlayer mixing.

Pilot Batch Coater (Sharon)

Installed spiral wrap device to allow coating of discrete lengths of tape

Added "auto-indexer" to precisely rotate substrate holder over targets Monomer materials:

Monomer formulations were developed by several custom formulation suppliers to predetermined specifications and characteristics. Key parameters specified included:

Spectral sensitivity (for curing through PEN film);

Viscosity (aim may be low for good flow-out during the embossing process) such that low viscosity generally results may be lower chemical resistance Temperature modulation was identified as a method of controlling viscosity (hence embossed layer thickness);

Curing rate (aim may be fast to increase process throughput);

Adhesion to plastic (for some Micon programs);

Low-adhesion to plastic (for other Micon programs); and

Release from "nickel tooling" for all Micon programs (assuming Ni tooling in the future).

Surface treatment (and volumetric treatment in the case of polymeric tools) were found to reduce the adhesion between the tool and the replication polymer.

Preliminary testing has occurred using a silicone release agent to improve separation of the cured monomer from the tooling surface. In addition, the release additive may be intended to provide some slip between the surface of the cured monomer and the backside of the web during rewinding (see rewinding section).

Monomer formulations which were sensitized into the blue region of the spectrum may be highly reactive and avoiding exposure to room lighting may be possible. This may be generally accomplished with the syringe dispensing method by wrapping the syringe with tape (e.g. Kapton tape) to filter the ambient blue light. This avoids the complexity of using entirely closed fluid handling systems.

Polymer Adhesion:

Polymer adhesion may be modified by several influences, including:

Intrinsic adhesion of the cured monomer to various surfaces;

Substrate treatment (note that both corona and flame treatment have been shown to improve adhesion); and Substrate sub-coating with adhesion promoting layers (adhesion promoting sub-coats displayed improvement in most cases, but in some testing, there was no impact).

Vacuum-Deposited Layers:

WORM layer recipe used Al and Sb as first layer

Alloy layer used Ge2Sb2Te5 nominal alloy

Overcoat used ZnS/SiO2 layer

Thicknesses of each layer varied for optimum performance

Using a vacuum-deposited layer as backside anti-static coating was evaluated using Al; preliminary test result in tape transport were positive Discreet Tooling:

As a near-term achievable alternative to developing a seamless drum for OT preformatting, a process was used which includes the precision pre-cutting of multiple Ni electroforms ("shims") having the desired pre-format pattern and laser welding the individual segments into a drum.

Original format designs were created (via standard CAD processes) and an original relief representation ("master") was made by patterning a glass substrate using lithographic techniques.

Fiducial cutting marks were included in the CAD pattern for later use in precision cutting of the pattern tooling.

Polymer-on-glass submasters were made directly from the master.

Reverse-image submasters ("mothers") were also made from the submaster.

Ni electroforms were made from polymer submasters

Submasters may also be made from master

One or more of the following methods may achieve clean separation after a vacuum deposition process such as sputtering 40-70 nm of NiV, the method include:

Additional treatment of the polymer submasters to increase hardness;

Additional treatment of the polymer submasters to reduce adhesion to polymer surface;

Use thinner NiV layer;

Ramp sputter power to reduce temperature of initial deposit; and

Passivate NiV (as may be dome during Ni-to-Ni replication).

Both the polymer submasters and Ni masters were used as discreet flat shims in producing test replicas of the preformat pattern by a UV process which includes:

Flat lamination through pressure rollers at 50-75 psi with UV curing fluid [described previously] injected at point of lamination ("nip"); and Cure by UV or optical radiation (4 sec to 6 min); 2-200 mw/cm2.

Drum Tool Fabrication:

Flat Ni shims were precision mill cut ("trimmed") using carbide cutting tools based on pre-determined distance from fiducial marks embedded in Ni shim enabling four virtually identical shims to be made by this technique. Also a plastic protective film was laminated to patterned surface of Ni shim, and peeled back temporarily to view fiducial marks prior to trimming Laser welding was used to join the 4 shims into a drum All 4 shims were aligned to one (bottom) edge and 3 welds were made from the back side, ~75% through the Ni, then the welded strip was flipped over and the finish weld was made from the front (patterned) side The final weld to form (close) the drum was made through the front side Optical measurements showed the highest weld precision (least offset of one track across the welded seam) was 0.00015 inches (3.7 microns) for the first drum processed by this method.

It was determined that a set of custom welding fixtures and additional testing may facilitate further reducing the offsets and improve the smoothness of the welding process.

Installation and Operation in Mod2:

Substitute Ni drums with CD patterns were installed in the Mod2 for preliminary process and machine testing [see above]. The drum was fixtured into the machine by sliding it over a rubber sleeve, which in turn was slid over the machine's drive shaft and was secured by compression of an end bell by use of a nut on the end of the threaded drive shaft.

Product application may include

¼, ½, ¾, 1, 4" inch tape width

Possible may be ½"

Figure 74:
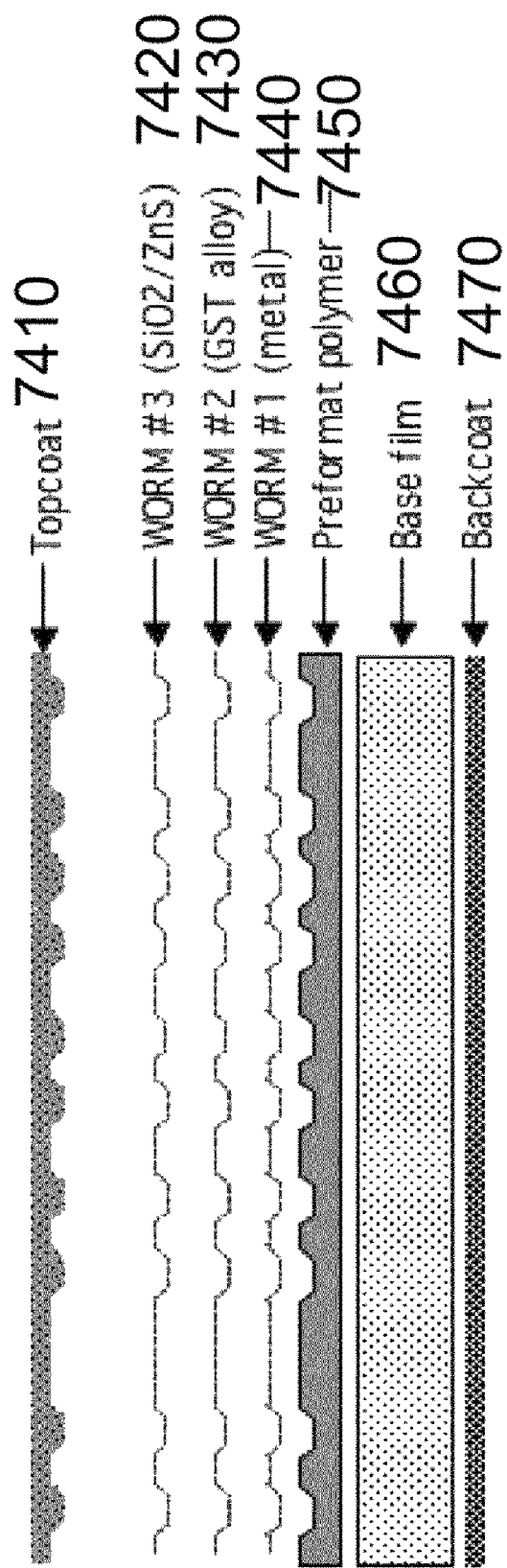
FIG. 74 depicts a cut away view of a possible embodiment of an optical tape of the invention.

Referring to FIG. 74

Top reading version (laser incident on "topcoat" side):

7410 Topcoat

Organic cured layer

PML (vac polymer deposition—acrylic) planarization

UV cure

EBeam cure

Solvent/aqueous coating

Purpose may be to protect the structure

Optical properties

7420 WORM Layer #3 (a.k.a. "Topcoat 1")

An optional layer as part of the stack

Protects during manufacturing

Provides some optical tuning

Possibly (ZnS/SiO2, 80/20); alternates are SiO2, YF2, other transparent oxides and compounds Thermal properties Optical properties (T, R, A)

Flexibility

Adhesion (high)

Surface roughness

7430 & 7440 WORM layers

Possible may be Te alloy (GST=Ge2Sb2Te5 nom)

Metal (possible may be Sb, Al)

Thickness depends on product performance

7450 Pre-format layer

Possible may be UV cured polymer

Possible may be acrylic (possible epoxy or polyurethane)

Possible may be Viscosity (<200)

Possible may be Spectral sensitization (400 nm)

Possible may be Adhesion to substrate (high)

Possible may be Adhesion to tooling (low)

Possible may be Flexibility (high)

Layer thickness (0.5-1 u)

Preformat layer formation processes (options: single or multi-step sequence)

7460 Substrate

Materials

Possible may be PEN

PET

PC

CTA (cellulose triacetate)

Thickness 1 u-25 u (possible ~4-8 u) Possible may be 6 u

Other properties

Surface roughness

Subcoats

Fillers

Heat stabilization

Mechanically balanced stress

Surface treatment and or chemical treatment

7470 Backcoat(s)

Surface roughness

Optical properties

Possible may be Antistatic

Anti-stiction

Possible may be thin metal layer (Al, Ni, NiCr)

Carbon black may be alternate backcoat (as standard industry practice at this time)

(Anti-Curl Layer as Option)

Texturizing by embossing or formulation and additives (particulates) or drying

Purposeful reticulation

Other considerations:

Possible may be Write dark and light (final tbd)

Tuning of chemistry to the correct write wavelength

Texturing of surfaces for improved drive performance

A second version exists may be read from the other side

Backcoat

Topcoat (?)

WORM layers

Pre-format layer

Substrate

Topcoat

Clear, protective

Texture control

Transparent (to R/W wavelength)

Antistat

WORM to R/W

May have erasable capability

Possible may be phase change

Possible may be pre-formatted layer in the structure

A seamed drum with a restart zone, zeroing zone, and the like, plus a method for forming the seamed drum The following description refers to several possible embodiments of the disclosure and it may be understood that the variations of the embodiments and methods described herein may be envisioned by one skilled in the art, and such variations and improvements are intended to fall within the scope of the disclosure and therefore the disclosure and methods are not limited to the following embodiments.

FIGS. 75 through 78 show the current art and illustrate how nonuniform coatings result from non-uniform source distributions. The subsequent figures illustrate how the method of this disclosure, which utilizes a spiral path and multiple passes through the source, has the effect of improving the uniformity of the coating.

Figure 75:
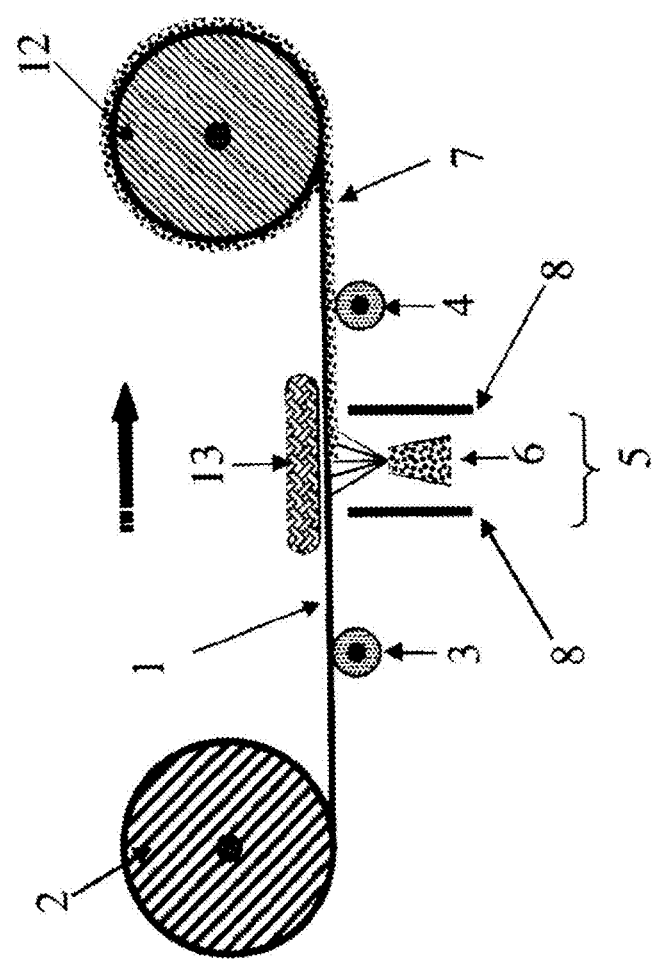
FIG. 75 shows a side view of the simplified coating path of the prior art.
Figure 76:
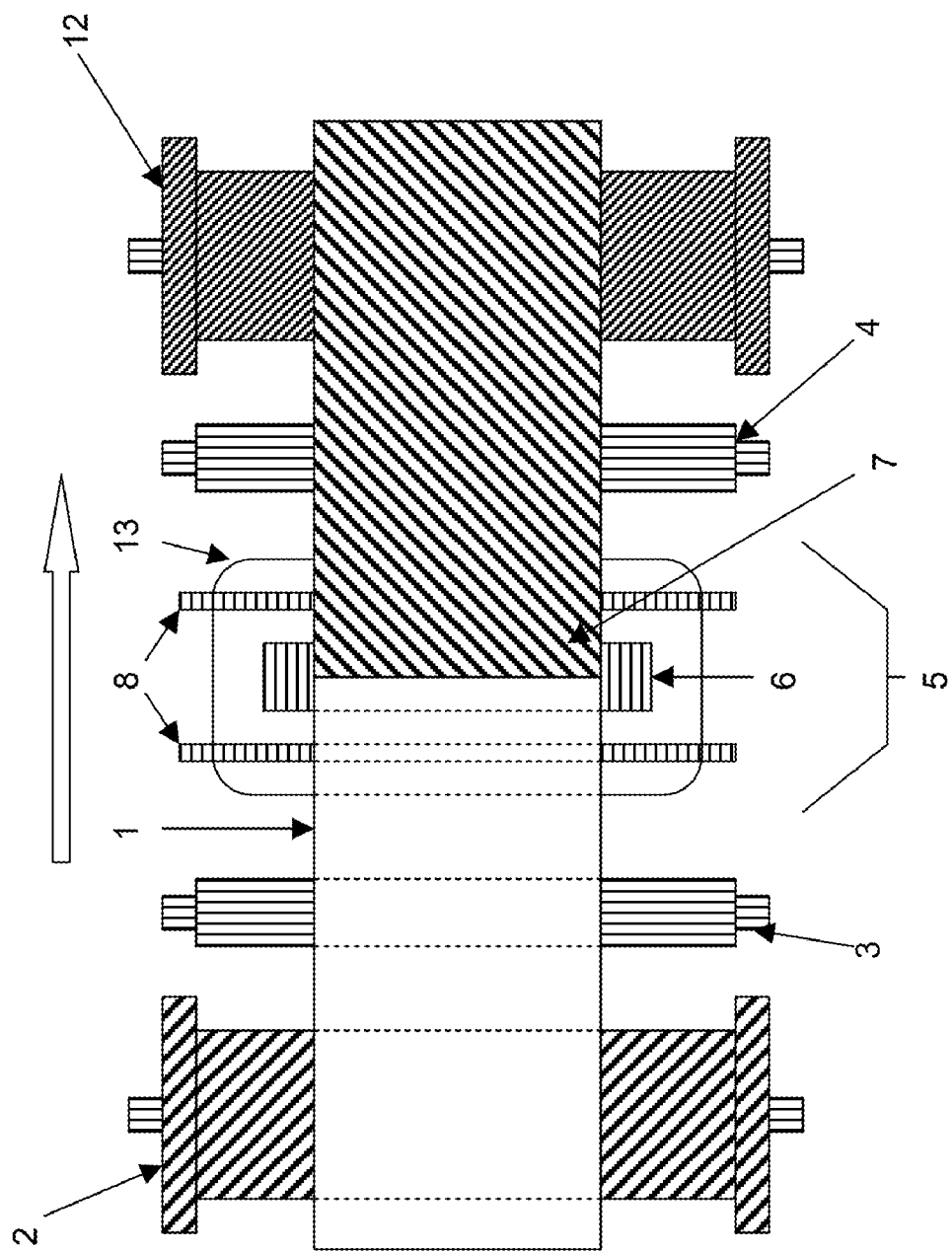
FIG. 76 shows a top view of the embodiment of FIG. 75.

In a typical configuration, shown both in FIG. 75 in side view, and FIG. 76 in normal perspective view, the substrate 1 to be coated, herein also referred to by convention as the web, may be feed from a supply spool 2, and after passing over additional roll 3 to control tension and positioning, etc., the substrate enters coating zone 5, which includes source 6 from which material for the first layer 7 may be deposited, and coating barriers 8 to minimize overcoating of excess material from the source. Additional materials may be deposited at sequentially located coating zones (not shown), after the last of which the coated substrate, after passing over additional tensioning and positioning roll 4, may be taken up on re-wind spool 12. In this known art, the substrate traverses the coating zone in an essentially linear direction, and the web may be either a free span, i.e., unsupported on the back side, or in contact with a backing plate 13 or roll which may be typically used to cause the web to lie flat and/or to remove excess heat from the deposition process. In the latter case, the backing plate or roll can optionally be cooled.

In the figures of this disclosure, motors, speed control elements, tension controls, web guides and the like are not shown in the figures of this disclosure for clarity, but such control systems are well known to the art (D. R. Roisum, The Mechanics of Rollers, TAPPI Press, Atlanta, 1996).

Figure 77:
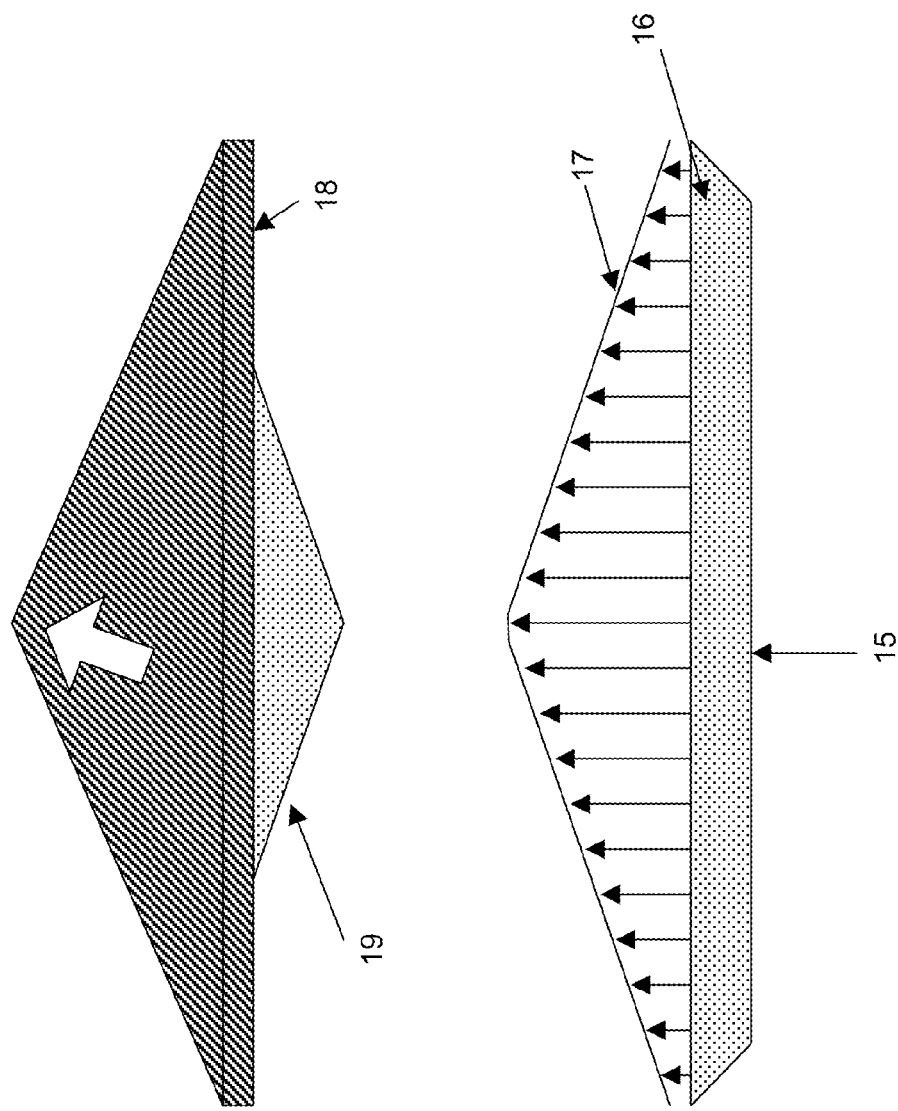
FIG. 77 shows a schematic illustrating the effects of non-uniform source distributions on the coating uniformity as viewed from the direction of substrate motion.

Now referring to FIG. 77, a general schematic of practice common to the art may be given of the cross-section of a substrate during the vacuum deposition process, as viewed in the machine direction. This diagram shows one example in which a nonuniform deposition of material 19 arises from a non-uniform flux distribution 17 from the source, where crucible 15 filled with material 16 may be evaporated (for example, by means of resistively heating crucible, not shown). The flux, typically described as the mass or thickness of material being evaporated per unit time, may be shown graphically as distribution 17, where the highest rate of evaporation may be represented by the longest arrow (at the center in this example). Material 19 generally condenses on substrate 18 in proportion to the flux distribution, and may be thus distributed as material layer 19, with the thickness being approximately proportional to flux 17.

Figure 78:
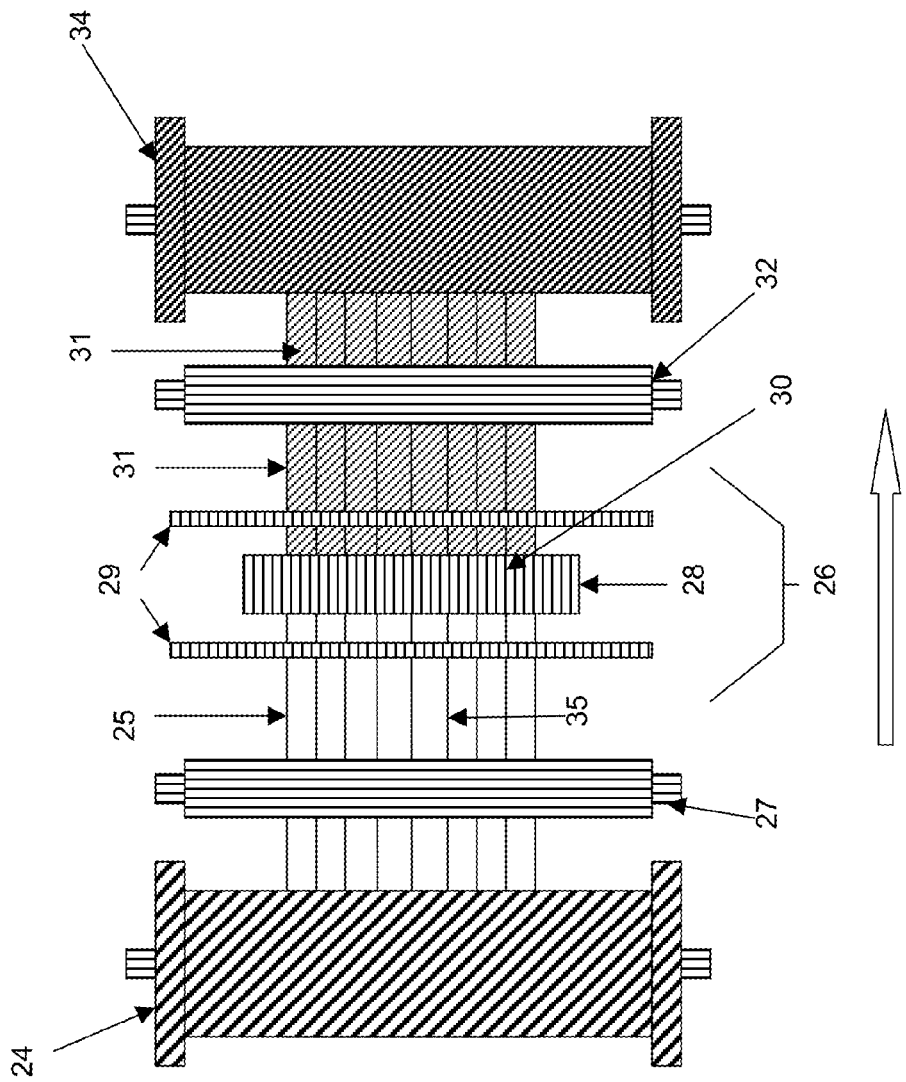
FIG. 78 shows a schematic illustrating the effects of non-uniform source distributions on the substrate as viewed normal to the plane of the substrate at the deposition zone.

FIG. 78 represents the normal-incidence view of a non-uniform coating similar to that of FIG. 77 that can result from a non-uniform flux distribution. Here, unwind spool 24 supplies substrate 25 to coating zone 26 over guide/tension/idler rollers (represented here by 27). Material 30 may be evaporated from crucible 28, with deposition shields 29 minimizing stray coating. The coated substrate 31 travels over additional guide/tension/idler rollers (represented here by 32) and may be rewound on take-up spool 34. The horizontal dotted lines 35 indicate hypothetical slitting locations if this substrate were ultimately to be made into a tape product. Variations in coating thickness 36 may be the result of the non-uniform flux from crucible, as shown previously (FIG. 77).

Figure 79:
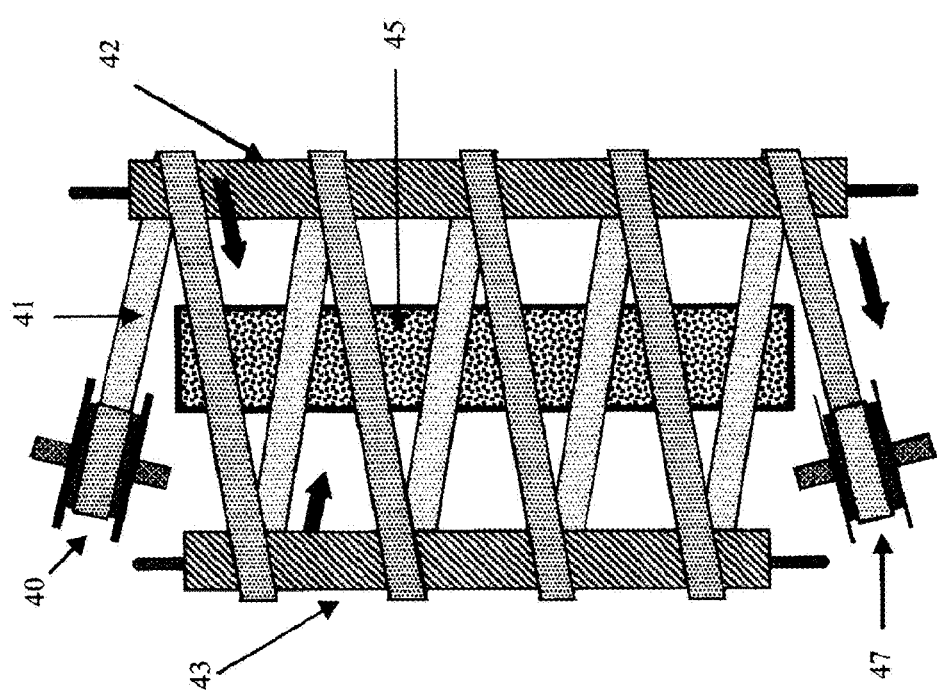
FIG. 79 shows a schematic drawing of one embodiment of the present disclosure, showing the tape path through the vacuum deposition zone.

FIG. 79 shows a schematic diagram of one embodiment of the present disclosure in which a tape-like substrate 41 (typically a polyethylene terephthalate, PET, or -naphthalate, PEN, or polyimide film or the like) may be supplied by unwind spool 40 to a web guide, tension control roller, and additional idler rolls (not shown for clarity), over roll 42, then to roll 43, and then enters coating zone of deposition source material 45, then to roll 42 and back to 43, etc. following an essentially spiral pathway and traversing the coating source 45 a number of times before exiting the coating zone and rewinding on spool 47. The effect of multiple passes through various parts of source 45 may be to average out the coating thickness non-uniformities resulting from a nonuniform flux (as, for example, shown in FIG. 78). It should be noted that in this drawing the wraps of tape around rolls 42 and 43 are widely separated for purposes of illustration only, and would be close together in an actual coating configuration. It will be noted that a line speed increase will be in proportion to the tape width decrease will maintain an equivalent deposit thickness and throughput for the tape relative to a conventional (full width) coating configuration. Since the method of this disclosure offers increased immunity to source variations resulting from higher flux rates, further speed increases may be also possible.

In order to reduce the heat load from the deposition process, rollers 42/43 in FIG. 79 can also be cooled, by circulation of coolant, etc. The higher linear tape speed and lower deposition rate per pass, in combination with the 180 degree wrap angle of [optionally-chilled] rolls 42/43 between coating passes, will act to reduce the thermal load on the tape from the deposition process.

Figure 80:
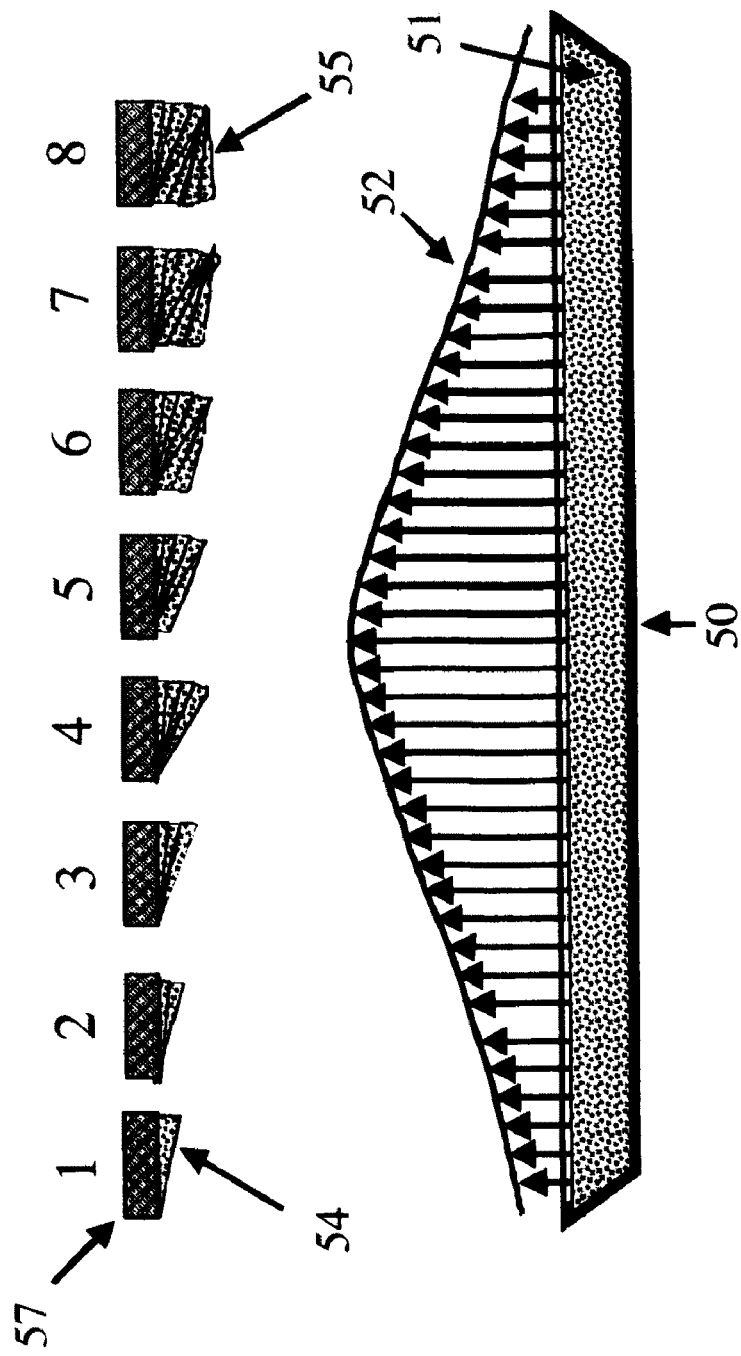
FIG. 80 shows a schematic representation of the effects of multiple passes through the coating zone by the method shown in FIG. 79.

The beneficial effects of the multi-pass averaging technique of this disclosure can be seen by examining the diagram in FIG. 80. Briefly referring back to FIG. 77, the substrate 18 of that figure has now been replaced by a narrow width substrate, denoted by 57 in FIG. 80. Following the tape path shown in FIG. 79, tape substrate 57 in this example makes 8 consecutive traverses through coating zone 50, having material flux emanating from crucible 51 (with the source also having the same non-uniform flux distribution 52 as FIG. 77), where the successive passes of substrate 57 may be denoted by positions 1 through 8 (note: the upper traverses of the complete tape path have been eliminated for clarity). The coating layer build-up 54 through 55 may be exaggerated to illustrate the averaging effect. The multiple-pass averaging effect may be compared to the coating material from the same model source distribution in FIG. 77, where no multiple-pass averaging has taken place, after slitting.

It can be appreciated from this illustration that improvement in uniformity may be achieved from most source configurations, since the averaging effect may be based on the width of the substrate being small compared to the width of the source, and multiple passes sample many sections of the material source distribution.

Figure 81:
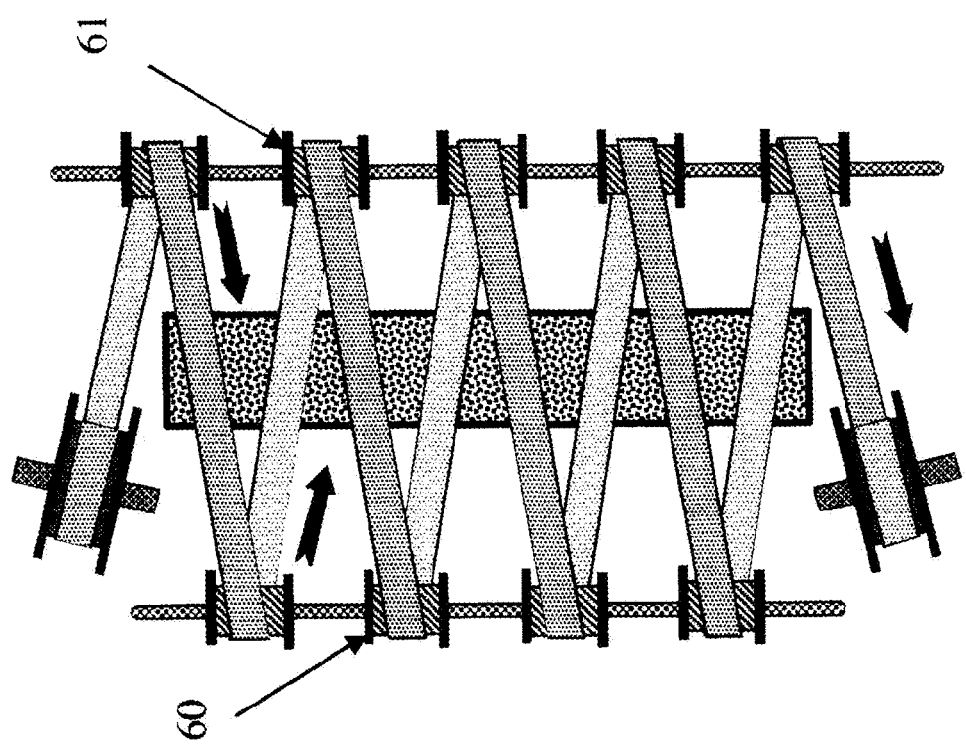
FIG. 81 shows another embodiment of FIG. 79 in which individual idler rolls are used to guide the tape.

In another embodiment, shown in FIG. 81, the single rollers 42 and 43 of FIG. 79 have been replaced by multiple individual guide rollers 60 and 61 in order to more precisely guide the tape. This could also be achieved by cutting guide track grooves into rollers 42 and 43. Again, in actual operation, the individual wraps would be close together for maximum uniformity and yield.

Figure 82:
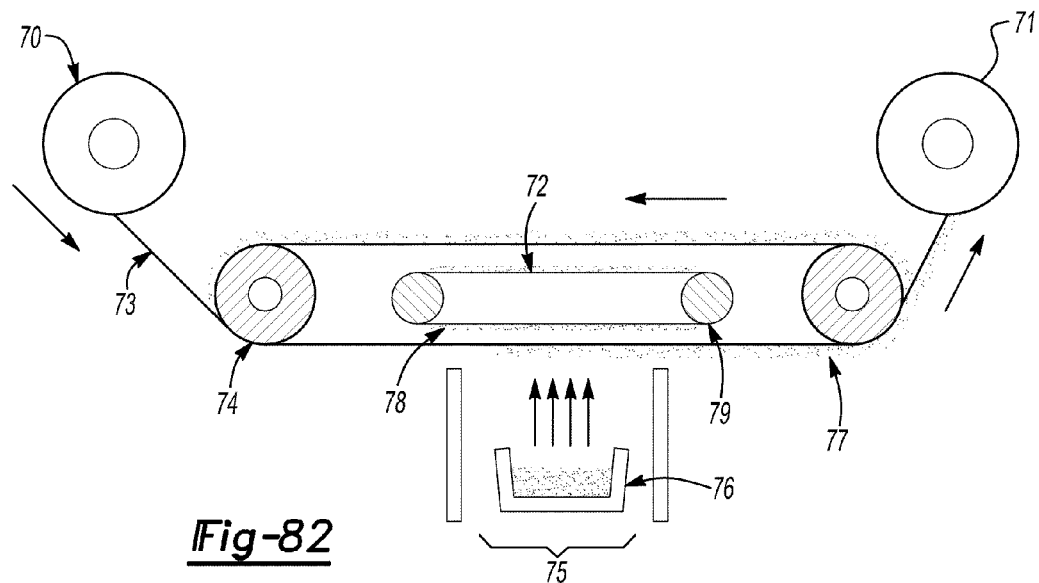
FIG. 82 shows a schematic drawing for one embodiment of the present process whereby excess overcoated material can be removed.

It may be also a feature of this disclosure that a means for collecting excess ("stray") material from the source may be provided, as shown in FIG. 82. It may be an undesired characteristic of most vacuum coating sources, including e-beam and thermal evaporators, that excess material form the source can be deposited in areas other than the substrate, and this not only requires periodic cleaning, but can interfere with the coating operation when such unwanted deposition occurs on rollers or guides and thereby changes these surfaces and alters the performance of these devices. Also, excess material can contaminate other coatings, either by flaking off of surfaces where a substantial buildup of material exists, or by re-evaporating from heated surfaces. In the embodiment shown in FIG. 82, which may be a side view of the method of FIG. 79 or 6, the tape substrate 73 may be unwound from supply spool 70 and traverses coating zone 75 with the same spiral path as previously described, rewinding onto take-up spool 71. This embodiment illustrates collector device 72 for collecting excess material that would otherwise pass through the space between successive wraps of tape and could potentially contaminate other parts of the coater, as well as the back side of the tape. The collector consists of either an unwind/rewind pair of rollers (78/79) with standard web handling rollers for substrate 72, or an endless belt of film running between rollers 78/79. The substrate 72, which could be a plastic film such as PET or other, accumulates excess material during the tape coating operation and may be readily discarded as the material buildup necessitates.

Figure 83:
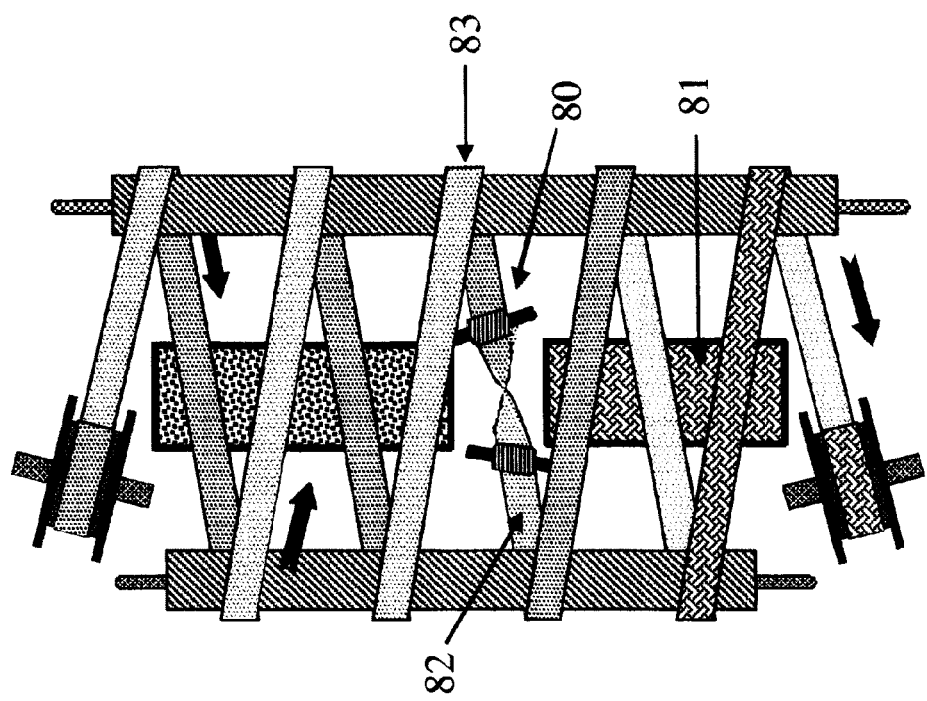
FIG. 83 shows a schematic drawing for one embodiment of the present process for single-pass dual-sided coating.

Yet another embodiment, shown in FIG. 83, shows a method by which both sides of the substrate can be coated in a single pass. Here the web path passes over deposition zone 84, coating one side of the substrate, as shown in FIG. 79, then between feed roller 80 and receiving roller 82 tape 83 may be twisted by 180 degrees about the tape axis along the machine direction. The web path continues into subsequent deposition zone 81, where the backside coating may be applied. Such dual-side coating may be of benefit for materials having both sides active (recordable or information-bearing), or requiring a vacuum backcoat for friction and/or static control. With conventional coating methods, dual side coatings require either an additional coating pass or an additional backside coating station, both of which add production time and cost.

Figure 84:
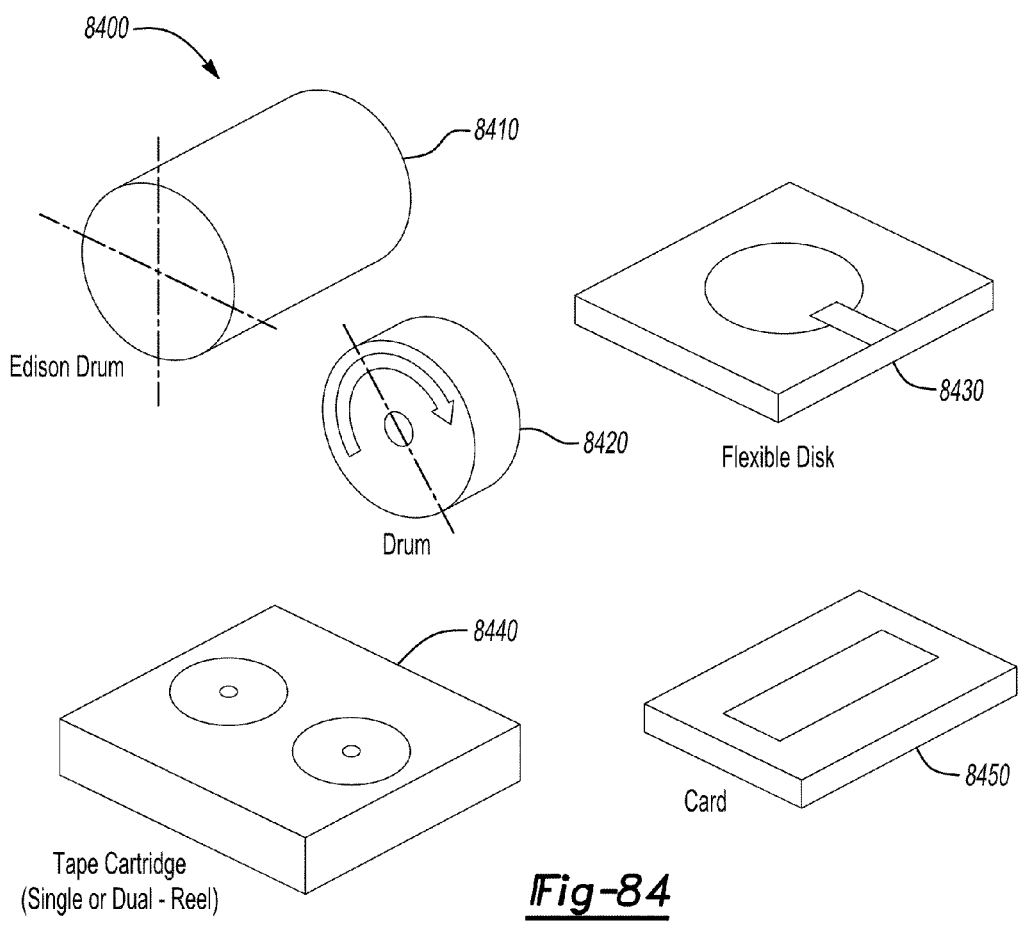
FIG. 84 shows various embodiments of optical storage media.

As can be seen in FIG. 84, optical storage media may take various forms as shown by alternative optical media forms 8400, each form offering differing attributes of size, transfer speed, storage capacity, and cost. Alternative optical media forms 8400 include drum shaped optical storage media 8410 and 8420, flexible disk optical storage media 8430, compact reel-to-reel optical storage tape 8440, and optical storage card 8450.

Drum shaped optical storage media 8410, 8420 may offer transfer rates from approximately 6.5 MB/s to approximately 13.5 MB/s and storage capacity from approximately 5.6 GB to approximately 102 GB.

Compact reel-to-reel tape 8440 shaped optical storage media (also known as mini-optical tape) may offer transfer rates from approximately 3.2 MB/s to approximately 6.7 MB/s and storage capacity from approximately 255 GB to approximately 1130 GB.

Optical storage media may be selected from a set including alternative optical media form 8400 for a particular application such that the physical size, and/or storage capacity, and/or transfer rate satisfies requirements of the application.

Optical flexible disk 8430, compact reel-to-reel 8440, and optical card 8450 may be incorporated into a housing providing easy portability and protection of the media, and may be appropriate for applications in which the media may be frequently handled by a user.

Figure 85:
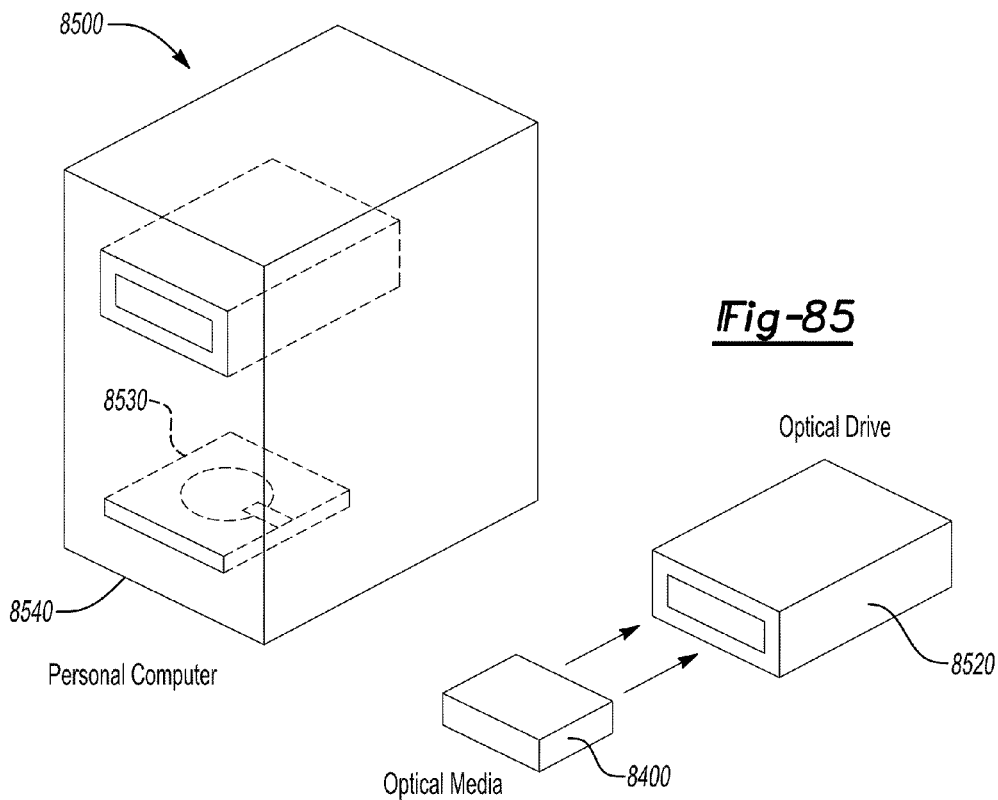
FIG. 85 shows an embodiment of the optical recording media of FIG. 1 integrated with a personal computer, and a detail of a subset of the embodiment.

FIG. 85, a possible embodiment of an optical storage media system 8500 includes an alternative optical media form 8400 loaded into an optical drive 8520 which fits into a typical DVD drive sized bay of a personal computer (PC) 8540. Alternative optical media form 8400 may be constructed of a phase change optical media employing red, blue, or UV laser with one or more pickup heads for recording to and reading from alternative optical media form 8400. Other types of optical media such as dye for WORM and magneto-optical for erasable optical media may also be suitable.

In this embodiment, optical drive 8520 communicates with PC 8540 hard drive 8530, using a portion of a predetermined size of hard drive 8540 to improve random access to information on alternative optical media form 8400. It may be possible that alternative optical media form 8400, through optical drive 8520 offers a transfer rate that may be faster than disk drive 8530. This may be accomplished in various ways, with one way being increasing the number of pickup heads in optical drive 8520 used to record or read alternative optical media form 8400. An increase in pickup heads may directly enable faster data transfer rate to/from alternative optical media form 8400.

When system 8500 may be used in an audio or video entertainment application, there may be unique algorithms and formats applied to the portion of hard drive 8540 that allow users to rapidly access portions of the information stored on alternative optical media form 8400. As an example, the algorithms may allow a user to view thumbnails of movie scenes located a different physical locations on alternative optical media form 8400, and then access a selected movie. These algorithms and formats may include index or location information of the movies associated with the thumbnails on alternative optical media form 8400, enabling fast access to the selected movie. Information stored on disk drive 8530 may include tracking data that determines what information may be only on alternative optical media form 8400 and what has been transferred to hard drive 8530. Other uses for system 8500 include archive and backup of images, home movies, business information, or archive library services.

Figure 86:
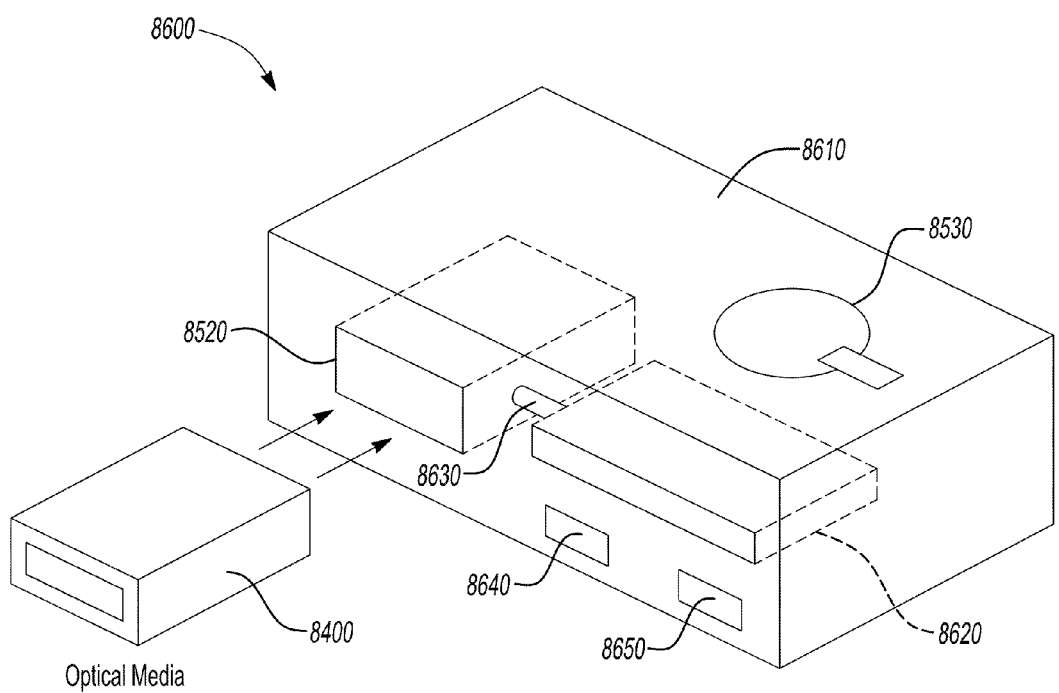
FIG. 86 shows the optical recording media of FIG. 84 in a stand-alone embodiment.

Another possible embodiment of an optical storage system may be shown in FIG. 86. A stand-alone digital home entertainment system 8600 may be similar in function to the possible embodiment of FIG. 85. System 8600 may have a dedicated processor (not shown) communicating with all elements of system 8600, multimedia components (not shown), a built-in hard drive 8530, a USB interface 8640, or other communication port 8650. System 8600 further contains alternative optical media form 8400 and optical drive 8520 of the embodiment of FIG. 85. System 8600 may further include other storage devices such as a DVD 8620. Each of the storage elements in system 8600 can communicate through communication channels 8610 or 8630 or through the dedicated processor. It may be possible that alternative optical media form 8400, through optical drive 8520 offers a transfer rate that may be faster than disk drive 8530.

System 8600 may connect to a PC via a wired or wireless LAN. It may also allow recording a plurality of programs using standard TV format and HDTV format onto alternative optical media form 8400. Using means similar to the embodiment of FIG. 2, system 8600 uses a portion of hard drive 8530 to improve the speed of access to portions of the information stored on alternative optical media form 8400, including thumbnails of movies. Information stored on disk drive 8530 may include tracking data that determines what information may be only on alternative optical media form 8400 and what has been transferred to hard drive 8530. Other uses for system 8600 include archive and backup of images, home movies, business information, or archive library services.

System 8600A may also be used as an expandable storage Digital Video Recorder (DVR). Since a DVR records video information to a hard drive, the storage capacity may be based on the capacity of the hard drive. Unwanted results such as users losing recorded programs, or recording of new shows being halted occur when the capacity of the hard drive limit may be reached.

By including an alternative optical media form 8400 and optical drive 8520 in an embodiment of system 8600 being used as a DVR, video storage may be now augmented beyond the hard drive limit to include alternative optical media form 8400. In an embodiment of system 8600 wherein optical storage media may be removable, the amount of storage capacity of system 8600 may be unlimited. Compact reel-to-reel 8440 optical storage media may be a possible embodiment of alternative optical media form 8400 because of its high volumetric storage density.

Figure 87:
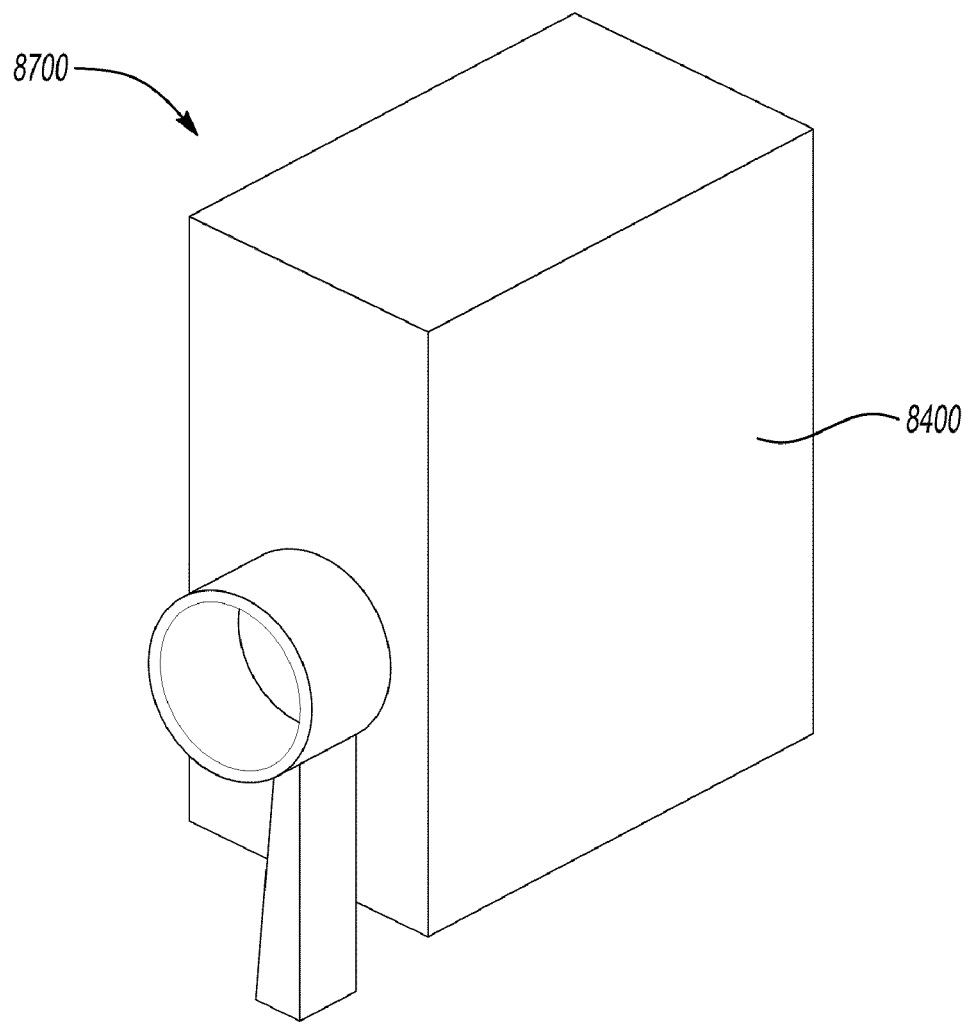
FIG. 87 shows the optical recording media of FIG. 1 in a camera embodiment.

FIG. 87 shows another possible embodiment using alternative optical media form 8400 in system. Camera 8700 may incorporate a compact reel-to-reel 8440 embodiment of alternative optical media form 8400. Optical storage media may be removable. Because of the high volumetric storage density of compact reel-to-reel 8440 optical storage media, video information may be stored in uncompressed format.

The format of information of each recording on alternative optical media form 8400 in this embodiment may be selected from a set including DVD and HDVD formats.

Optical storage media used in camera 8700 may be used interchangeably for recording or reading with any of the other system embodiment herein disclosed. Embodiments of alternative optical media form 8400 that meet the electrical, physical, and interface requirements of DVD media may also be used on standard PC or home entertainment equipment.

The elements depicted in flow charts and block diagrams throughout the figures may imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise required by the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While embodiments of the invention has been disclosed in connection with certain possible embodiments, other embodiments would be understood by one of ordinary skill in the art and are encompassed herein.

What is claimed:

1. A data storage system comprising:
   an optical media having a defect and a plurality of tracks on each side of the defect exhibiting (i) fields of modulated wobble indicative of defect location information next to the defect and (ii) fields of modulated wobble indicative of data;
   an optical pick-up unit configured to read the fields of modulated wobble; and
   at least one controller operatively arranged with the pick-up unit and configured to, in response to the pick-up unit detecting defect location information on one side of the defect, command movement of the media in a first direction such that the pick-up unit is positioned adjacent to the fields of modulated wobble indicative of data on the other side of the defect.

2. The system of claim 1 wherein the at least one controller is further configured to command the pick-up unit to refocus on the fields of modulated wobble indicative of data on the other side of the defect.

3. The system of claim 2 wherein, after refocusing, the at least one controller is further configured to command movement of the media in a second direction opposite the first such that the defect approaches the pick-up unit.

4. The system of claim 3 wherein the at least one controller commands movement of the media in the second direction until the pick-up unit detects defect location information or the pick-up unit loses focus.

5. The system of claim 4 wherein the at least one controller is further configured to record a position of the pick-up unit if the pick-up unit detects defect location information.

6. The system of claim 4 wherein the at least one controller is further configured to record a time during which movement is commanded in the second direction.

7. The system of claim 4 wherein the at least one controller is further configured to identify the media as defective if the pick-up unit loses focus and the pick-up unit cannot be refocused.

8. The system of claim 4 wherein the at least one controller is further configured to command movement of the media in the first direction for a predetermined period of time.

9. A method for calibrating a data storage system including (i) an optical pick-up unit and (ii) an optical media having a defect and a plurality of tracks on each side of the defect, the plurality of tracks exhibiting fields of modulated wobble indicative of defect location information next to the defect and exhibiting fields of modulated wobble indicative of data, the method comprising:
   reading the fields of modulated wobble;
   detecting defect location information on one side of the defect; and
   positioning the media such that the pick-up unit is adjacent to the fields of modulated wobble indicative of data on the other side of the defect in response to detecting the defect location information on the one side of the defect.

10. The method of claim 9 further comprising commanding the pick-up unit to refocus on the fields of modulated wobble indicative of data on the other side of the defect.

11. The method of claim 10 further comprising commanding movement of the media such that the defect approaches the pick-up unit.

12. The method of claim 11 wherein movement of the media is commanded until the pick-up unit detects defect location information or the pick-up unit loses focus.

13. The method of claim 12 further comprising recording a position of the pick-up unit if the pick-up unit detects defect location information.

14. The method of claim 12 further comprising identifying the media as defective if the pick-up unit loses focus and the pick-up unit cannot be refocused.

15. A data storage system comprising:
- an optical media having a defect and a plurality of tracks on each side of the defect exhibiting (i) fields of modulated wobble indicative of defect location information next to the defect and (ii) fields of modulated wobble indicative of data;
- an optical pick-up unit configured to read the fields of modulated wobble; and
- at least one controller operatively arranged with the pick-up unit and configured to, in response to the pick-up unit detecting defect location information on one side of the defect, command movement of the media in a first direction such that the pick-up unit is positioned adjacent to the fields of modulated wobble indicative of data on the other side of the defect, command the pick-up unit to refocus on the fields of modulated wobble indicative of data on the other side of the defect, and command movement of the media in a second direction opposite the first such that the defect approaches the pick-up unit until the pick-up unit detects defect location information or the pick-up unit loses focus.

16. The system of claim 15 wherein the at least one controller is further configured to record a position of the pick-up unit if the pick-up unit detects defect location information.

17. The system of claim 15 wherein the at least one controller is further configured to record a time during which movement is commanded in the second direction.

18. The system of claim 15 wherein the at least one controller is further configured to identify the media as defective if the pick-up unit loses focus and the pick-up unit cannot be refocused.

19. The system of claim 15 wherein the at least one controller is further configured to command movement of the media in the first direction for a predetermined period of time.

* * * * *